(12) United States Patent
Okuno et al.

(10) Patent No.: US 7,616,838 B2
(45) Date of Patent: Nov. 10, 2009

(54) EDGE-DIRECTED IMAGES SHARPENING METHOD

(75) Inventors: Yoshiaki Okuno, Tokyo (JP); Jun Someya, Tokyo (JP); Akihiro Nagase, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 541 days.

(21) Appl. No.: 10/527,687

(22) PCT Filed: Oct. 27, 2003

(86) PCT No.: PCT/JP03/13726

§ 371 (c)(1),
(2), (4) Date: Mar. 11, 2005

(87) PCT Pub. No.: WO2004/057534

PCT Pub. Date: Jul. 8, 2004

(65) Prior Publication Data

US 2006/0045375 A1    Mar. 2, 2006

(30) Foreign Application Priority Data

Dec. 20, 2002  (JP) ................................ 2002-369479

(51) Int. Cl.
*G06K 9/32* (2006.01)
(52) U.S. Cl. ...................... 382/299; 382/298; 348/448; 345/698
(58) Field of Classification Search ............... 382/299
See application file for complete search history.

(56) References Cited

U.S. PATENT DOCUMENTS 6,724,398 B2 * 4/2004 Someya et al. ............. 345/690
7,330,199 B2 * 2/2008 Someya et al. ............. 345/698
7,429,994 B2 * 9/2008 Someya et al. ............. 345/698

(Continued)

FOREIGN PATENT DOCUMENTS

JP    2000-101870 A    4/2000

(Continued)

OTHER PUBLICATIONS

Wang et al., Proceedings 2001 International Conference on Image Processing, ICIP 2001, Thessaloniki, Greece, Oct. 7-10, 2001, International Conference on Image Processing, New York, NY: IEEE, US, vol. 1 of 3 Conf. 8, Oct. 7, 2001, pp. 899-902, XP010563496.

(Continued)

*Primary Examiner*—Matthew C. Bella
*Assistant Examiner*—Sath V. Perungavoor
(74) *Attorney, Agent, or Firm*—Birch, Stewart, Kolasch & Birch, LLP

(57) ABSTRACT

An apparatus includes an edge width detection circuit which detects an edge portion of image data and outputs an edge width of the detected edge portion, a ratio control amount generation circuit which generates a ration control amount in accordance with the edge width, a ratio generation circuit which generates a conversion ratio in accordance with the ratio control amount, and a pixel number conversion circuit which performs a conversion of pixel number of the image data using the conversion ratio, thereby enhancing sharpness of the edge portion in proper quantities.

14 Claims, 39 Drawing Sheets

U.S. PATENT DOCUMENTS

| | | | |
|---|---|---|---|
| 2002/0030690 A1* | 3/2002 | Someya et al. | 345/598 |
| 2004/0135798 A1* | 7/2004 | Someya et al. | 345/690 |
| 2005/0156944 A1* | 7/2005 | Someya et al. | 345/611 |
| 2005/0243350 A1* | 11/2005 | Aoyama | 358/1.9 |
| 2005/0244077 A1* | 11/2005 | Kitamura et al. | 382/261 |
| 2006/0045375 A1* | 3/2006 | Okuno et al. | 382/266 |
| 2008/0043145 A1* | 2/2008 | Someya et al. | 348/538 |
| 2008/0050032 A1* | 2/2008 | Okuno et al. | 382/266 |

FOREIGN PATENT DOCUMENTS

| | | |
|---|---|---|
| JP | 2002-10070 A | 1/2002 |
| JP | 2002-16820 A | 1/2002 |
| JP | 2002-158869 A | 5/2002 |
| JP | 2002-215130 A | 7/2002 |
| JP | 2002-262071 A | 9/2002 |

OTHER PUBLICATIONS

Allebach J et al: Proceedings of the International Conference on Image Processing (ICIP) Lausanne, Sept. 16-19, 1996, New York, IEEE,US, vol. vol. 1, pp. 707-710, XP010202492.

Castleman; 'Digital Image Processing'; 1998; pp. 164-167 Copyright 1996 by Prentice Hall, Inc.

* cited by examiner

INPUT IMAGE DATA

OUTPUT IMAGE DATA

INPUT IMAGE DATA

OUTPUT IMAGE DATA

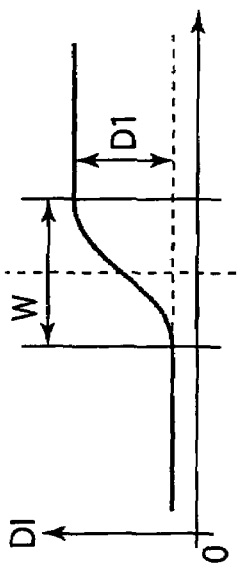
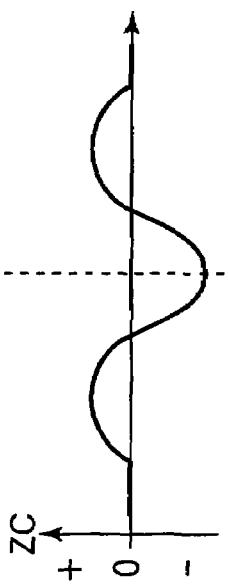
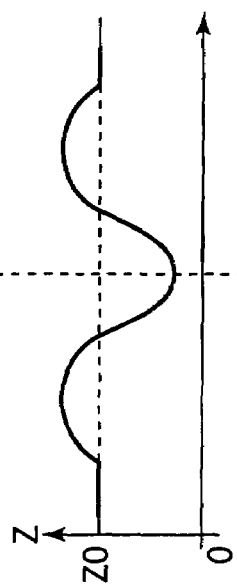
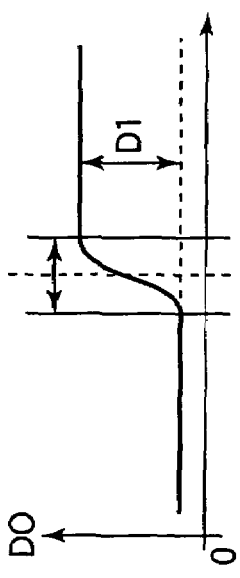
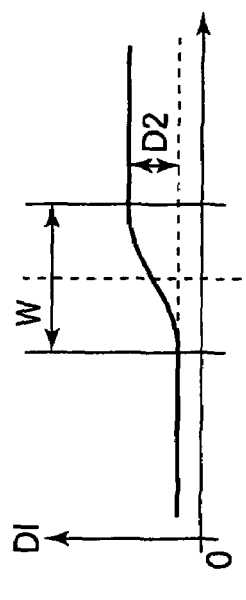
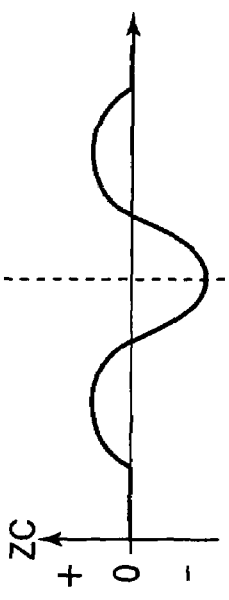
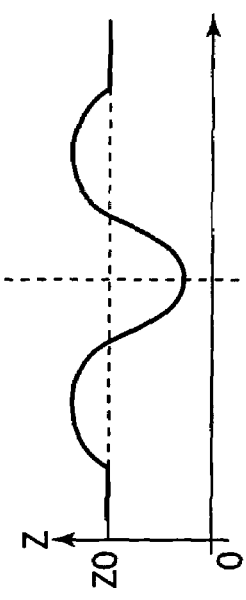
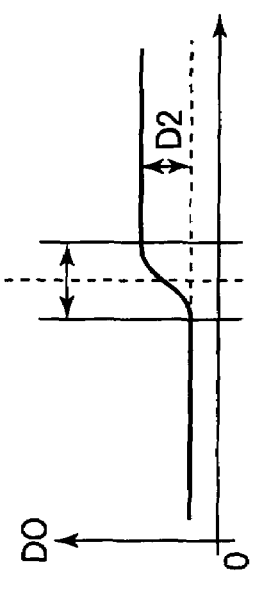
FIG.5A1  FIG.5B1  FIG.5C1  FIG.5D1
FIG.5A2  FIG.5B2  FIG.5C2  FIG.5D2

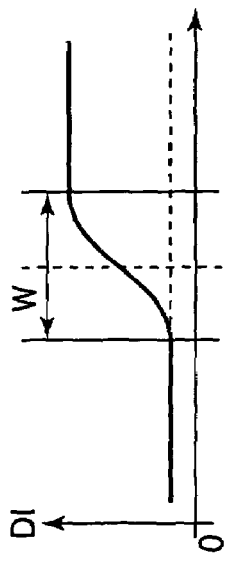
FIG.6A1
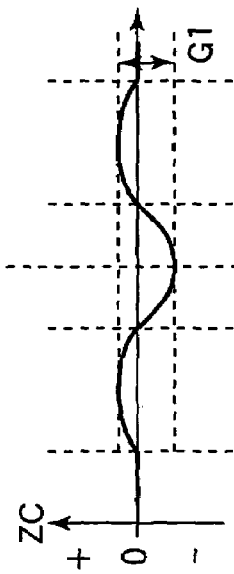
FIG.6B1
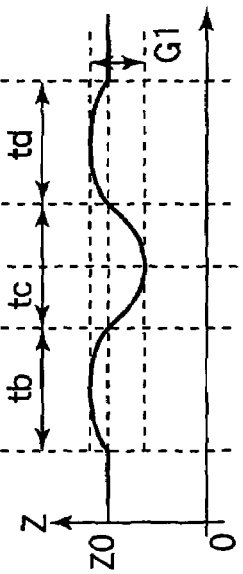
FIG.6C1
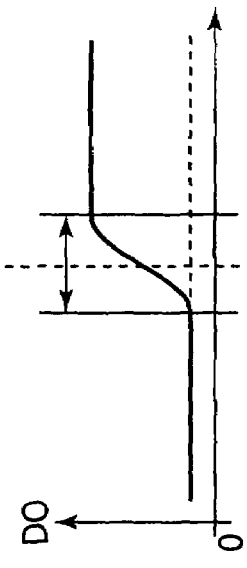
FIG.6D1
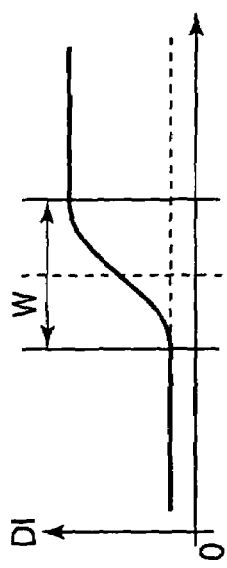
FIG.6A2
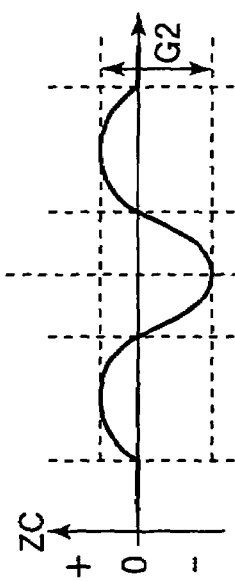
FIG.6B2
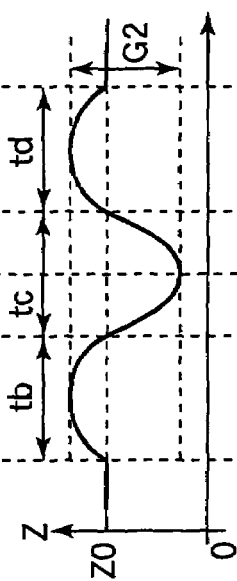
FIG.6C2
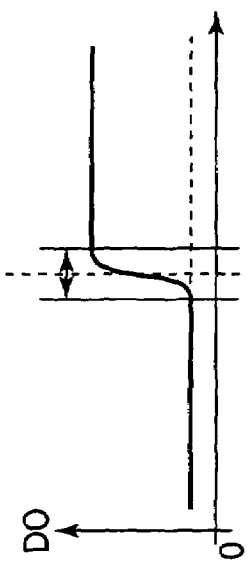
FIG.6D2

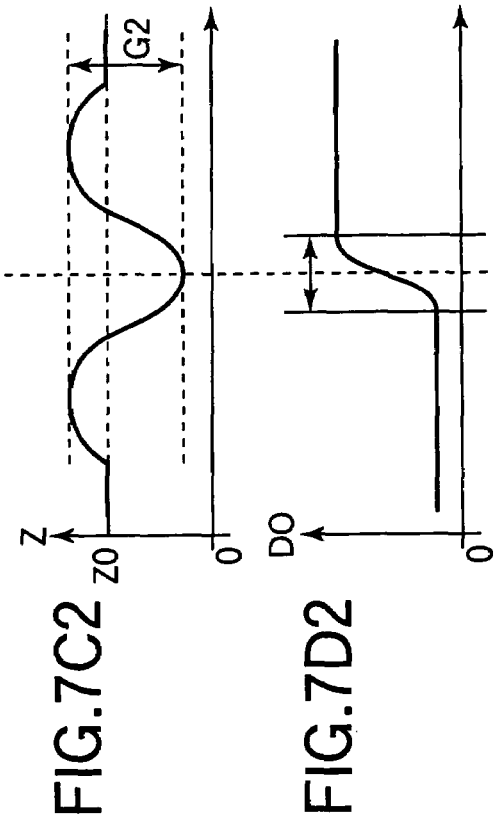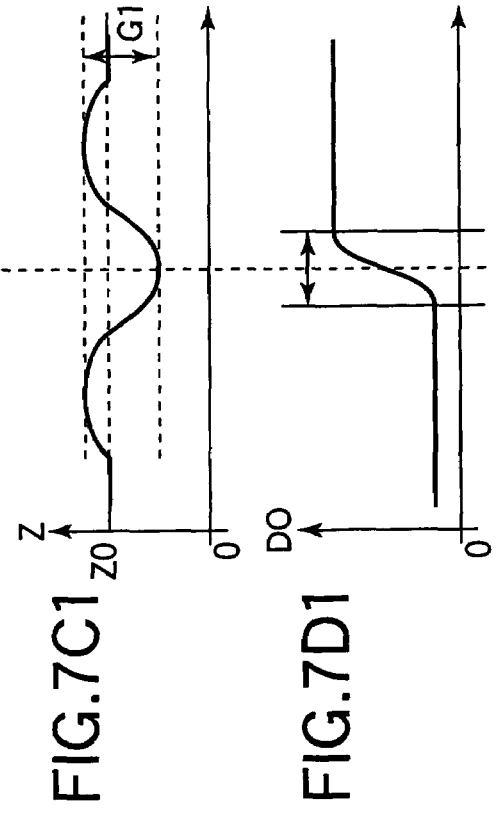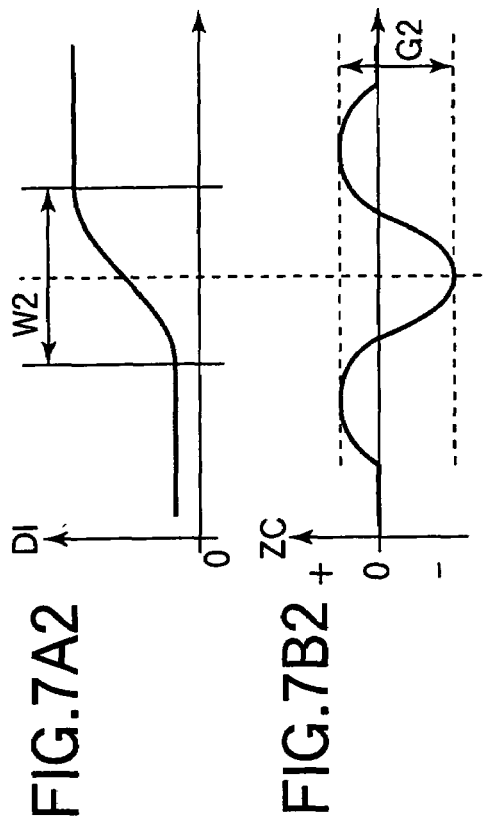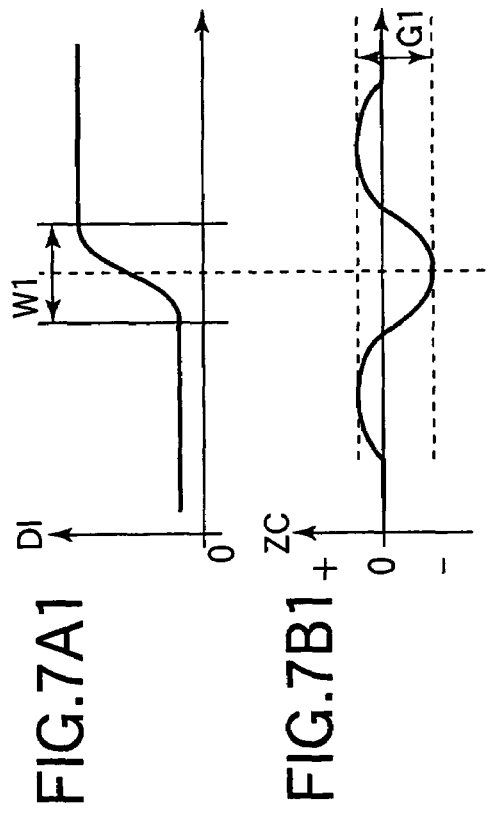

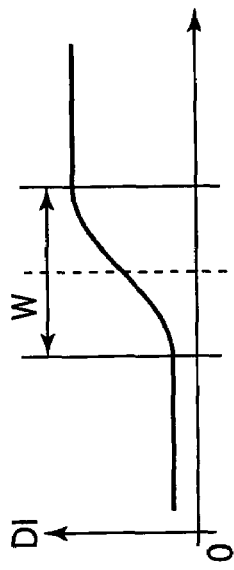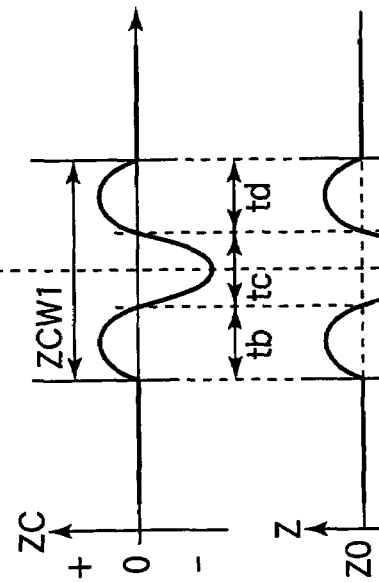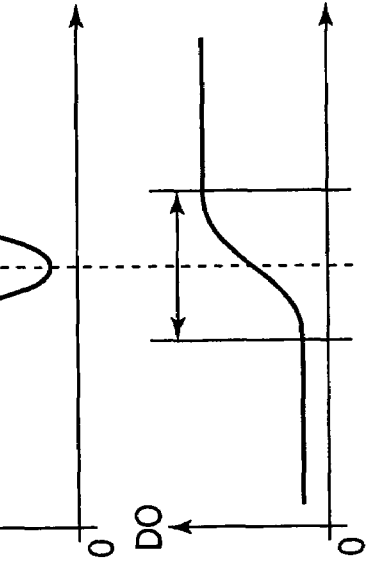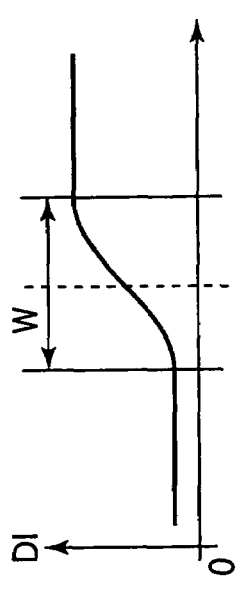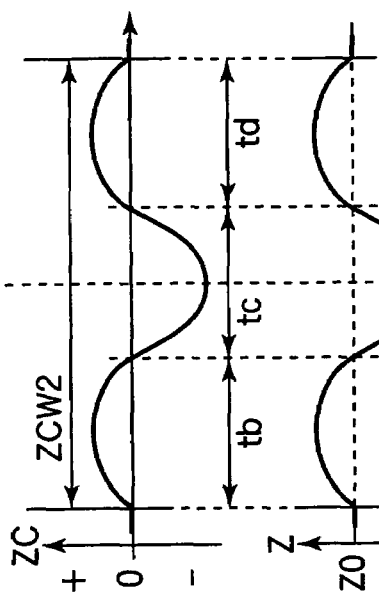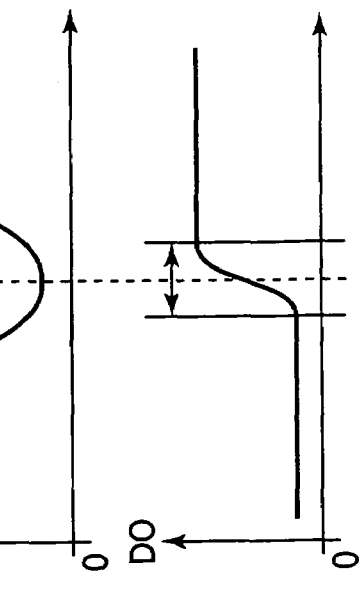

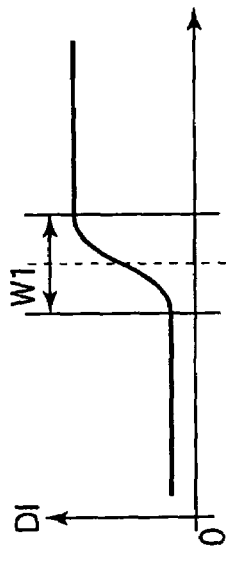
FIG.10A1
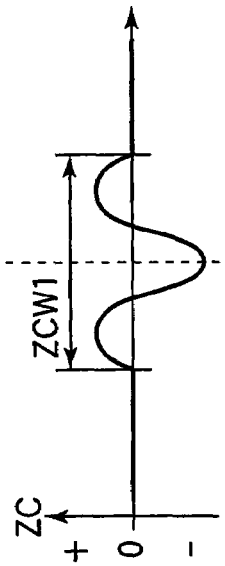
FIG.10B1
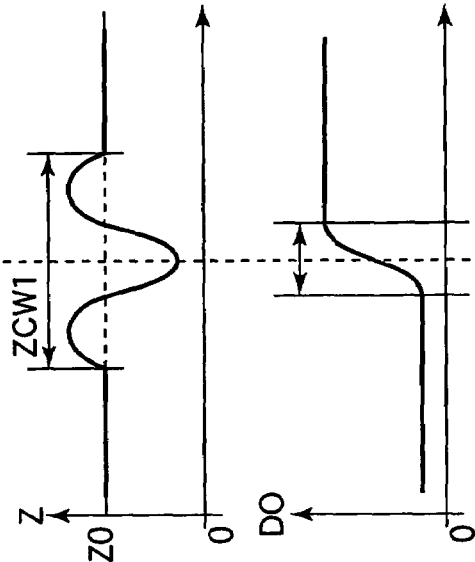
FIG.10C1
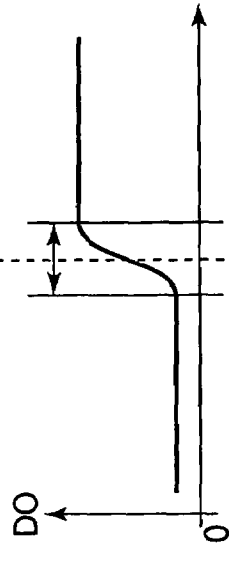
FIG.10D1
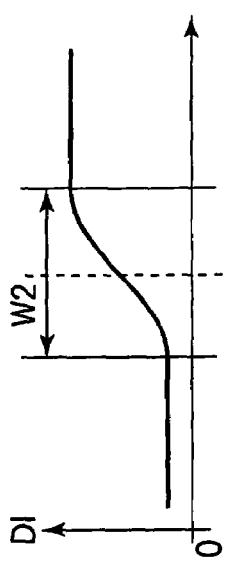
FIG.10A2
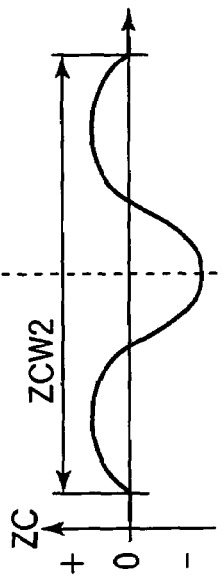
FIG.10B2
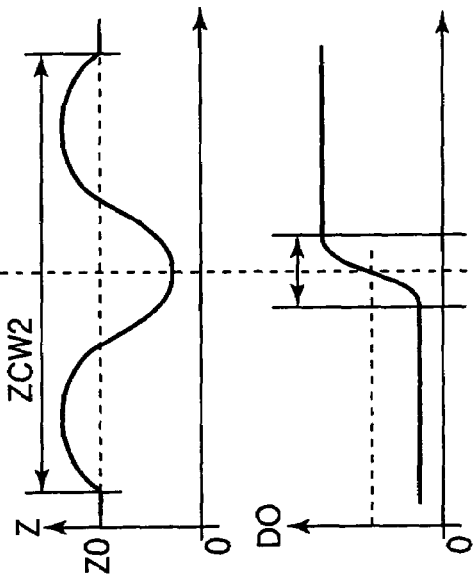
FIG.10C2
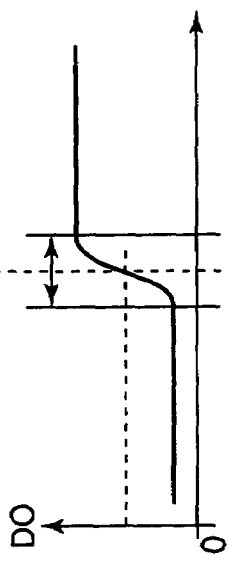
FIG.10D2

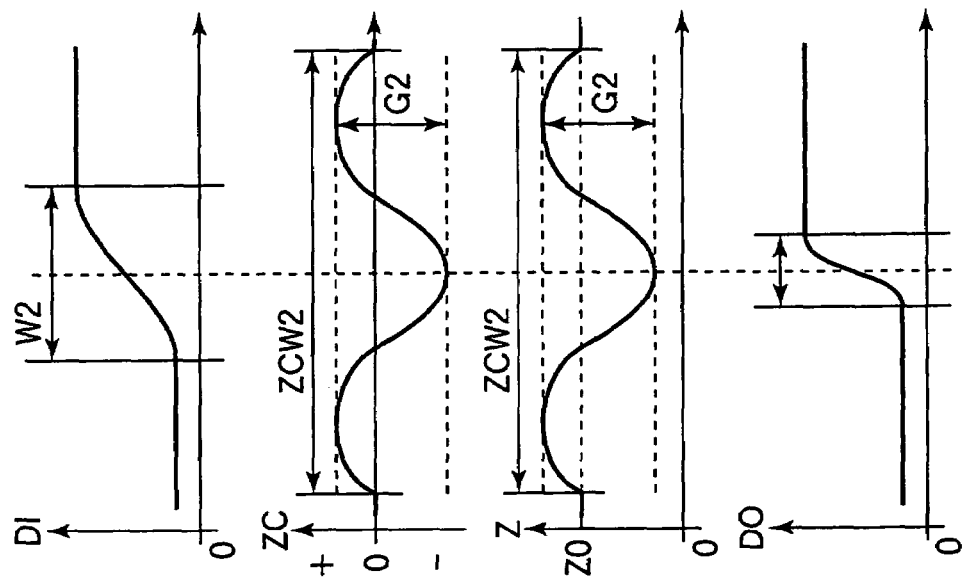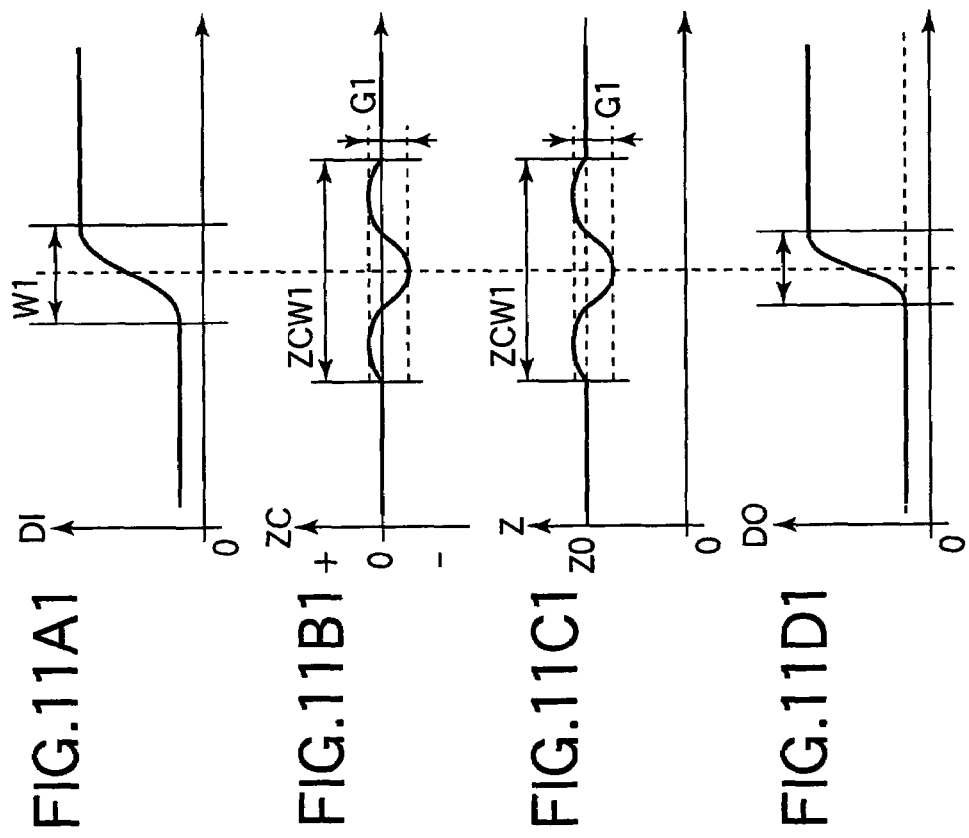

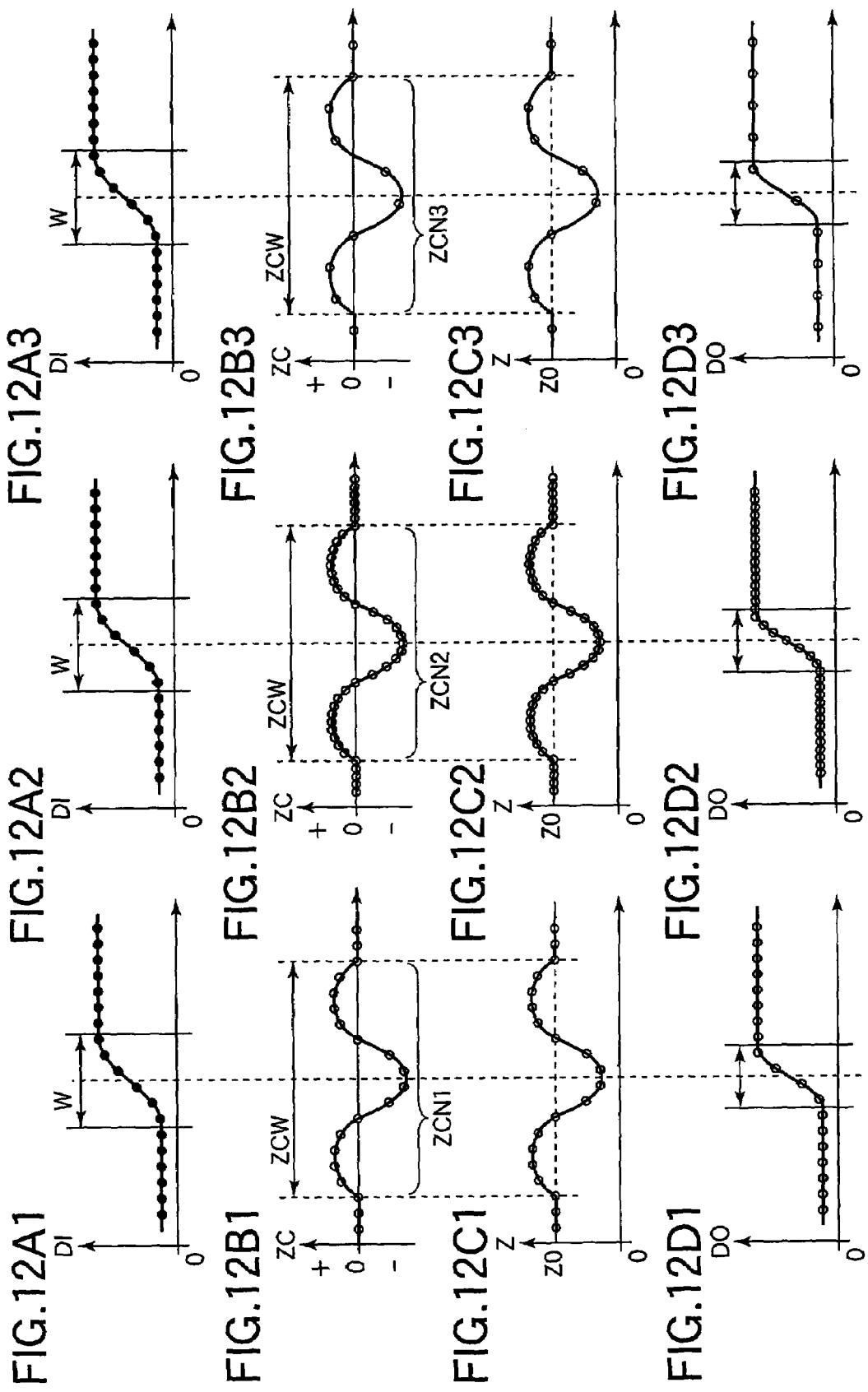

FIG.22
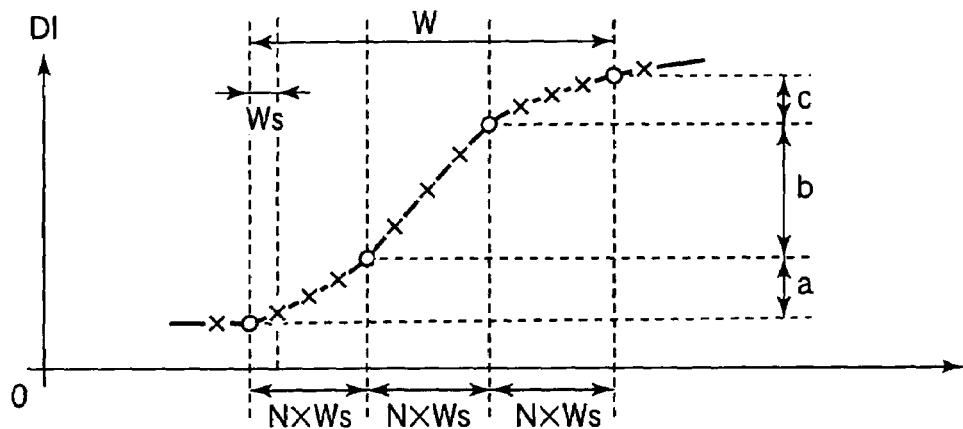
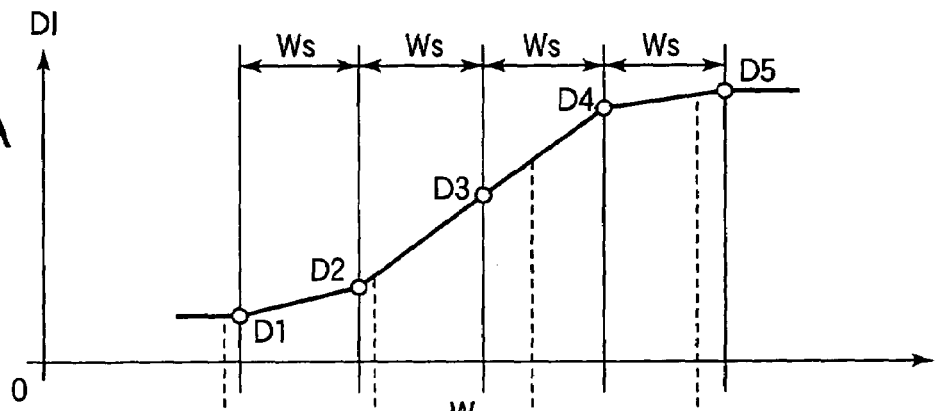
FIG.23A
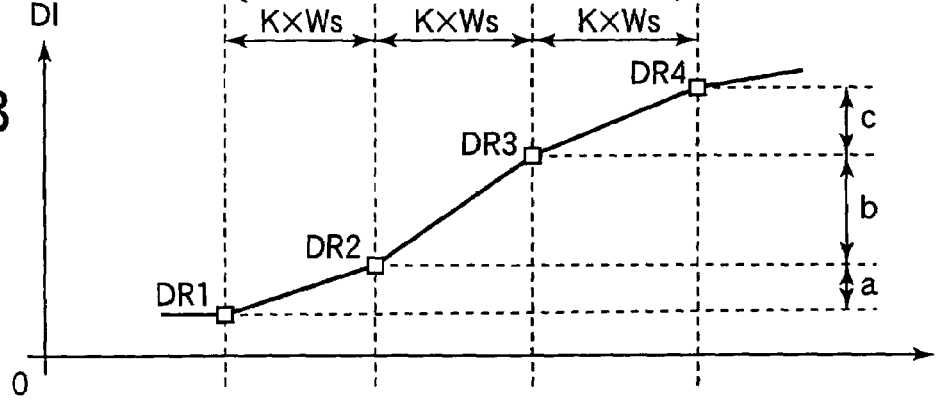
FIG.23B

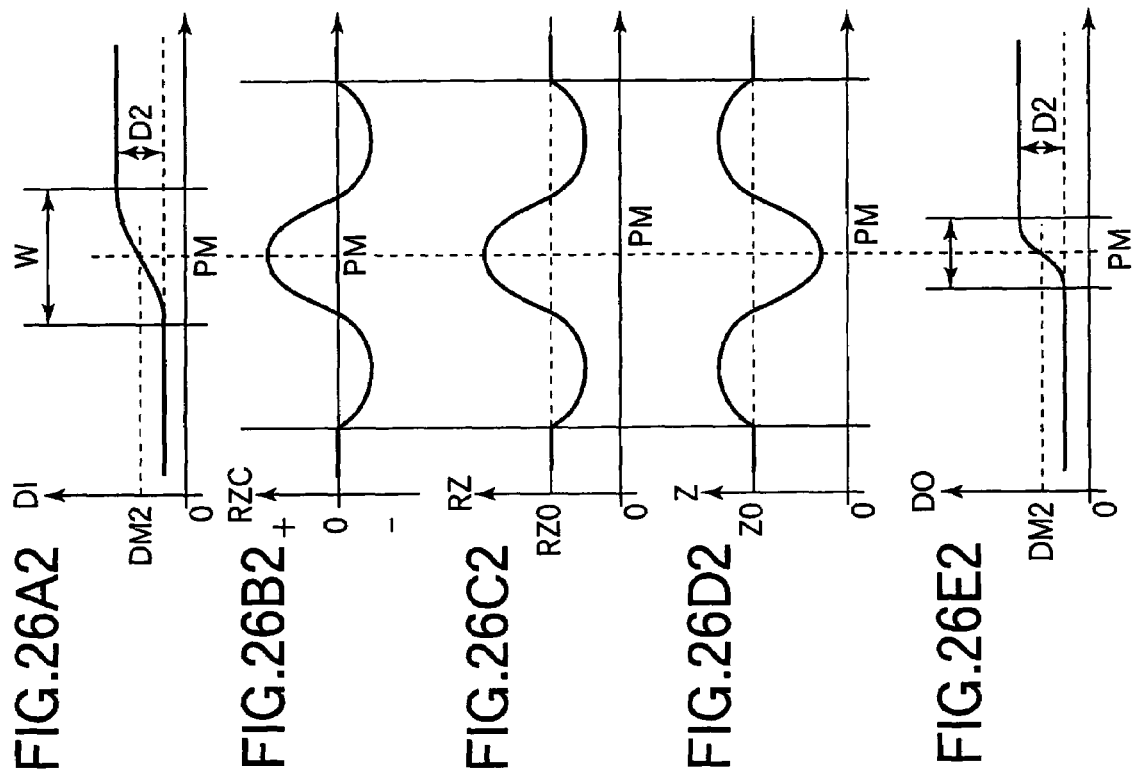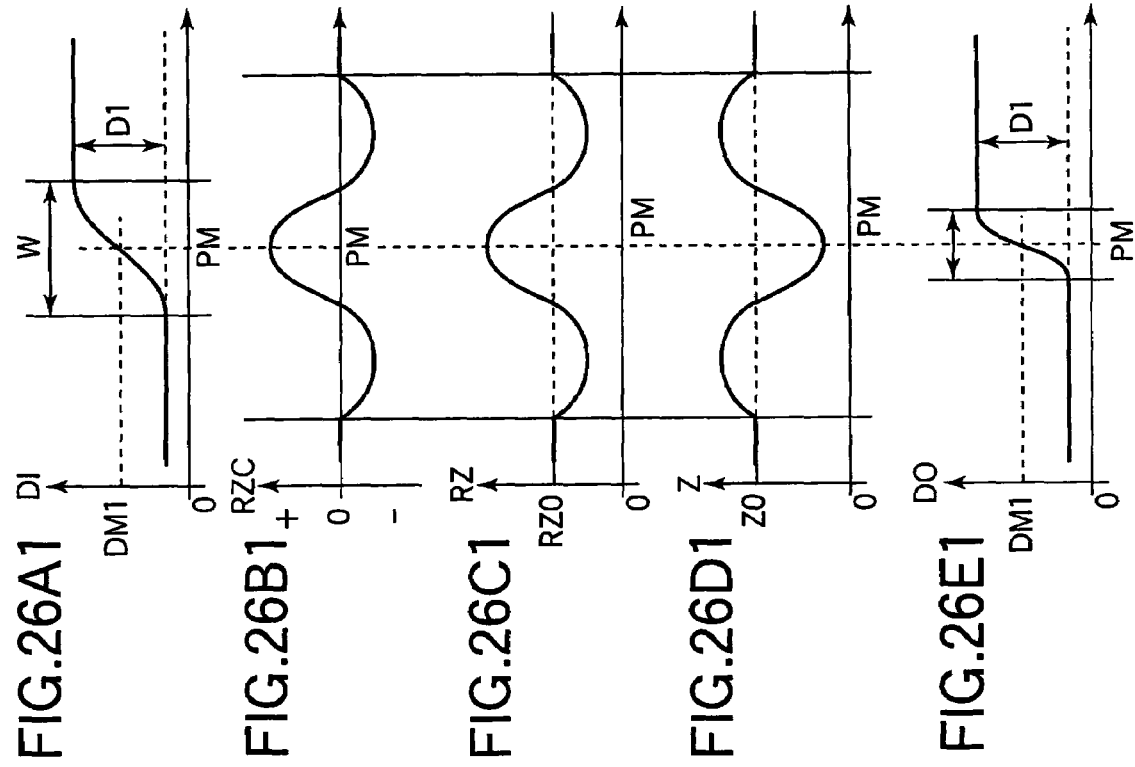

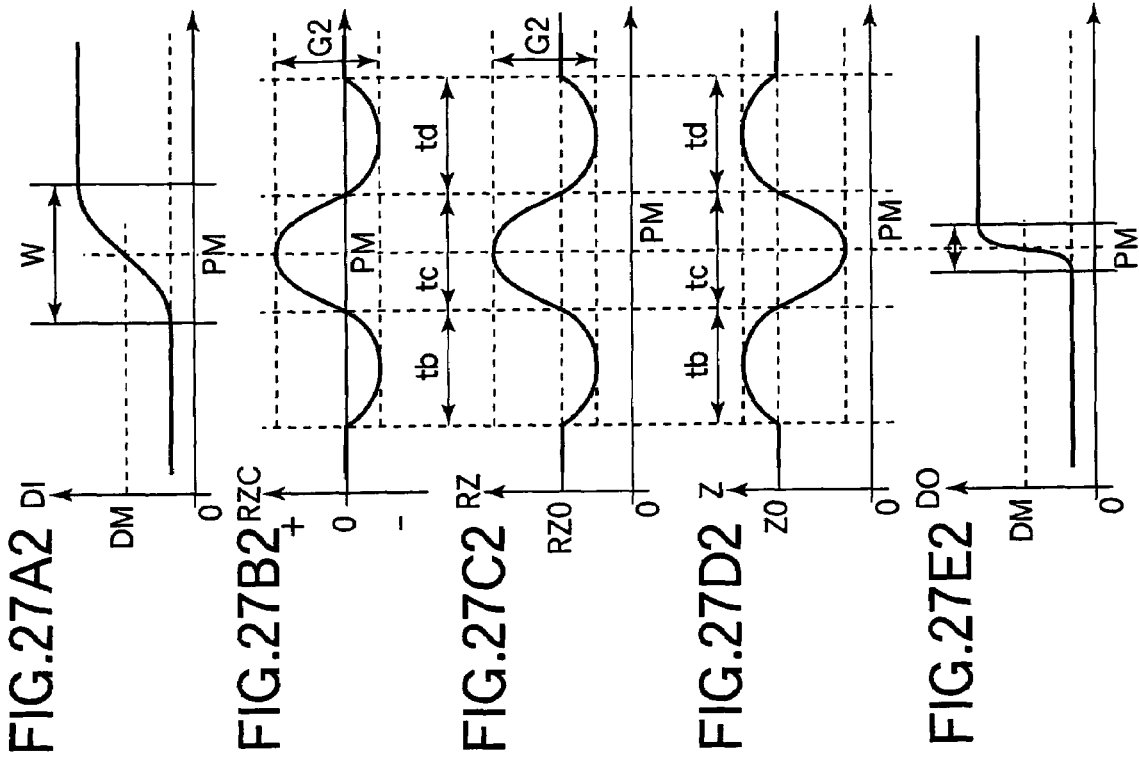
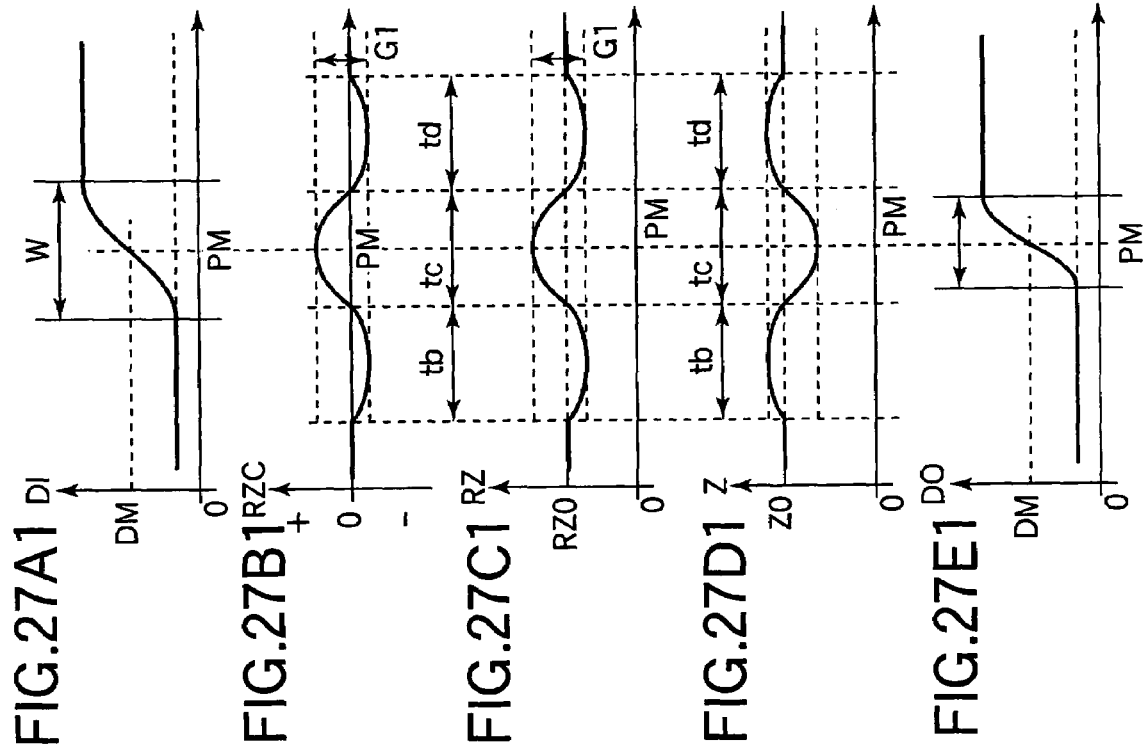

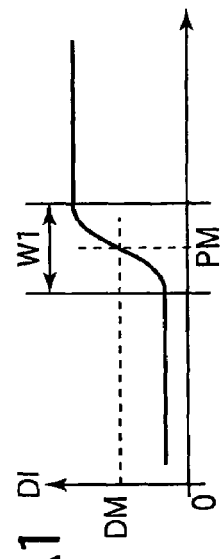
FIG.28A1
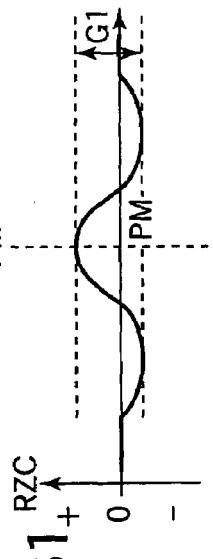
FIG.28B1
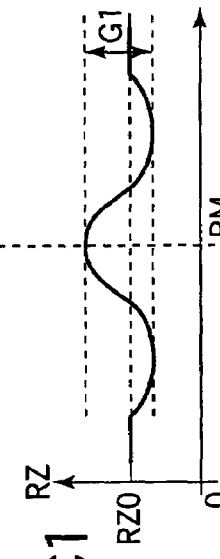
FIG.28C1
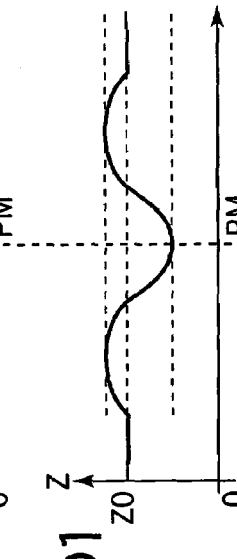
FIG.28D1
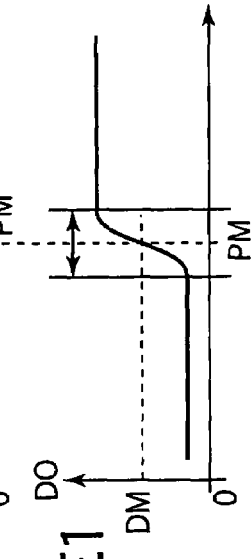
FIG.28E1
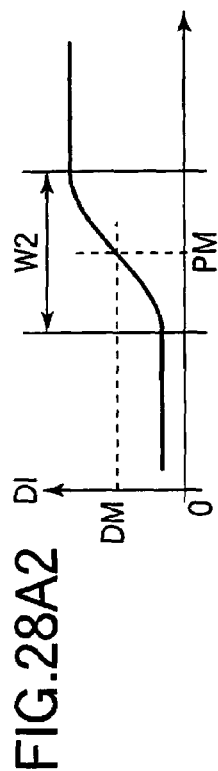
FIG.28A2
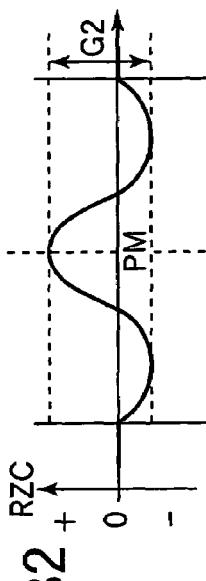
FIG.28B2
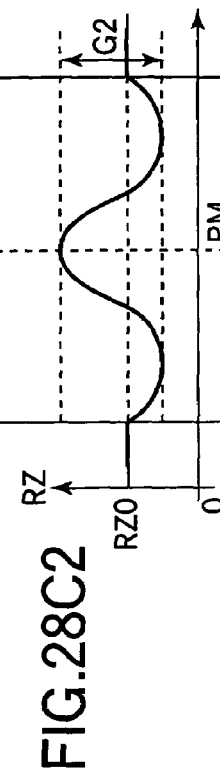
FIG.28C2
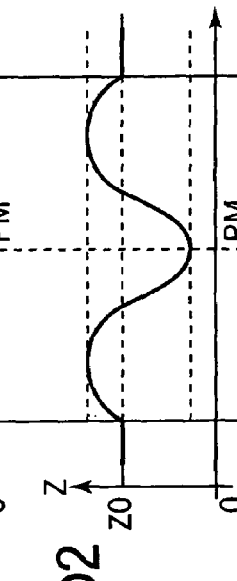
FIG.28D2
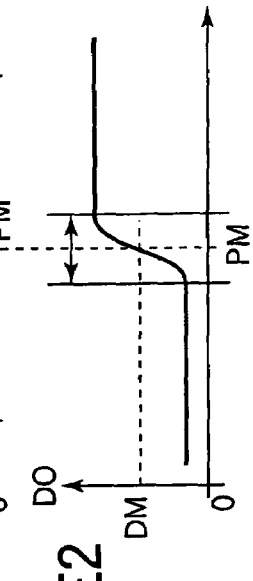
FIG.28E2

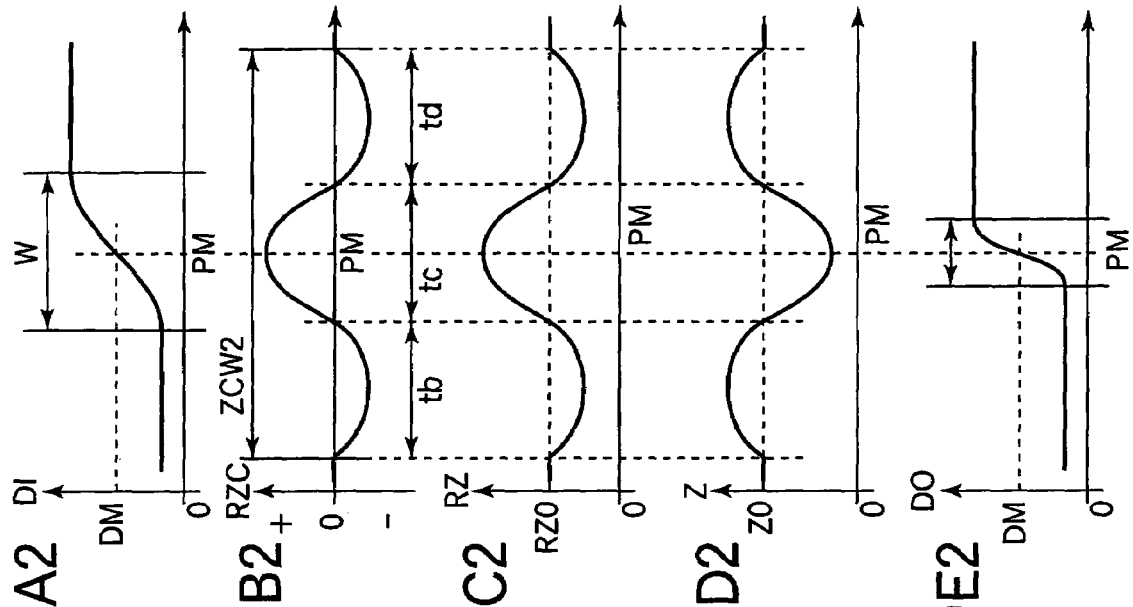
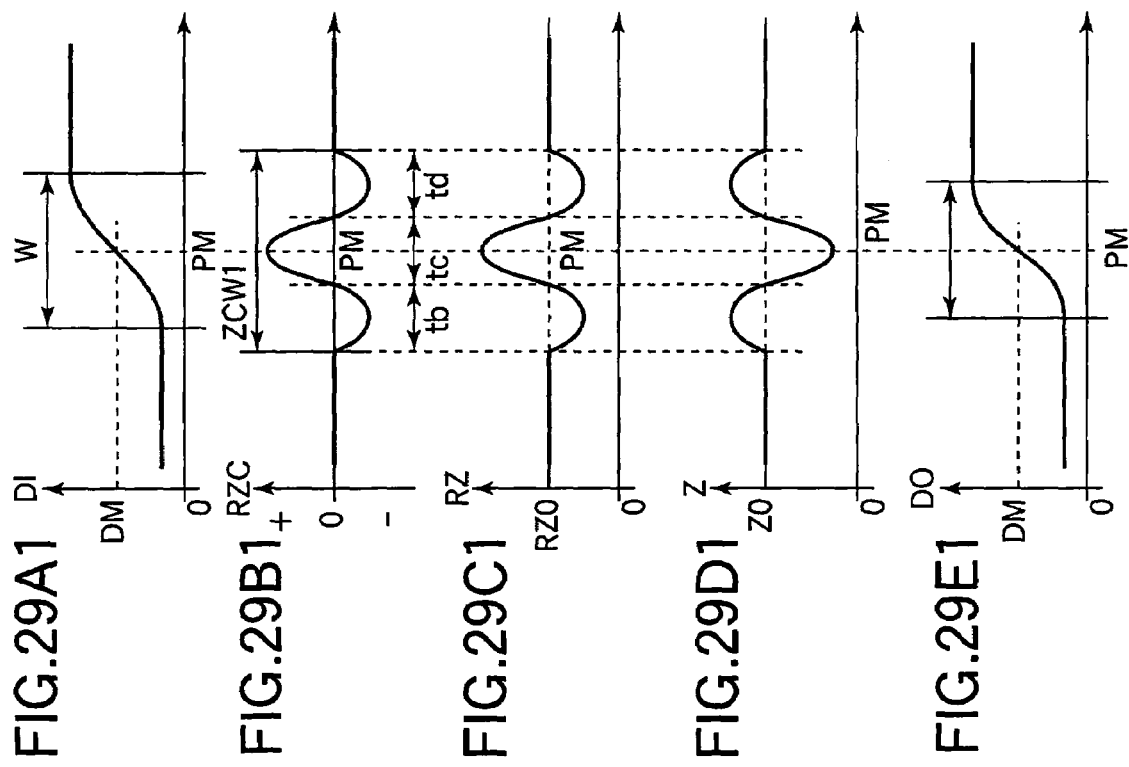

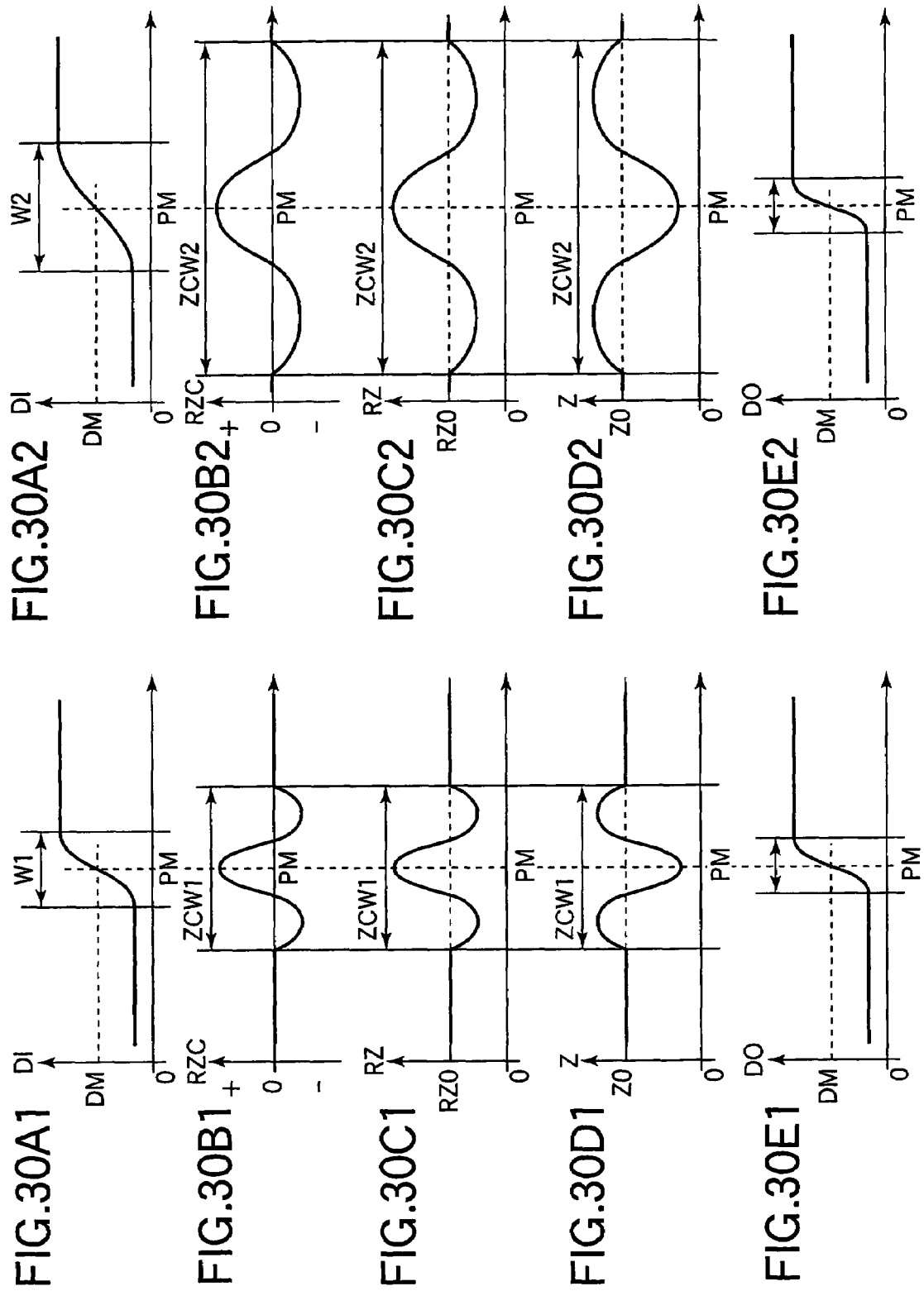

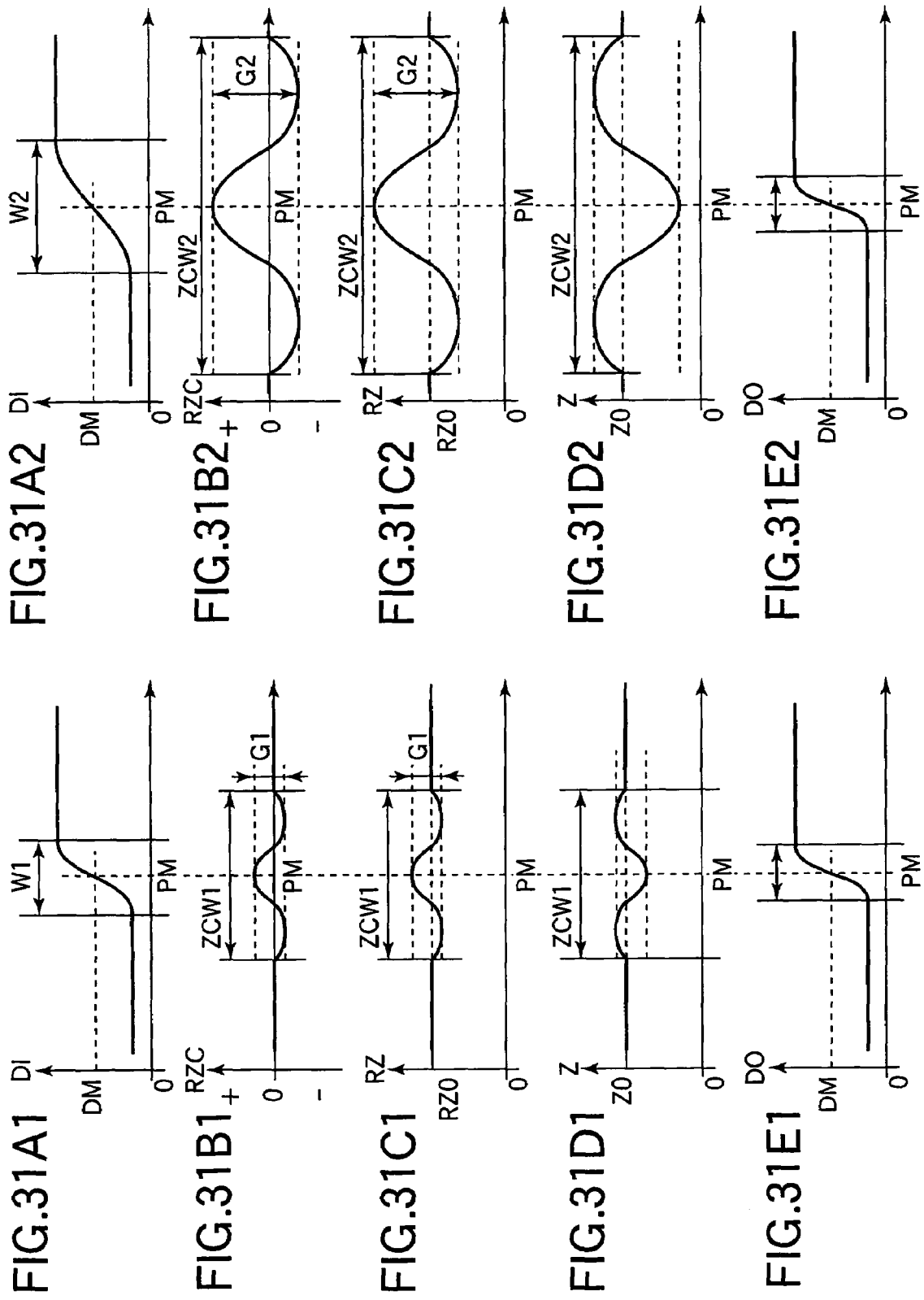

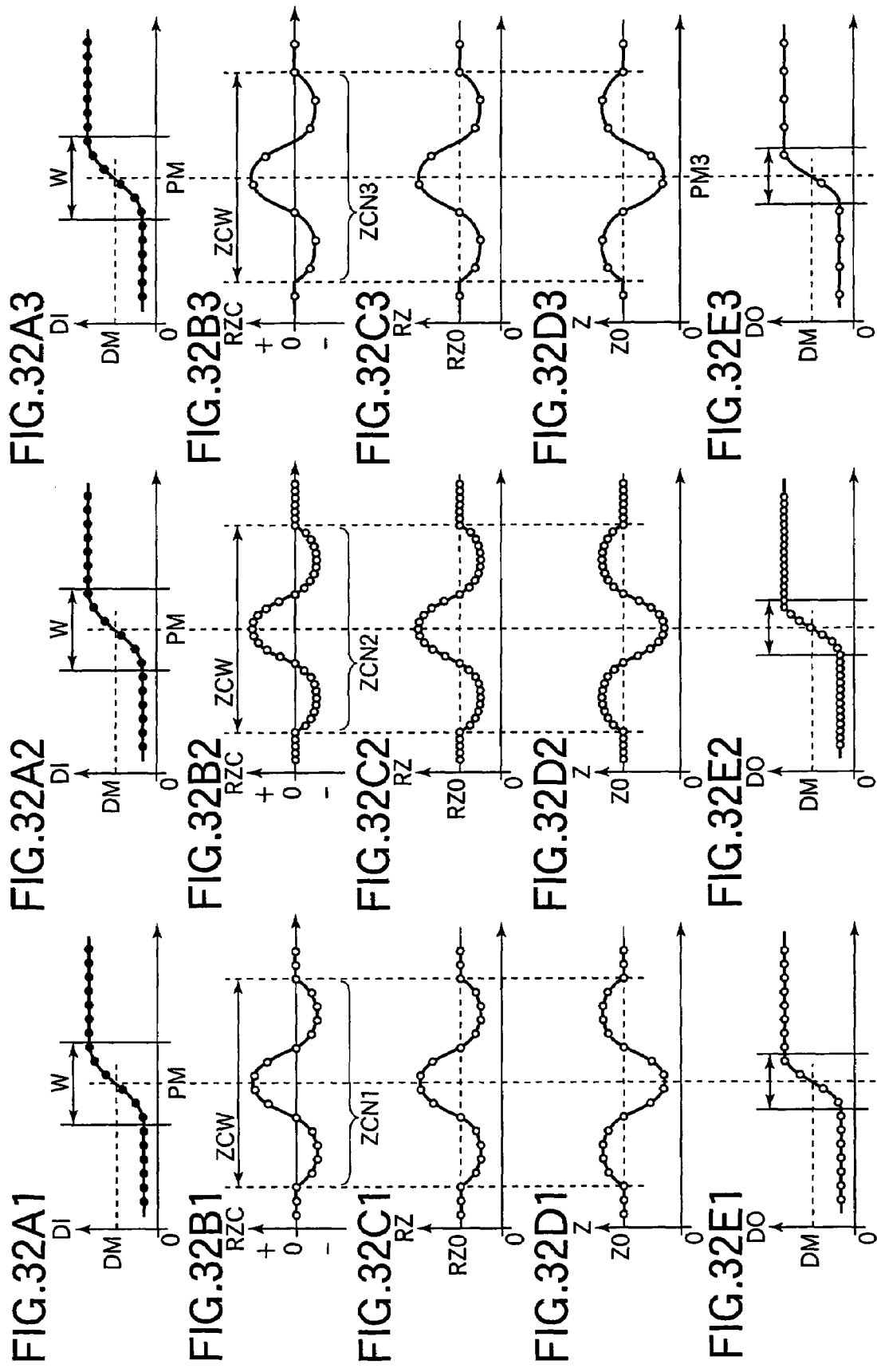

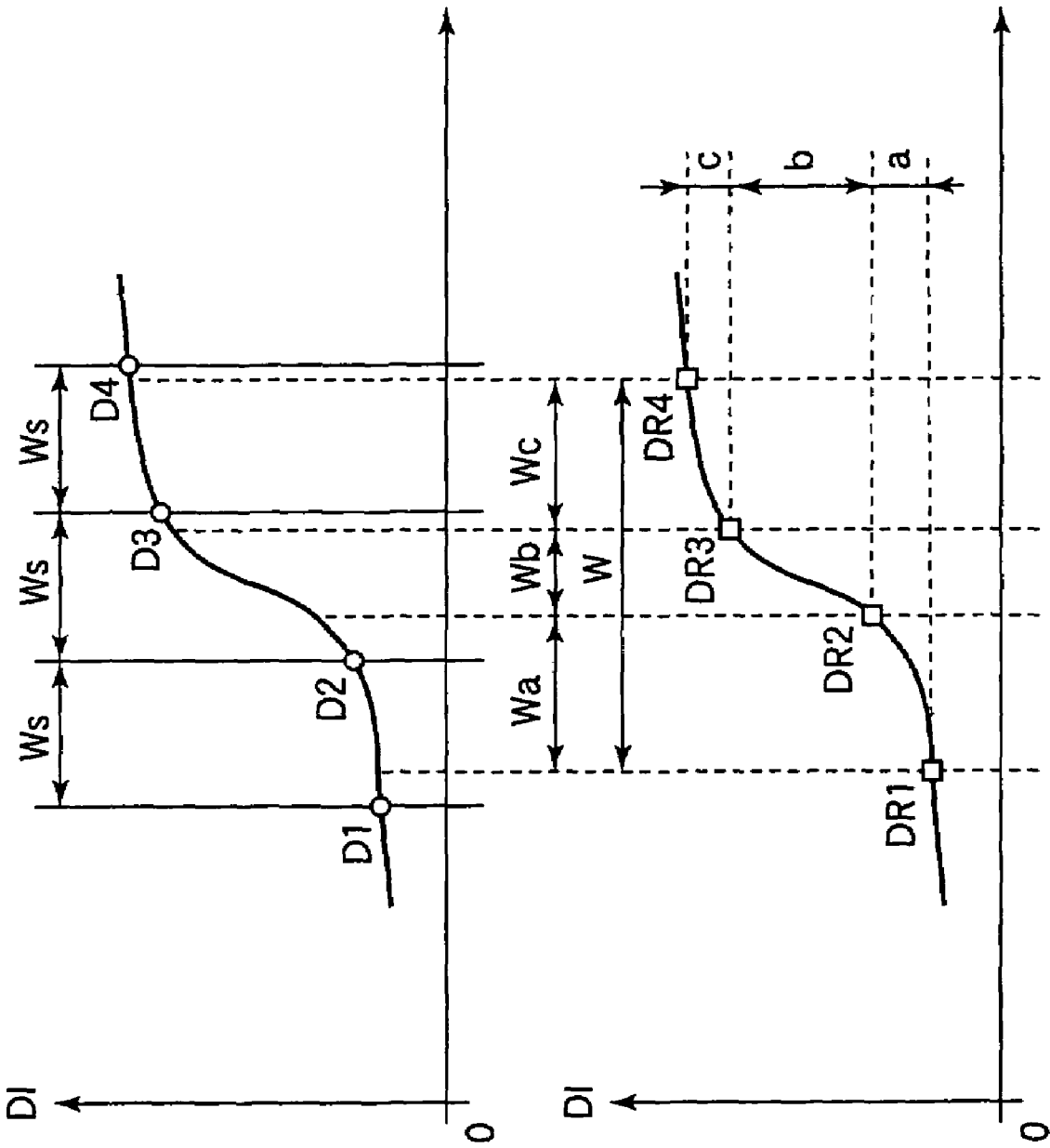

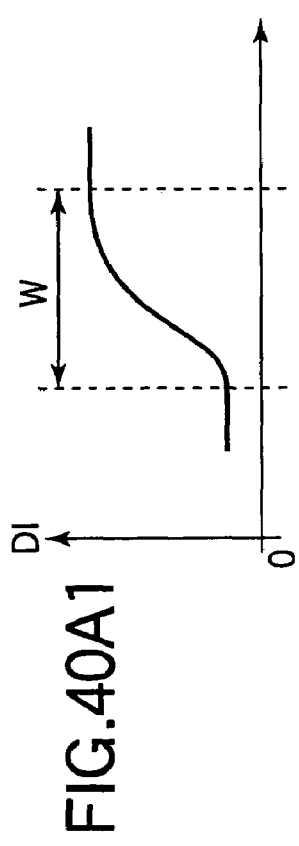
FIG.40A1
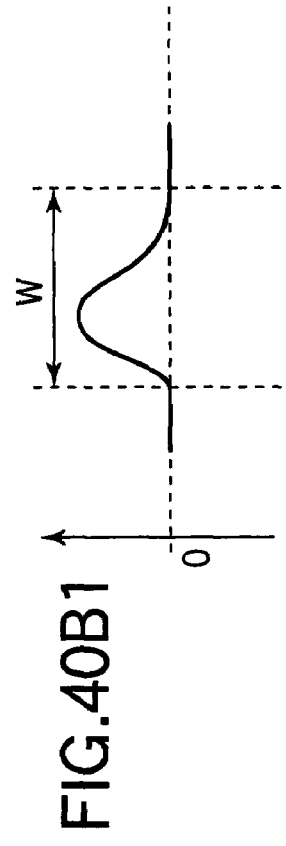
FIG.40B1
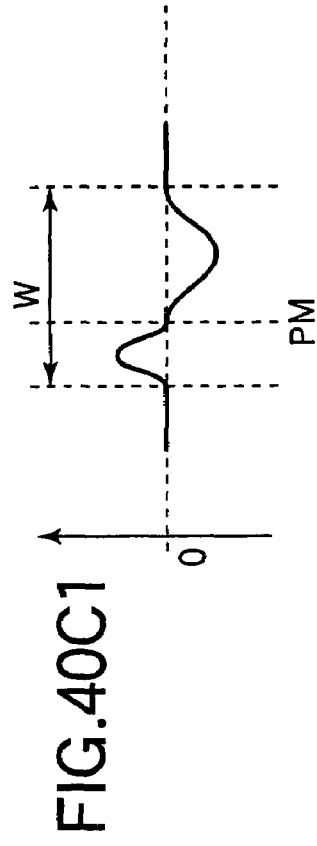
FIG.40C1
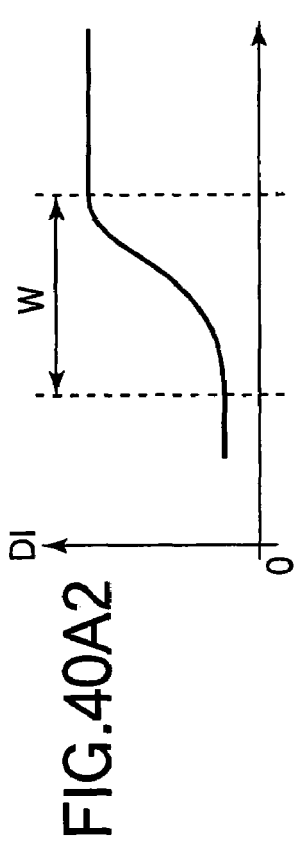
FIG.40A2
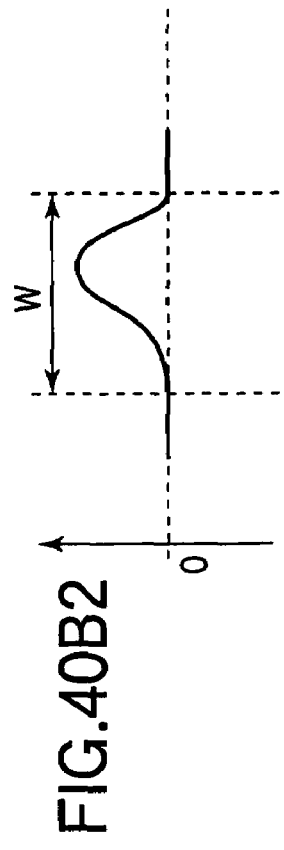
FIG.40B2
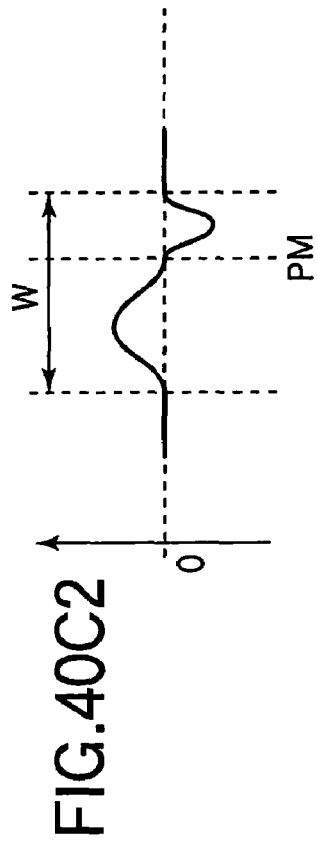
FIG.40C2

EDGE-DIRECTED IMAGES SHARPENING METHOD

This application is a national stage entry of PCT/JP03/13726 filed on Oct. 27, 2003 which claims priority to JP 2002-369479 filed on Dec. 20, 2002.

TECHNICAL FIELD

The present invention relates to an image processing apparatus which performs a conversion of pixel number of a digital image at any given ratio and an image display apparatus including the image processing apparatus, as well as an image processing method of performing a conversion of pixel number of a digital image at any given ratio and an image display method using the image processing method, and particularly relates to a conversion of pixel number at an edge portion of a digital image.

BACKGROUND ART

One image processing method at an edge portion of an image is disclosed in, for example, Japanese Patent Kokai (Laid-Open) Publication No. 2002-16820. In this image processing method, absolute values of derivatives of an input image signal are calculated, an average of the absolute values is calculated, subtractions between the calculated absolute values and the calculated average are calculated, and a scaling ratio of the input image signal is controlled in accordance with the subtractions.

Further, another image processing method at an edge portion of an image is disclosed in, for example, Japanese Patent Kokai (Laid-Open) Publication No. 2000-101870. In this image processing method, a control signal is generated from a high-frequency component of an input image signal, and a phase of an interpolation pixel is controlled by the control signal.

However, the conventional image processing methods described above improve sharpness of an edge portion in accordance with an amount of the high-frequency component of the input image signal, so that there is a problem that sharpness of an edge portion with a small change in a level of the image signal is less improved than sharpness of an edge portion with a great change in a level of the image signal. Therefore, it was difficult to improve sharpness of the entire image in proper quantities.

Accordingly, an object of the present invention is to provide an image processing apparatus, an image display apparatus, an image processing method, and an image display method, which can properly improve sharpness of an edge portion of an image.

DISCLOSURE OF INVENTION

The image processing apparatus of the present invention includes an edge width detection circuit which detects an edge portion of image data and outputs an edge width of the detected edge portion, a ratio control amount generation circuit which generates a ratio control amount in accordance with the edge width, a ratio generation circuit which generates a conversion ratio in accordance with the ratio control amount, and a pixel number conversion circuit which performs a conversion of pixel number of the image data using the conversion ratio.

BRIEF DESCRIPTION OF THE DRAWINGS

FIGS. 5A1 to 5D1 and FIGS. 5A2 to 5D2 are diagrams for describing a method of controlling a conversion ratio (a relationship of a ratio control amount to an edge width and a difference of an edge portion) in the first embodiment of the present invention;

FIGS. 6A1 to 6D1 and FIGS. 6A2 to 6D2 are diagrams for describing a method of controlling a conversion ratio (a relationship between amplitude of a ratio control amount and steepness of a change of an edge portion in an output image) in the first embodiment of the present invention;

FIGS. 7A1 to 7D1 and FIGS. 7A2 to 7D2 are diagrams for describing a method of controlling a conversion ratio (when amplitude of a ratio control amount is changed in accordance with an edge width of an input image) in the first embodiment of the present invention;

FIGS. 8A1 to 8D1 and FIGS. 8A2 to 8D2 are diagrams for describing a method of controlling a conversion ratio (a relationship between a generation period of ratio control amount and steepness of an edge portion in an output image) in the first embodiment of the present invention;

FIGS. 10A1 to 10D1 and FIGS. 10A2 to 10D2 are diagrams for describing a method of controlling a conversion ratio (when a generation period of ratio control amount is changed in accordance with an edge width of an input image) in the first embodiment of the present invention;

FIGS. 11A1 to 11D1 and FIGS. 11A2 to 11D2 are diagrams for describing a method of controlling a conversion ratio (when both a generation period and amplitude of a ratio control amount are changed in accordance with an edge width of an input image) in the first embodiment of the present invention;

FIGS. 12A1 to 12D1, FIGS. 12A2 to 12D2, and FIGS. 12A3 to 12D3 are diagrams for describing a method of controlling a conversion ratio (a relationship between a predetermined reference conversion ratio and number of ratio-control-amount data items) in the first embodiment of the present invention;

FIG. 22 is a diagram for describing operation of the edge width detection circuit in the fourth embodiment of the present invention;

FIGS. 23A and 23B are diagrams for describing operation of an edge width detection circuit in the fourth embodiment of the present invention;

FIGS. 26A1 to 26E1 and FIGS. 26A2 to 26E2 are diagrams for describing a method of controlling a conversion ratio (a relationship of a ratio control amount to an edge width and a difference of an edge portion) in the fourth embodiment of the present invention;

FIGS. 27A1 to 27E1 and FIGS. 27A2 to 27E2 are diagrams for describing a method of controlling a conversion ratio (a relationship between amplitude of a ratio control amount and steepness of a change of an edge portion in an output image) in a fifth embodiment of the present invention;

FIGS. 28A1 to 28E1 and FIGS. 28A2 to 28E2 are diagrams for describing a method of controlling a conversion ratio (when amplitude of a ratio control amount is changed in accordance with an edge width of an input image) in the sixth embodiment of the present invention;

FIGS. 29A1 to 29E1 and FIGS. 29A2 to 29E2 are diagrams for describing a method of controlling a conversion ratio (a relationship between a generation period of ratio control amount and steepness of an edge portion in an output image) in a seventh embodiment of the present invention;

FIGS. 30A1 to 30E1 and FIGS. 30A2 to 30E2 are diagrams for describing a method of controlling a conversion ratio (when a generation period of ratio control amount is changed in accordance with an edge width of an input image) in the eighth embodiment of the present invention;

FIGS. 31A1 to 31E1 and FIGS. 31A2 to 31E2 are diagrams for describing a method of controlling a conversion ratio (when both a generation period and amplitude of a ratio control amount are changed in accordance with an edge width of an input image) in a ninth embodiment of the present invention;

FIGS. 32A1 to 32E1, FIGS. 32A2 to 32E2, and FIGS. 32A3 to 32E3 are diagrams for describing a method of controlling a conversion ratio (a relationship between a predetermined reference conversion ratio and number of ratio-control-amount data items) in a tenth embodiment of the present invention;

FIGS. 38A and 38B are diagrams for describing operation of an edge width detection circuit in the thirteenth embodiment of the present invention;

FIGS. 40A1 to 40C1 and FIGS. 40A2 to 40C2 are diagrams for describing operation of an edge reference position detection circuit in the fourteenth embodiment of the present invention;

BEST MODE FOR CARRYING OUT THE INVENTION

First Embodiment

Figure 1A:
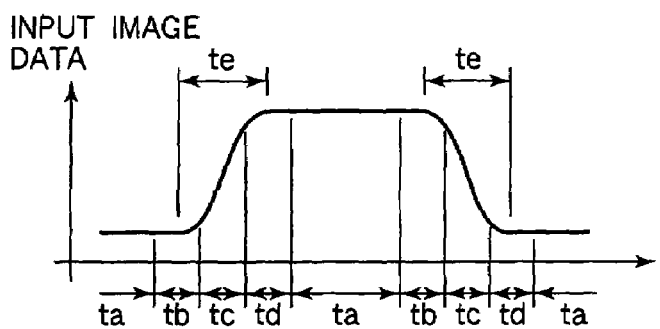
FIGS. 1A and 1B are diagrams for describing an image processing method in a first embodiment of the present invention (in the case of a conversion for scaling-up)
Figure 1B:
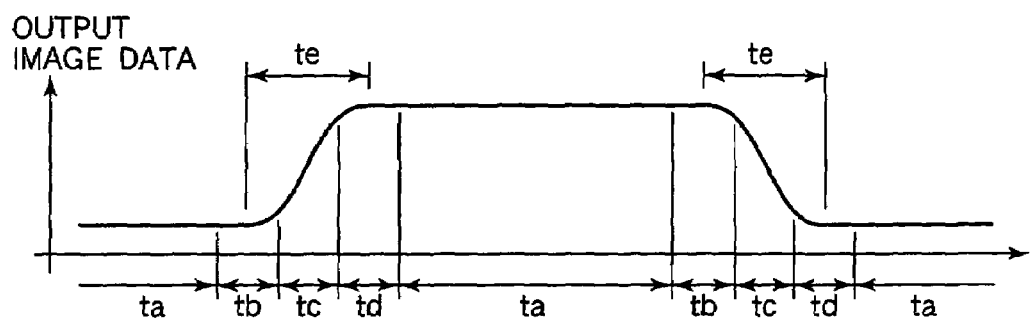

FIGS. 1A and 1B are diagrams for describing an image processing method (in the case of a conversion for scaling-up) in a first embodiment of the present invention. FIG. 1A shows input image data, and FIG. 1B shows output image data obtained by performing a conversion of input image data for scaling-up. In FIGS. 1A and 1B, a horizontal axis indicates a horizontal or vertical position of the image, and a vertical axis indicates a level (brightness) of the image data.

Figure 2A:
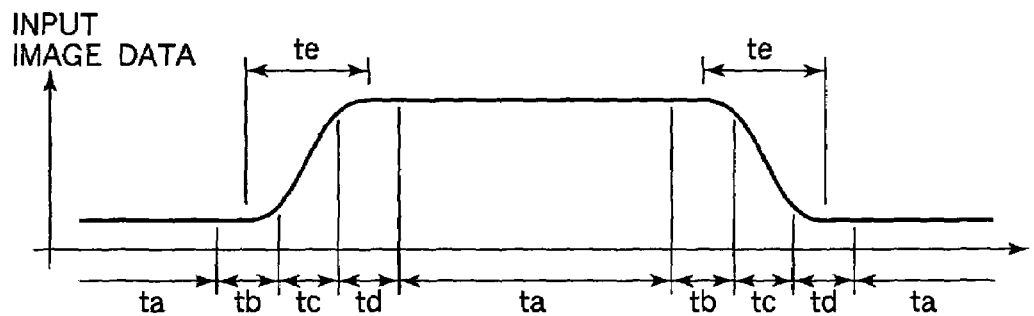
FIGS. 2A and 2B are diagrams for describing the image processing method in the first embodiment of the present invention (in the case of a conversion for scaling-down)
Figure 2B:
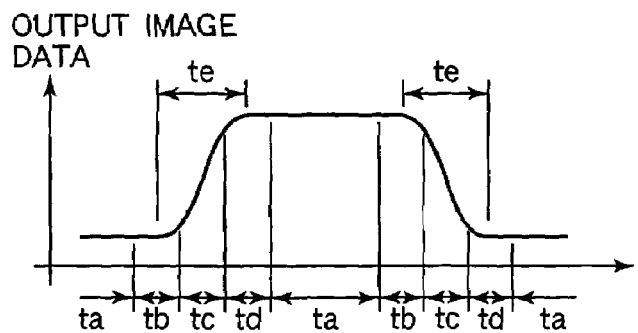

Further, FIGS. 2A and 2B are diagrams for describing an image processing method (in the case of a conversion for scaling-down) in the first embodiment of the present invention. FIG. 2A shows input image data, and FIG. 2B shows output image data obtained by performing a conversion of input image data for scaling-down. In FIGS. 2A and 2B, a horizontal axis indicates a horizontal or vertical position of the image, and a vertical axis indicates a level (brightness) of the image data.

With reference to FIGS. 1A and 1B and FIGS. 2A and 2B, a pixel number conversion procedure for a conversion of horizontal pixel number for scaling-up or scaling-down will be described below. The conversion of vertical pixel number for scaling-up or scaling down can be implemented in the same procedure as the conversion of horizontal pixel number for scaling-up or scaling down.

In the conversion of horizontal pixel number, a change in the level of the input image data is detected first, and an edge portion (an edge duration) te in the input image data is detected.

Next, a period including at least a part of the edge portion te (a duration of (tb+tc+td) in FIGS. 1A and 1B or FIGS. 2A and 2B, referred to as "a generation period of ratio control amount") is determined in accordance with the edge portion te. The generation period of ratio control amount can be obtained, for example, by multiplying an edge width of the edge portion te by a constant value which is adjustable. The constant value is set manually by the user or automatically, in accordance with various factors such as a type of the image to be displayed (for example, cinema, sports, art, nature, and others), mounting environment of the display apparatus, user preferences, and so on. The generation period of ratio control amount includes three segments where the level of the image data varies: a generation period leading segment tb, a generation period central segment tc, and a generation period trailing segment td. A segment other than the generation period (tb+tc+td) of ratio control amount is referred to as a flat segment (a duration of flatness) ta.

The pixel number is converted at a constant conversion ratio Z0 in the flat segment ta of an image. The constant conversion ratio Z0 is an arbitrary ratio required to perform a conversion of an image format to scale up or down an image at an arbitrary ratio. In the case of a conversion for scaling-up which is shown in FIGS. 1A and 1B, Z0>1, and in the case of a conversion for scaling-down which is shown in FIGS. 2A and 2B, Z0<1. For example, the conversion ratio Z0 used to perform a conversion from a 640-pixel×480-line image, which is one of output formats of the personal computer (PC), to a 1024-pixel×768-line image is 1.6. Sharpness of the edge portion te in the image data can be improved without scaling up or down the flat segment ta of the image (Z0=1).

In the generation period of ratio control amount, the conversion ratio is variably controlled, depending on a control pattern of the conversion ratio determined on the basis of the edge portion te. More specifically, different conversion ratios for generating image data are used in each of the segments tb, tc, and td, which form the generation period of ratio control amount. In the subsequent description, a constant conversion ratio Z0 will be referred to as "a reference conversion ratio", so that the constant conversion ratio Z0 can be distinguished from a conversion ratio (in a period including a ratio fluctuating period) obtained by superimposing the control pattern on the constant conversion ratio Z0. To be more specific, the pixel numbers in the generation period leading segment tb and the generation period trailing segment td are converted at a higher conversion ratio than in the flat segment ta, and the pixel number in the generation period central segment tc is converted at a lower conversion ratio than in the flat segment ta, both in the conversion for scaling-up shown in FIGS. 1A and 1B and in the conversion for scaling-down shown in FIGS. 2A and 2B.

Although the conversion of horizontal pixel number has been explained in the above description, the conversion of vertical pixel number can be executed by taking the similar procedure as described above. The pixel number of input image data can be converted by taking the procedure described above both in the horizontal direction and in the vertical direction of the input image data. Further, the conversion of horizontal pixel number and the conversion of vertical pixel number can be executed successively or simultaneously. Furthermore, the horizontal conversion ratio and the vertical conversion ratio may be different.

Because the conversion of vertical pixel number and the conversion of horizontal pixel number may be performed by similar operation, the conversion of horizontal pixel number will be described as an example of the conversion of pixel number.

Figure 3:
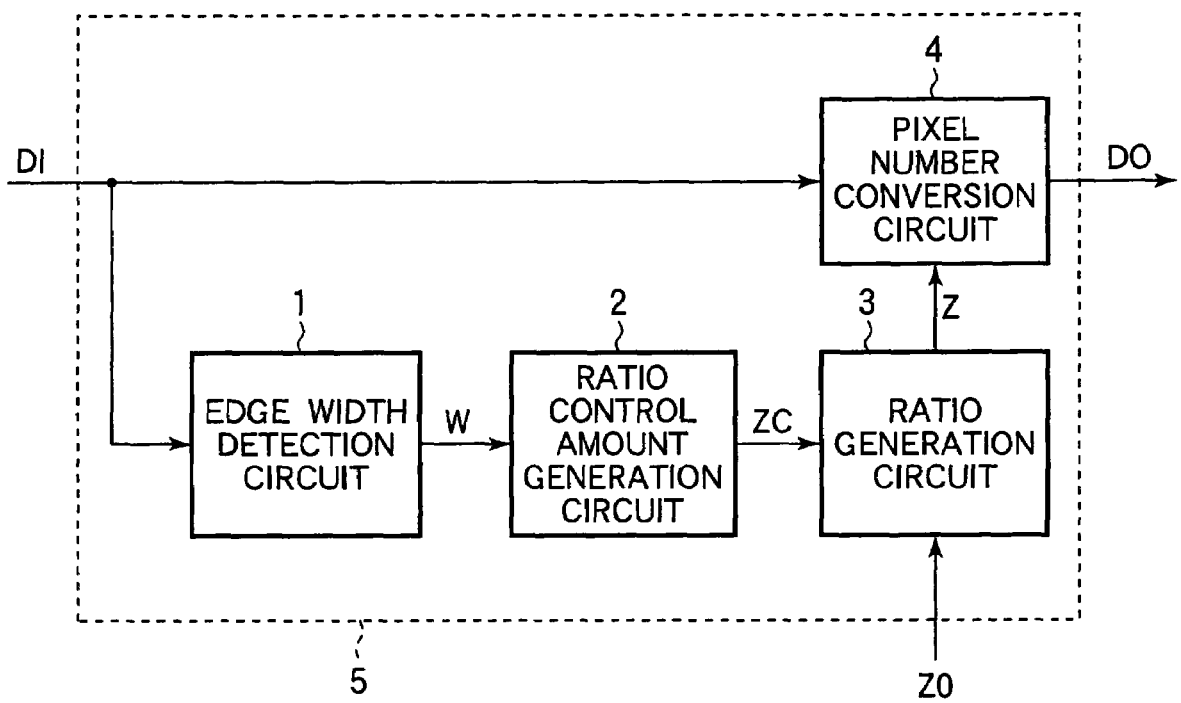
FIG. 3 is a block diagram showing a configuration of an image processing apparatus (a configuration for performing a conversion of pixel number in a vertical direction or a horizontal direction) in the first embodiment of the present invention.

FIG. 3 is a block diagram showing a configuration of an image processing apparatus in the first embodiment of the present invention (i.e., an apparatus for implementing the image processing method in the first embodiment). FIG. 3 shows a configuration for performing a conversion of pixel number in a horizontal direction (or a vertical direction). As shown in FIG. 3, an image processing apparatus 5 of the first embodiment includes an edge width detection circuit 1, a ratio control amount generation circuit 2, a ratio generation circuit 3, and a pixel number conversion circuit 4.

Input image data DI is input to the edge width detection circuit 1 and the pixel number conversion circuit 4. The edge width detection circuit 1 detects a duration when the image level of the input image data DI varies (increases or decreases) in the horizontal direction, for example, as an edge width W, and outputs the edge width W. The edge width detection circuit 1 detects a duration when the variation of the image level is within a predetermined range, as an edge width W. For example, a minimum value Wmin and a maximum value Wmax of the width of the section to be detected as an edge portion are set in advance. If the duration when the image level varies exceeds the maximum value Wmax or if the duration when the image level varies falls short of the minimum value Wmin, the corresponding section is not judged to be an edge portion, and the edge width W is not detected. The edge width W output from the edge width detection circuit 1 is input to the ratio control amount generation circuit 2.

In the description given above, the duration when the image level of the input image data DI horizontally varies (increase or decrease) is detected as the edge width W, but a detection method of the edge width W is not limited to the above-mentioned method. Other methods such as ones shown in FIG. 20 to FIGS. 23A and 23B, FIG. 33 to FIGS. 38A and 38B, and their description may be adopted as the method of detecting the edge width W.

The ratio control amount generation circuit 2 generates a ratio control amount ZC used to control a conversion ratio in accordance with the edge width W, and outputs the ratio control amount ZC. The ratio control amount ZC output from the ratio control amount generation circuit 2 is input to the ratio generation circuit 3.

The ratio generation circuit 3 generates a conversion ratio Z in accordance with the ratio control amount ZC and the arbitrary reference conversion ratio Z0 given in advance, and outputs the conversion ratio Z. The conversion ratio Z output from the ratio generation circuit 3 is input to the pixel number conversion circuit 4.

The pixel number conversion circuit 4 performs a conversion of pixel number in the horizontal direction of the input image data DI at the conversion ratio Z, and outputs the converted image data as output image data DO.

FIGS. 4A to 4D are diagrams for describing operation of the edge width detection circuit 1, the ratio control amount generation circuit 2, and the ratio generation circuit 3 in the image processing apparatus of the first embodiment. In FIGS. 4A to 4D, the horizontal axis indicates a horizontal position of the image. The vertical axis in FIG. 4A indicates a level of the input image data DI, the vertical axis in FIG. 4B indicates the ratio control amount ZC, the vertical axis in FIG. 4C indicates the conversion ratio Z, and the vertical axis in FIG. 4D indicates a level of the output image data DO.

Figure 4A:
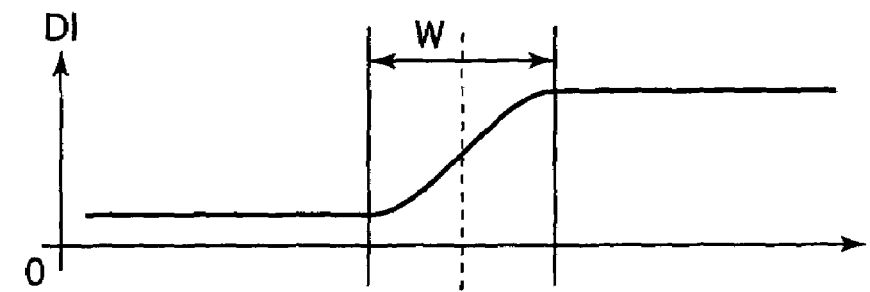
FIGS. 4A to 4D are diagrams for describing operation of an edge width detection circuit, a ratio control amount generation circuit, and a ratio generation circuit in the image processing apparatus shown in FIG. 3.
Figure 4B:
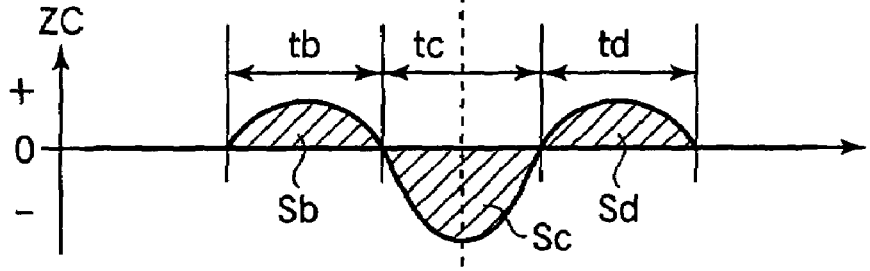

The edge width detection circuit 1 detects the width (edge width) W of the duration when the level of the input image data DI varies (see FIG. 4A). The duration when the level of the input image data DI varies is a period in which the level increases or decreases, for example.

The ratio control amount generation circuit 2 generates the ratio control amount ZC in accordance with the detected edge width W. The ratio control amount ZC is positive in the generation period leading segment tb, negative in the generation period central segment tc, positive in the generation period trailing segment td, and becomes zero in the other segments (see FIG. 4B).

The ratio generation circuit 3 superimposes the ratio control amount ZC on a reference conversion ratio Z0 given in advance, thereby generating a conversion ratio Z. The conversion ratio Z can be obtained by the expression (1) given below, for example:

$$Z=Z0\times(1+ZC) \quad (1)$$

Figure 4C:
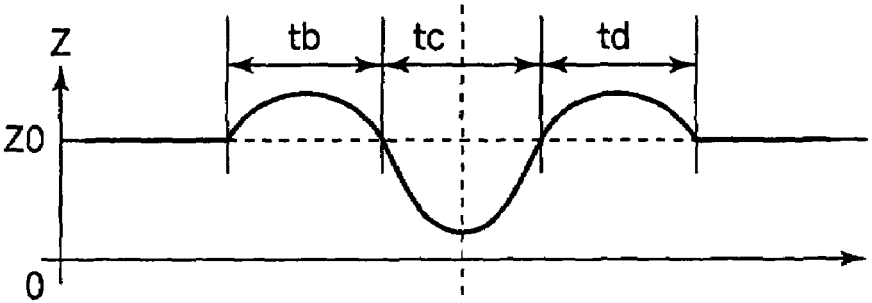

As a result, the pixel number is converted at a conversion ratio higher than the reference conversion ratio Z0 in the generation period leading segment tb and the generation period trailing segment td, and is converted at a conversion ratio lower than the reference conversion ratio Z0 in the generation period central segment tc (see FIG. 4C).

Figure 4D:
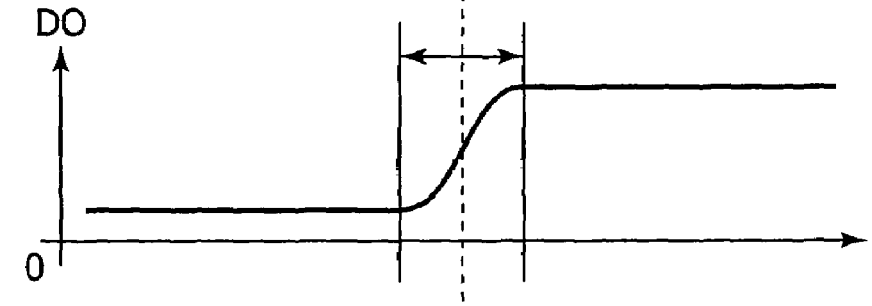

Because the conversion ratio Z in the generation period central segment tc is lower than the reference conversion ratio Z0, the edge width of the output image data can be made smaller than the edge width W of the input image data (see FIG. 4D). With the conversion ratio Z obtained by superimposing the ratio control amount ZC on the reference conversion ratio (constant conversion ratio) Z0 as described above, the image data of the edge portion can be changed more steeply, so that sharpness of the image can be improved.

The ratio control amount ZC is generated in accordance with the detected edge width W in such a manner that the total sum of the ratio control amount ZC in the generation period (the total period of the segments tb, tc, and td) of ratio control amount becomes zero. A signal of the ratio control amount ZC is generated in such a manner that Sb+Sd=Sc, where Sb, Sc, and Sd are areas of hatched portions in the segments tb, tc, and td respectively in FIG. 4B. Accordingly, the conversion ratio Z of the image increases and decreases in some areas, but the average of the conversion ratio Z across the entire image equals the reference conversion ratio Z0. The edge portions of individual lines of the image can have no deviation by causing the total sum of the ratio control amount ZC to be zero.

FIGS. 5A1 to 5D1 and FIGS. 5A2 to 5D2 are diagrams for describing a method of controlling a conversion ratio (a relationship of a ratio control amount to an edge width and a difference of an edge portion) in the first embodiment of the present invention. FIGS. 5A1 and 5A2 show input image data DI, FIGS. 5B1 and 5B2 show a ratio control amount ZC, FIGS. 5C1 and 5C2 show a conversion ratio Z, and FIGS. 5D1 and 5D2 show output image data DO.

FIGS. 5A1 to 5D1 shows a case where an edge width of the edge portion of the input image data DI is W and a difference of the edge portion is D1. FIGS. 5A2 to 5D2 shows a case where an edge width of the edge portion of the input image data DI is W and a difference of the edge portion is D2. The difference D1 of the edge portion in FIGS. 5A1 to 5D1 is greater than the difference D2 of the edge portion in FIGS. 5A2 to 5D2 (see FIGS. 5A1 and 5A2).

The difference of the edge portion in FIGS. 5A1 to 5D1 differs from the difference of the edge portion in FIGS. 5A2 to 5D2, but the ratio control amount ZC is generated in accordance with the same edge width W in both cases. Accordingly, as can be understood from FIGS. 5B1 and 5B2, the ratio control amount ZC to be generated is alike even when the differences of the edge portion are different. Therefore, in spite of the different differences of the edge portion, the conversion ratio Z varies in the similar manner (see FIGS. 5C1 and 5C2), and the edge width of the output image data DO can be reduced to almost the same size (see FIGS. 5D1 and 5D2). As has been described, in an example shown in FIGS. 5A1 to 5D1 and FIGS. 5A2 to 5D2, the ratio control amount ZC is determined by the edge width W of the input image data DI and is independent of the difference of the edge portion.

When the conversion ratio is controlled to change the edge portion more steeply as a difference of the edge portion becomes greater, sharpness may not be improved sufficiently in an edge portion with a small difference of the edge portion, because the ratio control amount is small. If the ratio control amount is increased so that sharpness can be improved sufficiently in an edge portion with a small difference of the edge portion, the image would glare because of excessive sharpness in an edge portion with a great difference of the edge portion.

In contrast to this, since the conversion ratio is controlled in accordance with the detected edge width in the first embodiment, sharpness of the edge portion can be improved in proper quantities, regardless of the value of the difference of the edge portion.

FIGS. 6A1 to 6D1 and FIGS. 6A2 to 6D2 are diagrams for describing a method of controlling a conversion ratio (a relationship between amplitude of a ratio control amount and steepness of a change of an edge portion in an output image) in the first embodiment of the present invention. FIGS. 6A1 and 6A2 show input image data DI, FIGS. 6B1 and 6B2 show a ratio control amount ZC, FIGS. 6C1 and 6C2 show a conversion ratio Z, and FIGS. 6D1 and 6D2 show output image data DO.

In FIGS. 6A1 to 6D1 and FIGS. 6A2 to 6D2, the common image data is input, and the edge width W is detected (see FIGS. 6A1 and 6A2). A ratio control amount ZC is generated in accordance with the edge width W. The generated ratio control amounts having different amplitudes are generated so that amplitude (a difference between the maximum value and the minimum value) of the ratio control amount in FIGS. 6A1 to 6D1 is G1 and amplitude of the ratio control amount in FIGS. 6A2 to 6D2 is G2. Suppose that the relationship between the amplitudes G1 and G2 of the ratio control amount is G1<G2 (see FIGS. 6B1 and 6B2). In FIGS. 6A1 and 6D1 and FIGS. 6A2 to 6D2, the ratio control amount ZC is superimposed on the reference conversion ratio Z0 given in advance, and the corresponding conversion ratio Z is generated (see FIGS. 6C1 and 6C2). The conversion of pixel number is performed in accordance with the conversion ratio Z (see FIGS. 6D1 and 6D2).

As shown in FIGS. 6C1 and 6C2, the conversion ratio used for the conversion of pixel number in the generation period leading segment tb and in the generation period trailing segment td in FIGS. 6A2 to 6D2 is greater than that in FIGS. 6A1 to 6D1. The conversion ratio used for the conversion of pixel number in the generation period central segment tc in FIGS. 6A2 to 6D2 is smaller than that in FIGS. 6A1 to 6D1. Accordingly, the edge width of the converted output image in FIGS. 6A2 to 6D2 becomes smaller than that in FIGS. 6A1 to 6D1. The edge portion of the converted output image in FIGS. 6A2 to 6D2 becomes more steep than that in FIGS. 6A1 to 6D1, and a sharper image can be obtained.

As described above, by controlling the amplitude (the maximum value and the minimum value) of the ratio control amount ZC as desired (variable control), steepness and sharpness of the edge portion of the output image can be freely controlled. The amplitude of the ratio control amount can be variably controlled by multiplying the ratio control amount by an arbitrary coefficient, for example.

FIGS. 7A1 to 7D1 and FIGS. 7A2 to 7D2 are diagrams for describing a method of controlling a conversion ratio (when amplitude of a ratio control amount is changed in accordance with an edge width of an input image) in the first embodiment. FIGS. 7A1 and 7A2 show input image data DI, FIGS. 7B1 and 7B2 show a ratio control amount ZC, FIGS. 7C1 and 7C2 show a conversion ratio Z, and FIGS. 7D1 and 7D2 show output image data DO.

Image data with the edge width W1 is input in FIGS. 7A1 and 7D1. Image data with the edge width W2 is input in FIGS. 7A2 and 7D2. The relationship between the edge width W1 and the edge width W2 is W1<W2 (see FIGS. 7A1 and 7A2). A ratio control amount ZC generated with the edge width W1 in FIGS. 7A1 to 7D1 has the amplitude G1, and a ratio control amount ZC generated with the edge width W2 in FIGS. 7A2 to 7D2 has the amplitude G2 (see FIGS. 7B1 and 7B2), which is different from the amplitude G1.

In a similar manner to the above-described cases of FIGS. 6A1 to 6D1 and FIGS. 6A2 to 6D2, when a ratio control amount has a greater amplitude, the edge portion can be converted to more steep portion. If the amplitudes G1 and G2 of the ratio control amounts are appropriately adjusted in FIGS. 7A1 to 7D1 and FIGS. 7A2 to 7D2, the converted output image data in FIGS. 7A1 to 7D1 and the converted output image data in FIGS. 7A2 to 7D2 can have the same edge width. More specifically, if G1<G2, an adjustment should be made so that a ratio control amount with the smaller amplitude G1 is generated for smaller edge width W1, and a ratio control amount with the greater amplitude G2 is generated for greater edge width W2.

Further, if the amplitudes G1 and G2 of the ratio control amounts are appropriately adjusted, an edge width of the output image in FIGS. 7A2 to 7D2 can be greater than an edge width of the output image in FIGS. 7A1 to 7D1. Furthermore, an adjustment can also be made so that the output image in FIGS. 7A1 to 7D1 has a greater edge width than the output image in FIGS. 7A2 to 7D2.

As described above, an edge portion having an arbitrary edge width in the input image can be freely converted to an edge portion having a desired edge width by specifying the amplitude of the ratio control amount for each detected edge width.

FIGS. 8A1 to 8D1 and FIGS. 8A2 to 8D2 are diagrams for describing a method of controlling a conversion ratio (a relationship between a generation period of ratio control amount and steepness of an edge portion in an output image) in the first embodiment. FIGS. 8A1 and 8A2 show input image data DI, FIGS. 8B1 and 8B2 show a ratio control amount ZC, FIGS. 8C1 and 8C2 show a conversion ratio Z, and FIGS. 8D1 and 8D2 show output image data DO.

Input image data in FIGS. 8A1 to 8D1 and FIGS. 8A2 to 8D2 have the same edge width W (see FIGS. 8A1 and 8A2). At this time, in FIGS. 8A1 to 8D1, a ratio control amount ZC is generated in a period ZCW1. In the subsequent description, a period in which the ratio control amount is generated (that is, a period in which the ratio control amount fluctuates), which is designated as ZCW1 in FIGS. 8A1 to 8D1, will be referred to as "a generation period of ratio control amount." A generation period of ratio control amount in FIGS. 8A2 to 8D2 is designated as ZCW2. At this time, ZCW1<ZCW2 (see FIGS. 8B1 and 8B2).

The conversion ratio is generated by superimposing the generated ratio control amount ZC on an arbitrary reference conversion ratio Z0 given in advance respectively in FIGS. 8A1 to 8D1 and in FIGS. 8A2 to 8D2 (see FIGS. 8C1 and 8C2). The conversion of pixel number in the generation period leading segment tb and the generation period trailing segment td is performed at a conversion ratio greater than the reference conversion ratio Z0, and the conversion of pixel number in the generation period central segment tc is performed at a conversion ratio smaller than the reference conversion ratio Z0 (see FIGS. 8D1 and 8D2). That is, an interpolation operation in the edge leading segment tb and the generation period trailing segment td is performed at a higher interpolation density than in the flat segment, and an interpolation operation in the generation period central segment tc is performed at a lower interpolation density than in the flat segment.

Figure 9A:
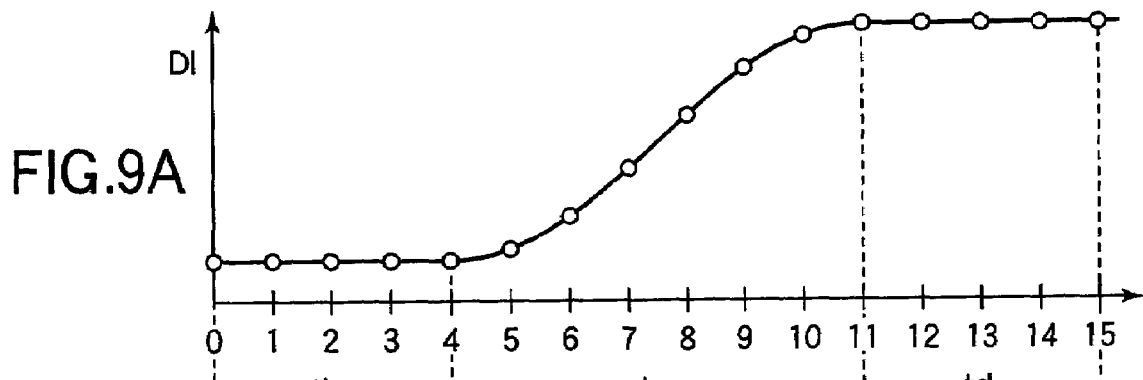
FIGS. 9A to 9D are diagrams for describing an image processing method in the first embodiment of the present invention.
Figure 9B:
Figure 9C:
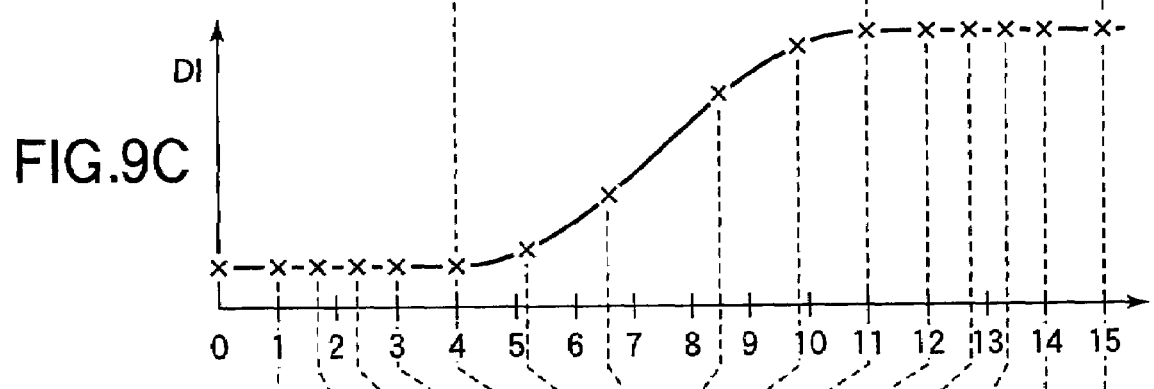
Figure 9D:
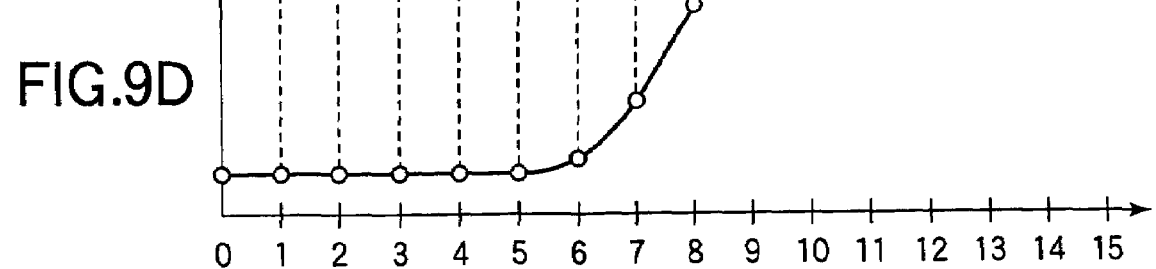

FIGS. 9A to 9D show a relationship among image data DI, a conversion ratio Z, positions of interpolation pixels, and output image data DO. FIGS. 9A to 9D shows a case where the reference conversion ratio Z0 is 1. In FIG. 9C, the position of each of the interpolation pixels is marked with a cross. The figure shows that high conversion ratio Z results in a high interpolation density in the generation period leading segment tb and in the generation period trailing segment td, and low conversion ratio Z results in a low interpolation density in the generation period central segment tc. The position of each interpolation pixel shown in FIG. 9C can be obtained in accordance with the conversion ratio Z in each pixel position of the image data DI shown in FIG. 9B. More specifically, the position of an interpolation pixel can be calculated by cumulatively adding up the reciprocal of the conversion ratio Z. The pixel number conversion circuit 4 performs an interpolation operation using the image data DI of pixels adjacent to the position of each interpolation pixel, thereby obtaining the output image data DO.

As can be understood from comparison between FIGS. 8A1 to 8D1 and FIGS. 8A2 to 8D2, in FIGS. 8A2 to 8D2, the period of conversion at a conversion ratio smaller than reference conversion ratio Z0 in the generation period central segment tc is longer. Therefore, the edge portion of the converted output image becomes steeper, and a sharper image can be obtained in FIGS. 8A2 to 8D2 than in FIGS. 8A1 to 8D1. In this way, steepness and sharpness of an edge portion of an output image can be controlled freely by adjusting the generation period of ratio control amount as desired (variable control).

FIGS. 10A1 to 10D1 and FIGS. 10A2 to 10D2 are diagrams for describing a method of controlling a conversion ratio (when a generation period of ratio control amount is changed in accordance with an edge width of an input image) in the first embodiment. FIGS. 10A1 and 10A2 show input image data DI, FIGS. 10B1 and 10B2 show a ratio control amount ZC, FIGS. 10C1 and 10C2 show a conversion ratio Z, and FIGS. 10D1 and 10D2 show output image data DO.

FIGS. 10A1 to 10D1 show a case where an edge portion of an image with the edge width W1 is input, and FIGS. 10A2 to 10D2 show a case where an edge portion of an image with the edge width W2 is input. The edge width W1 and the edge width W2 satisfy W1<W2 (see FIGS. 10A1 and 10A2). A ratio control amount generated from the edge width W1 in FIGS. 10A1 to 10D1 and a ratio control amount generated from the edge width W2 in FIGS. 10A2 to 10D2 have different generation periods ZCW1 and ZCW2 respectively (see FIGS. 10B1 and 10B2).

In FIGS. 10A1 and 10D1 and FIGS. 10A2 and 10D2, an edge portion converted with a longer generation period of ratio control amount becomes more steep, in the similar manner to FIGS. 8A1 and 8D1 and FIGS. 8A2 and 8D2. If generation periods of ratio control amounts ZCW1 and ZCW2 are appropriately adjusted in FIGS. 10A1 to 10D1 and FIGS. 10A2 to 10D2, for example, the output image data converted in FIGS. 10A1 to 10D1 and FIGS. 10A2 to 10D2 can have the same edge width. More specifically, if ZCW1<ZCW2, an adjustment may be made to generate a ratio control amount with smaller generation period ZCW1 from smaller edge width W1 and to generate a ratio control amount with greater generation period ZCW2 from greater edge width W2.

The generation periods of ratio control amounts ZCW1 and ZCW2 can also be adjusted so that the output image of FIGS. 10A2 to 10D2 have a greater edge width than the output image of FIGS. 10A1 to 10D1. An adjustment can also be made so that the output image of FIGS. 10A1 to 10D1 has a greater edge width than the output image of FIGS. 10A2 to 10D2.

In this way, an edge portion having an arbitrary edge width in an input image can be freely converted to an edge portion having a desired edge width by arbitrarily specifying an generation period of ratio control amount for each detected edge width.

FIGS. 11A1 to 11D1 and FIGS. 11A2 to 11D2 are diagrams for describing a method of controlling a conversion ratio (when both a generation period and amplitude of ratio control amount are changed in accordance with an edge width of an input image) in the first embodiment. FIGS. 11A1 and 11A2 show input image data DI, FIGS. 11B1 and 11B2 show a ratio control amount ZC, FIGS. 11C1 and 11C2 show a conversion ratio Z, and FIGS. 11D1 and 11D2 show output image data DO.

FIGS. 11A1 to 11D1 show a case where an edge portion of an image with the edge width W1 is input and FIGS. 11A2 to 11D2 show a case where an edge portion of an image with the edge width W2 is input. The edge width W1 and the edge width W2 satisfy W1<W2 (see FIGS. 11A1 and 11A2). Ratio control amounts having different generation periods and different amplitudes are respectively generated from the edge width W1 in FIGS. 11A1 to 11D1 and from the edge width W2 in FIGS. 11A2 to 11D2 (see FIGS. 11B1 and 11B2).

As has been described above, an edge portion converted with a ratio control amount having a greater amplitude and a greater generation period of ratio control amount will be more steep. If generation periods ZCW1 and ZCW2 of the ratio control amounts and amplitudes G1 and G2 of the ratio control amounts are appropriately adjusted in FIGS. 11A1 to 11D1 and FIGS. 11A2 to 11D2, for example, the converted output images obtained in FIGS. 11A1 to 11D1 and FIGS. 11A2 to 11D2 can have the same edge width. More specifically, if G1<G2 and ZCW1<ZCW2, an adjustment should be made so that a ratio control amount with smaller generation period ZCW1 and smaller amplitude G1 is generated from smaller edge width W1, and a ratio control amount with greater generation period ZCW2 and greater amplitude G2 is generated from greater edge width W2.

Further, amplitudes G1 and G2 and generation period of ratio control amounts ZCW1 and ZCW2 of the ratio control amounts can also be appropriately adjusted so that the edge width of the output image in FIGS. 11A2 to 11D2 becomes greater than the edge width of the output image in FIGS. 11A1 to 11D1. Furthermore, an adjustment can also be made so that the output image in FIGS. 11A1 to 11D1 has a greater edge width than in FIGS. 11A2 to 11D2.

An edge portion having an arbitrary edge width in an input image can be freely converted to an edge portion having a desired edge width by arbitrarily specifying amplitude and an arbitrary generation period of ratio control amount for each detected edge width.

FIGS. 12A1 to 12D1, FIGS. 12A2 to 12D2, and FIGS. 12A3 to 12D3 are diagrams for describing a method of controlling a conversion ratio (a relationship between a predetermined reference conversion ratio and number of ratio-control-amount data items) in the first embodiment. FIGS. 12A1 to 12A3 show input image data DI, FIGS. 12B1 to 12B3 show a ratio control amount ZC, FIGS. 12C1 to 12C3 show a conversion ratio Z, and FIGS. 12D1 to 12D3 show output image data DO.

FIGS. 12A1 to 12D1 show that the input image and the output image have the same pixel number (when the reference conversion ratio Z0=1). FIGS. 12A2 to 12D2 show that the image is converted for scaling up (when the reference conversion ratio Z0>1). FIGS. 12A3 to 12D3 show that the image is converted for scaling down (when the reference conversion ratio Z0<1).

Further, a black circle in FIGS. 12A1 to 12A3 represents the data of a pixel of input image. A white circle in FIGS. 12D1 to 12D3 represents the data of a pixel of the output image. A white circle in FIGS. 12B1 to 12B3 represents the data of a ratio control amount ZC corresponding to the data of a pixel of the output image. A white circle in FIGS. 12C1 to 12C3 represents the data of conversion ratio Z corresponding to the data of a pixel of the output image.

In FIGS. 12A1 to 12D1, since the reference conversion ratio Z0=1 and the input image and the output image have the same pixel number (same pixel density), the black circles and the white circles appear at identical intervals.

In FIGS. 12A2 to 12D2, the conversion for scaling-up is performed (the reference conversion ratio Z0>1), and the output image has a higher pixel density than the input image, so that the white circles appear at shorter intervals than the black circles. In FIGS. 12A3 to 12D3, the conversion for scaling-down is performed (the reference conversion ratio Z0<1), and the output image has a lower pixel density than the input image, so that the white circles appear at longer intervals than the black circles.

In FIGS. 12A1 to 12D1, FIGS. 12A2 to 12D2, and FIGS. 12A3 to 12D3, the common image data is input, and the edge width W is detected respectively (see FIGS. 12A1 to 12A3). A ratio control amount ZC having a generation period ZCW is generated in accordance with the edge width W, respectively (see FIGS. 12B1 to 12B3). As has been already described, if the same generation period of ratio control amount is used in FIGS. 12A1 to 12D1, in FIGS. 12A2 to 12D2, and in FIGS. 12A3 to 12D3, respectively, the edge portion of the output image can be controlled so as to have the similar steepness. However, because pixel densities are different in FIGS. 12A1 to 12D1, in FIGS. 12A2 to 12D2, and in FIGS. 12A3 to 12D3, respectively, numbers of ratio control amount data items in the generation period of ratio control amount ZCW are different. In the subsequent description, the number of ratio control amount data items generated in the generation period of ratio control amount ZCW is referred to as "a ratio control amount data number."

In FIGS. 12A2 to 12D2, the conversion for scaling-up is performed, and the pixel density is higher than that in FIGS. 12A1 to 12D1. Accordingly, ratio control amount data number ZCN2 in the generation period of ratio control amount ZCW of FIGS. 12A2 to 12D2 is greater than ratio control amount data number ZCN1 in the generation period of ratio control amount ZCW of FIGS. 12A1 to 12D1, that is, ZCN1<ZCN2. In the similar manner, in FIGS. 12A3 to 12D3, conversion for scaling-down is performed, and the pixel density is lower than that in FIGS. 12A1 to 12D1. Accordingly, ratio control amount data number ZCN3 in the generation period of ratio control amount ZCW of FIGS. 12A3 to 12D3 is lower than the ratio control data count ZCN1 in the generation period of ratio control amount ZCW of FIGS. 12A1 to 12D1, that is, ZCN3<ZCN1.

Steepness of an edge portion in an output image can be maintained to the similar level by adjusting the number of ratio-control-amount data items in accordance with the conversion ratio of the entire image (reference conversion ratio Z0), as described above, even if the conversion ratio across the entire image changes. In other words, an output image with desired sharpness can be obtained by generating a ratio control amount in accordance with a detected edge width and adjusting the number of ratio-control-amount data items in accordance with the conversion ratio across the entire image, even if the conversion ratio of the entire image changes.

Although the conversion of horizontal pixel number has been described above, the conversion of vertical pixel number can be executed in a similar manner and can produce a similar effect. If the conversion of vertical pixel number and the conversion of horizontal pixel number are executed successively or simultaneously, an effect as described above can be provided in both the vertical direction and the horizontal direction.

Figure 13:
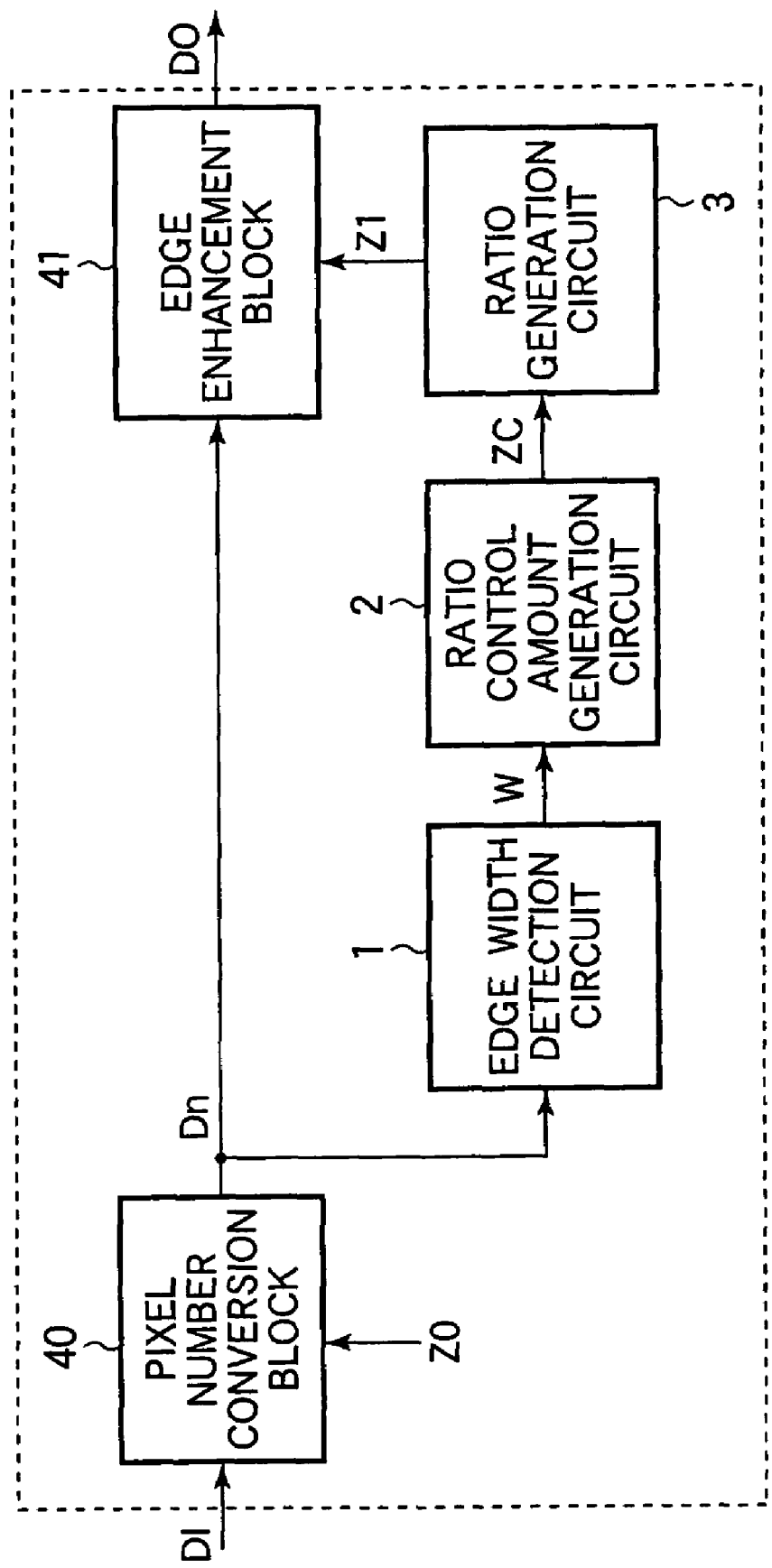
FIG. 13 is a block diagram showing a modified configuration of the image processing apparatus in the first embodiment of the present invention.

FIG. 13 is a block diagram showing a modified configuration of the image processing apparatus in the first embodiment of the present invention. In FIG. 13, components, which are the same as or corresponds to those in FIG. 3, are denoted by identical reference numerals. The image processing apparatus shown in FIG. 13 differs from the image processing apparatus shown in FIG. 3 in that the pixel number conversion circuit 4 shown in FIG. 3 is divided into a pixel number conversion block (a first pixel number conversion block) 40 and an edge enhancement block (a second pixel number conversion block) 41. The pixel number conversion block 40 performs a conversion of pixel number of the image data DI using the reference conversion ratio Z0, and sends converted image data Dn to the edge width detection circuit 1 and the edge enhancement block 41. The edge width detection circuit 1 detects an edge width W from the converted image data Dn. The ratio control amount generation circuit 2 generates a ratio control amount ZC in accordance with the edge width W, as shown in FIG. 4. The ratio generation circuit 3 outputs a conversion ratio Z1 in accordance with the ratio control amount ZC. In this modified embodiment, the pixel number conversion block 40 performs a conversion of pixel number at a reference conversion ratio Z0, and the conversion ratio Z1 is calculated from the expression (2) given below, obtained by substituting 1 for Z0 in the expression (1)

$$Z1=1+ZC \qquad (2)$$

The conversion ratio Z1 is 1 in the flat segment, becomes greater than 1 in the generation period leading segment tb and the generation period trailing segment td, and falls short of 1 in the generation period central segment tc. The edge enhancement block 41 enhances an edge portion of the converted image data Dn by executing an interpolation operation in accordance with the conversion ratio Z1. In other words, in the generation period leading segment tb, the generation period trailing segment td, and the generation period central segment tc, where the conversion ratio Z1 takes a value other than 1, an interpolation operation is performed in the position of the interpolation pixel obtained from the conversion ratio Z1 (see FIGS. 9A to 9D). As a result, output pixel data DO including an enhanced edge portion is obtained.

Figure 14:
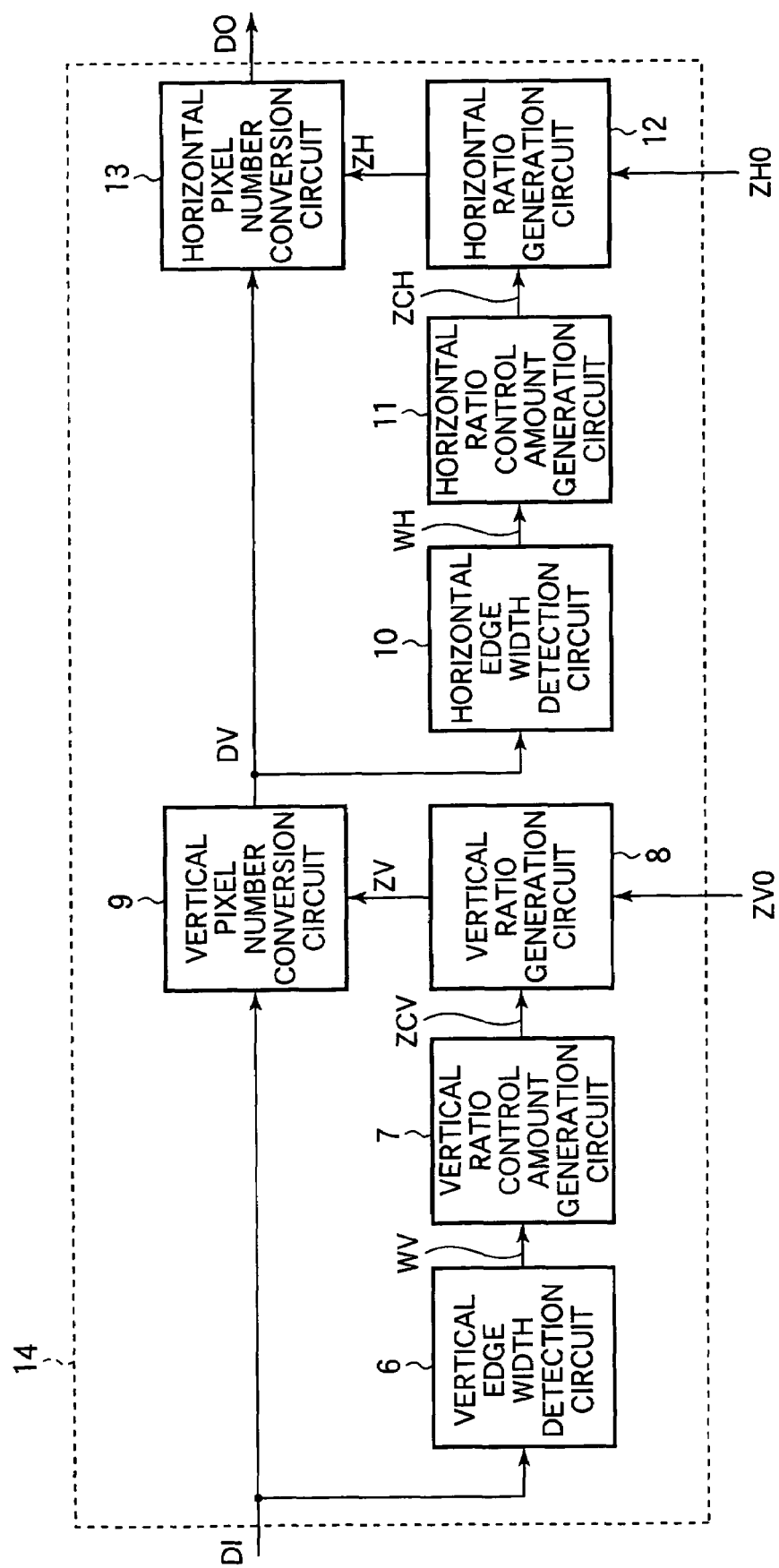
FIG. 14 is a block diagram showing a configuration of the image processing apparatus (a configuration for performing a conversion of pixel numbers both in a vertical direction and in a horizontal direction) in the first embodiment of the present invention.

FIG. 14 is a block diagram showing a configuration of an image processing apparatus (a configuration for performing a conversion of pixel number both in a vertical direction and in a horizontal direction) in the first embodiment of the present invention. As shown in FIG. 14, an image processing apparatus 14 includes a vertical edge width detection circuit 6, a vertical ratio control amount generation circuit 7, a vertical ratio generation circuit 8, a vertical pixel number conversion circuit 9, a horizontal edge width detection circuit 10, a horizontal ratio control amount generation circuit 11, a horizontal ratio generation circuit 12, and a horizontal pixel number conversion circuit 13.

In FIG. 14, the vertical edge width detection circuit 6, the vertical ratio control amount generation circuit 7, the vertical ratio generation circuit 8, and the vertical pixel number conversion circuit 9 form an image processing block for performing a conversion of vertical pixel number. The horizontal edge width detection circuit 10, the horizontal ratio control amount generation circuit 11, the horizontal ratio generation circuit 12, and the conversion of horizontal pixel number circuit 13 form an image processing block for performing a conversion of horizontal pixel number. The vertical edge width detection circuit 6 and the horizontal edge width detection circuit 10 correspond to the edge width detection circuit 1 shown in FIG. 3. The vertical ratio control amount generation circuit 7 and the horizontal ratio control amount generation circuit 11 correspond to the ratio control amount generation circuit 2 shown in FIG. 3. The vertical ratio generation circuit 8 and the horizontal ratio generation circuit 12 correspond to the ratio generation circuit 3 shown in FIG. 3. The vertical pixel number conversion circuit 9 and the horizontal pixel number conversion circuit 13 correspond to the pixel number conversion circuit 4 shown in FIG. 3.

Input image data DI is input to the vertical edge width detection circuit 6 and the vertical pixel number conversion circuit 9. The vertical edge width detection circuit 6 detects a period in which the image level of the input image data DI varies in the vertical direction as the vertical edge width WV, and outputs the vertical edge width WV. The vertical edge width WV output from the vertical edge width detection circuit 6 is input to the vertical ratio control amount generation circuit 7.

The vertical ratio control amount generation circuit 7 generates the vertical ratio control amount ZCV used for controlling the vertical conversion ratio, in accordance with the vertical edge width WV, and outputs the vertical ratio control amount ZCV. The vertical ratio control amount ZCV output from the vertical ratio control amount generation circuit 7 is input to the vertical ratio generation circuit 8.

The vertical ratio generation circuit 8 generates a conversion ratio in the vertical direction (a vertical conversion ratio) ZV, in accordance with the vertical ratio control amount ZCV and the vertical reference conversion ratio ZV0 given in advance, and outputs the vertical conversion ratio ZV. The vertical conversion ratio ZV output from the vertical ratio generation circuit 8 is input to the vertical pixel number conversion circuit 9.

The vertical pixel number conversion circuit 9 performs a conversion of pixel number in the vertical direction in the input image data DI, at the vertical conversion ratio ZV, and outputs the converted image data DV. The image data DV output from the vertical pixel number conversion circuit 9 is input to the horizontal edge width detection circuit 10 and the horizontal pixel number conversion circuit 13.

The horizontal edge width detection circuit 10 detects a period in which the image level of input image data DV varies in the horizontal direction, as the horizontal edge width WH, and outputs the horizontal edge width WH. The horizontal edge width WH output from the horizontal edge width detection circuit 10 is input to the horizontal ratio control amount generation circuit 11.

The horizontal ratio control amount generation circuit 11 generates the horizontal ratio control amount ZCH used for controlling the horizontal conversion ratio, in accordance with the horizontal edge width WH, and outputs the horizontal ratio control amount ZCH. The horizontal ratio control amount ZCH output from the horizontal ratio control amount generation circuit 11 is input to the horizontal ratio generation circuit 12.

The horizontal ratio generation circuit 12 generates a conversion ratio in the horizontal direction (a horizontal conversion ratio) ZH, in accordance with the horizontal ratio control amount ZCH and the horizontal reference conversion ratio ZH0 given in advance, and outputs the horizontal conversion ratio ZH. The horizontal conversion ratio ZH output from the horizontal ratio generation circuit 12 is input to the horizontal pixel number conversion circuit 13.

The horizontal pixel number conversion circuit 13 performs a conversion of pixel number in the horizontal direction of the image data DV at the horizontal conversion ratio ZH, and outputs the converted image data as the output image data DO.

The detail operation of each circuit included in the image processing apparatus 14 are similar to that described with reference to FIGS. 4 to 14. Further, the vertical pixel number conversion circuit 9 and the horizontal pixel number conversion circuit 13 are implemented generally by providing a circuit for storing image data temporarily such as a memory. Furthermore, when the horizontal reference conversion ratio ZH0 is 1 and the vertical reference conversion ratio ZV0 is 1, neither a conversion for scaling-up nor a conversion for scaling-down of the entire image is performed, and just sharpness of the edge portion is adjusted.

By specifying the horizontal reference conversion ratio ZH0, the vertical reference conversion ratio ZV0, the horizontal ratio control amount ZCH, and the vertical ratio control amount ZCV independently of one another and arbitrarily, the horizontal conversion ratio and the horizontal sharpness of the edge portion can be adjusted independently of each other, and the vertical conversion ratio and the vertical sharpness of the edge portion can be adjusted independently of each other. Accordingly, the input image can be adjusted in the horizontal direction to have desired sharpness specified for each horizontal edge width and can also be adjusted in the vertical direction to have desired sharpness specified for each vertical edge width.

If the vertical reference conversion ratio ZV0 is 2 and the horizontal reference conversion ratio ZH0 is 1, for example, an interlaced image can be converted to a non-interlaced image (scanning line conversion), and the horizontal edge portion and the vertical edge portion can be controlled to provide desired sharpness independently of each other.

Although, in the above description of operation of the image processing apparatus 14, the apparatus performs a conversion of pixel number by executing a conversion of vertical pixel number and a conversion of horizontal pixel number successively, the similar effect can be obtained by performing a conversion of vertical pixel number after a conversion of horizontal pixel number or by performing a conversion of vertical pixel number and a conversion of horizontal pixel number simultaneously.

As has been described above, in the first embodiment, an edge width of the input image data is detected, a ratio control amount is generated in accordance with the edge width, a conversion ratio is generated in accordance with the ratio control amount, and a conversion of pixel number is performed by interpolating pixels of the input image data in accordance with the conversion ratio, so that an edge portion having an arbitrary width (duration) can be converted to an edge portion having a desired width (duration). Accordingly, sharpness of the output image can be improved, and an edge portion having desired sharpness can be obtained at an arbitrary reference conversion ratio. The ratio control amount is independent of the amplitude of the edge portion, so that sharpness can be enhanced across the entire image in proper quantities.

Second Embodiment

Figure 15:
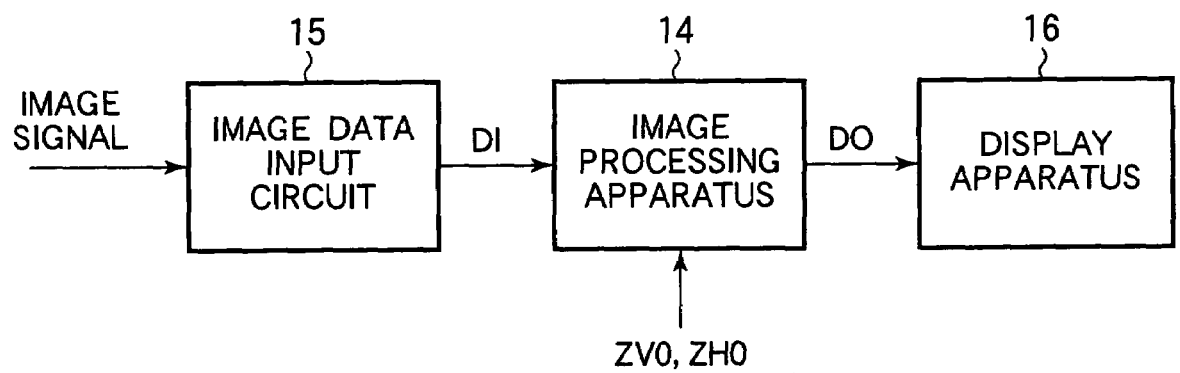
FIG. 15 is a block diagram showing a configuration of an image display apparatus in a second embodiment of the present invention.

FIG. 15 is a block diagram showing a configuration of an image display apparatus in a second embodiment of the present invention. In the image display apparatus of the second embodiment, the image processing apparatus 14 (see FIG. 14 for the configuration) described in the first embodiment is provided in a stage subsequent to an image data input circuit 15, and a display apparatus 16 is provided in a further subsequent stage.

An image signal is input to the image data input circuit 15. The image signal includes both an image data signal and a synchronization signal. The image data input circuit 15 outputs image data DI, in the format of the image signal. If the image signal is an analog signal, the image data input circuit 15 includes an A/D converter, and outputs image data sampled at the intervals determined by the synchronization signal. If the image signal is an encoded digital signal, the image data input circuit 15 includes a decoder, and outputs decoded image data.

The image data DI output from the image data input circuit 15 is input to the image processing apparatus 14. The image processing apparatus 14 (see FIG. 14 for the configuration) performs a conversion of vertical pixel number and a conversion of horizontal pixel number in an edge portion of an image while adjusting the conversion ratio in accordance with the edge width, as has been described in detail in the first embodiment, and outputs converted image data DO. The image data DO obtained by the conversion of pixel number performed by the image processing apparatus 14 is input to the display apparatus 16, and an image based on the image data DO is displayed on the display apparatus 16.

As has been described above, since in the second embodiment the image display apparatus is formed so as to include the image processing apparatus of the above-mentioned first embodiment, an edge portion having an arbitrary width (duration) can be converted to an edge portion having a desired width (duration), so that the image can be displayed with desired sharpness. Therefore, an image can be displayed with sharpness of the edge portion maintained at an arbitrary reference conversion ratio. Further, since a difference of an edge portion is irrelevant, the image can be displayed with sharpness enhanced across the entire image in proper quantities.

Third Embodiment

Although in the above-mentioned first and second embodiments a configuration for performing a conversion of pixel number by hardware has been described, the conversion of pixel number can also be performed by software. A conversion of pixel number by software will be described as a third embodiment.

Figure 16:
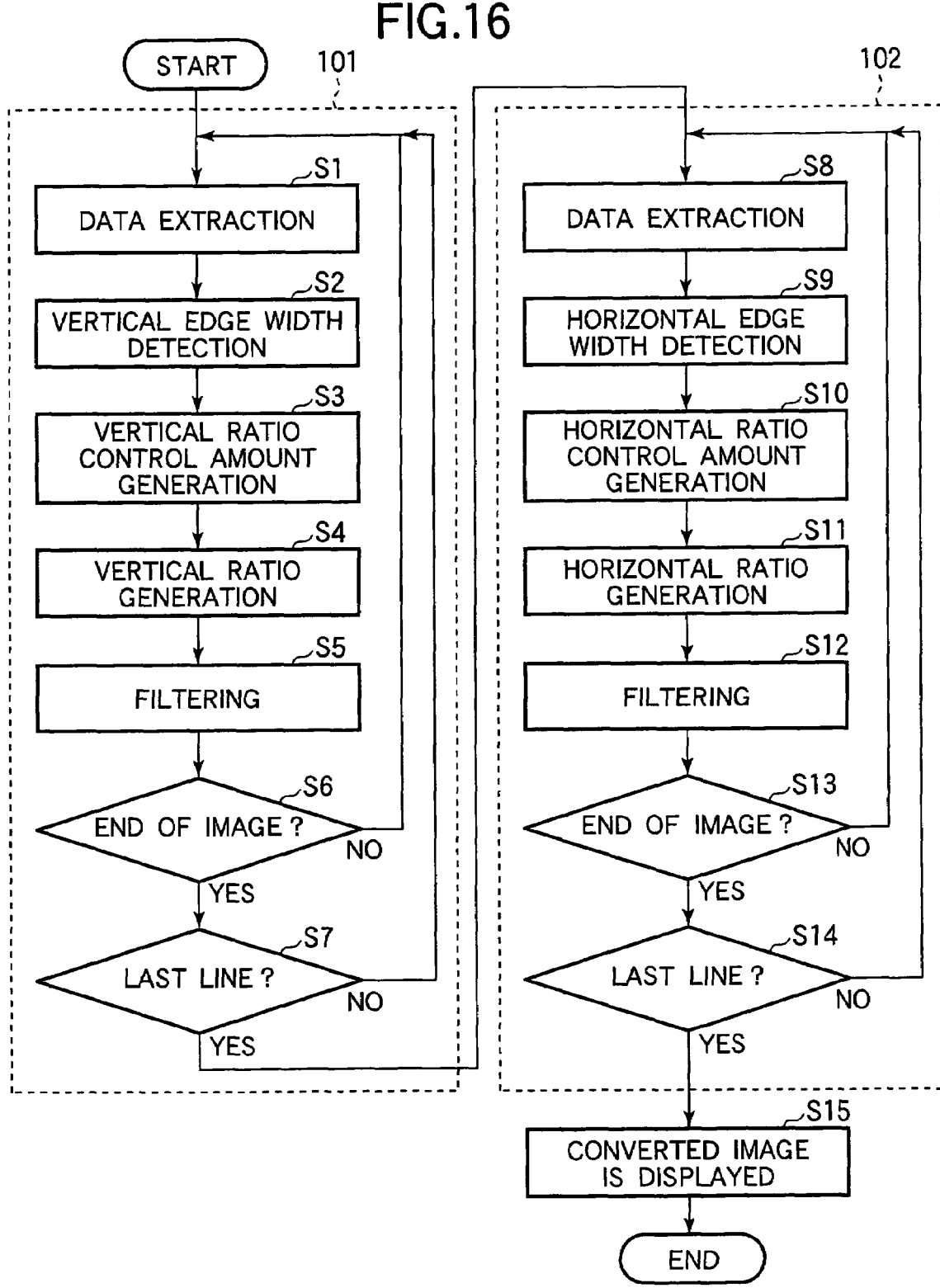
FIG. 16 is a flow chart showing an image display method in a third embodiment of the present invention.

FIG. 16 is a flow chart showing an image display method in a third embodiment of the present invention. FIG. 16 illustrates operation (an image processing method and an image display method) for displaying an image after performing a conversion of pixel number by software (or by both software and hardware). In FIG. 16, processing 101 is a sequence for generating data in the vertical direction (a pixel number conversion sequence), and processing 102 is a sequence for generating data in the horizontal direction (a pixel number conversion sequence) Although in FIG. 16 a conversion of pixel number is performed both in the vertical direction and in the horizontal direction, a conversion of pixel number can also be performed in the horizontal direction and in the vertical direction independently of each other or can be executed in either direction alone.

First, data generation in the vertical direction shown in the processing 101 of FIG. 16 is started. In the step S1, the vertical edge width corresponding to a target pixel is detected from the image data of which pixel number is to be converted (equivalent to DI in FIG. 14), and the data of a plurality of pixel data items required for a filtering operation are extracted. In the next step S2, a vertical edge width (equivalent to WV in FIG. 14) is detected from the plurality of pixel data items extracted in the step S1. In the next step S3, a vertical ratio control amount (equivalent to ZCV in FIG. 14) is generated from the vertical edge width detected in the step S2. In the next step S4, the ratio control amount generated in the step S3 is superimposed on a vertical reference conversion ratio (equivalent to ZV0 in FIG. 14) given in advance, and a vertical conversion ratio (equivalent to ZV in FIG. 14) is generated. In the next step S5, a filtering operation is executed in the vertical direction in accordance with the vertical conversion ratio generated in the step S4 and the plurality of pixel data items extracted in the step S1, and the result of the operation is stored. The sequence of the above steps S1 to S5 is repeated until the target pixel reaches an end of the image (the step S6). If the operation starts from the left end of the image, for example, the "end of the image" means the right end of the image.

After the target pixel reaches the end of the image in the step S6, the steps S1 to S6 are repeated for the target pixels of the next line, and these are repeated up to the last line (the step S7). The conversion of vertical pixel number is completed when the steps described above are executed for all the pixels.

After the vertical data generation is completed, the operation of the processing 102 for generating data in the horizontal direction starts as shown in FIG. 16. In the step S8, the horizontal edge width corresponding to the target pixel is detected from the image data obtained by the conversion of vertical pixel number (equivalent to DV in FIG. 14), and the data of a plurality of pixel data items required for a filtering operation in the horizontal direction are extracted. In the next step S9, a horizontal edge width (equivalent to WH in FIG. 14) is detected from the plurality of pixel data items extracted in the step S8. In the next step S10, a horizontal ratio control amount (equivalent to ZCH in FIG. 14) is generated from the horizontal edge width detected in the step S9. In the next step S11, the ratio control amount generated in the step S10 is superimposed on a horizontal reference conversion ratio (equivalent to ZH0 in FIG. 14) given in advance, and a horizontal conversion ratio (equivalent to ZH in FIG. 14) is generated. In the next step S12, a horizontal filtering operation is performed in accordance with the conversion ratio generated in the step S11 and the plurality of pixel data items extracted in the step S8, and the result of the operation is stored. The steps S8 to S12 are repeated until the target pixel reaches an end of the image (the step S13).

After the target pixel reaches the end of the image in the step S13, the above-described steps S8 to S13 are repeated for the target pixels in the next line, and these are repeated up to the last line (the step S14). The conversion of horizontal pixel number is completed when the steps described above are executed for all the pixels.

After the vertical data generation and the horizontal data generation as described above are completed, the image obtained by the conversion of pixel number is finally displayed in the step S15.

The processing of each step in FIG. 16 has already been described in detail as a part of the first embodiment.

Further, in FIG. 16, the conversion of vertical pixel number is followed by the conversion of horizontal pixel number. The conversion of horizontal pixel number may be followed by the conversion of vertical pixel number. That is, the sequence of the processing 102 shown in FIG. 16 may be executed before the sequence of the processing 101 shown in FIG. 16. Furthermore, just either the sequence of the processing 101 shown in FIG. 16 or the sequence of the processing 102 shown in FIG. 16 may be executed.

Further, in the conversion of vertical pixel number and the conversion of horizontal pixel number shown in FIG. 16, although the operation of the target pixel are performed from the left to the right and from the top to the bottom of the image, this sequence is not limited to the above-mentioned example. The operation will produce the similar effect even if the sequence of the processing is performed in any directions.

Moreover, in the steps S4 and S11 shown in FIG. 16, the average conversion ratio (equivalent to ZV and ZH in FIG. 14) of each line should equal the conversion ratio of the entire screen (equivalent to ZV0 and ZH0 in FIG. 14), as has been described with reference to FIG. 4 of the first embodiment. That is, the total sum of the ratio control amounts generated in the steps S3 and S10 of FIG. 16 (equivalent to ZCV and ZCH shown in FIG. 14) should be zero in each line.

As has been described above, in the third embodiment, the image processing method and the image display method of the first and second embodiments are implemented by software, and an edge portion having an arbitrary width (duration) can be converted to an edge portion having a desired width (duration), so that the image can be displayed with desired sharpness, and the image can also be displayed with sharpness of the edge portion maintained at an arbitrary reference conversion ratio. Further, since a difference of an edge portion is irrelevant, the image can be displayed with sharpness enhanced across the entire image in proper quantities.

Fourth Embodiment

Figure 17:
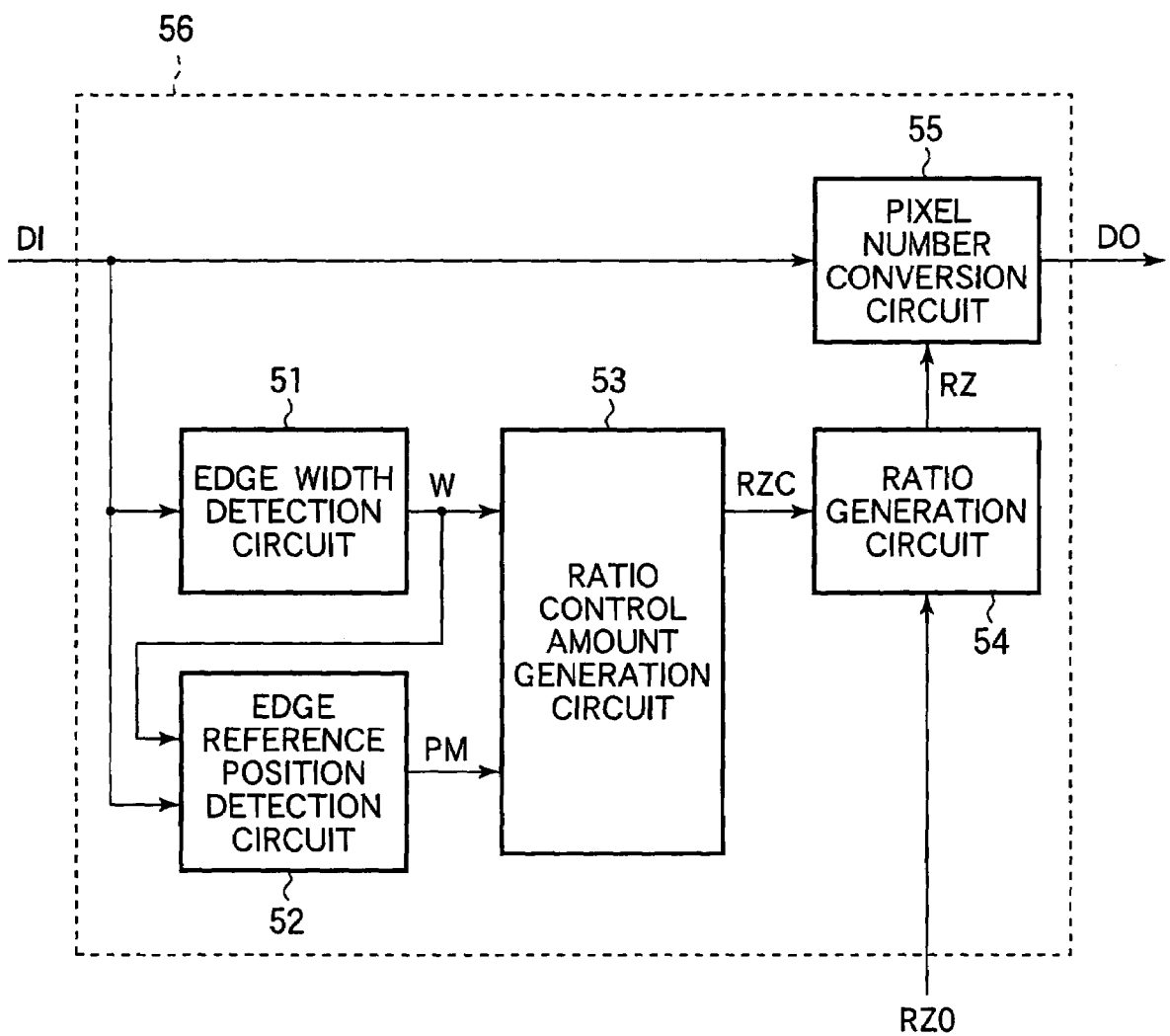
FIG. 17 is a block diagram showing a configuration of an image processing apparatus (a configuration for performing a conversion of pixel number in a vertical direction or in a horizontal direction) in a fourth embodiment of the present invention.

FIG. 17 is a block diagram showing a configuration of an image processing apparatus in a fourth embodiment (that is, an apparatus implementing an image processing method of the fourth embodiment) of the present invention. FIG. 17 shows a configuration for performing a conversion of pixel number in the horizontal direction (or in the vertical direction). As shown in FIG. 17, an image processing apparatus 56 of the fourth embodiment includes an edge width detection circuit 51, an edge reference position detection circuit 52, a ratio control amount generation circuit 53, a ratio generation circuit 54, and a pixel number conversion circuit 55.

Input image data DI is input to the edge width detection circuit 51, the edge reference position detection circuit 52, and the pixel number conversion circuit 55. The edge width detection circuit 51 detects a duration in which the image level of the input image data DI varies (increase or decreases) in the horizontal direction, as the edge width W, and outputs the edge width W. The edge width detection circuit 51 detects a duration, in which the image level varies and which is within a certain range, as the edge width W. For example, a minimum value Wmin and a maximum value Wmax of the duration are specified in advance for the section to be detected as an edge portion. If the duration of a variation in the image level exceeds the maximum value Wmax or if the duration of a variation in the image level falls short of the minimum value Wmin, the corresponding section is not judged to be an edge portion, and the edge width W is not detected. The edge width W output from the edge width detection circuit 51 is input to the edge reference position detection circuit 52 and the ratio control amount generation circuit 53.

In the description given above, the duration of a horizontal variation (increase or decrease) in the image level of input image data DI is detected as the edge width W, but the method of detecting the edge width W is not limited to the above-described method. The method of detecting the edge width W may be the other method such as methods shown in FIGS. 20 to 23A and 23B, FIGS. 33 to 38A and 38B, and their descriptions.

The edge reference position detection circuit 52 detects a reference position PM of an edge portion in accordance with the image data DI and the edge width W, and outputs the edge reference position PM. The edge reference position PM output from the edge reference position detection circuit 52 is input to the ratio control amount generation circuit 53.

The ratio control amount generation circuit 53 generates a ratio control amount RZC for adjusting a conversion ratio in accordance with the edge width W and the edge reference position PM, and outputs the ratio control amount RZC. The ratio control amount RZC output from the ratio control amount generation circuit 53 is input to the ratio generation circuit 54.

The ratio generation circuit 54 generates conversion ratio information RZ, in accordance with the ratio control amount RZC and arbitrary reference conversion ratio information RZ0 given in advance, and outputs the conversion ratio information RZ. The conversion ratio information RZ output from the ratio generation circuit 54 is input to the pixel number conversion circuit 55.

The pixel number conversion circuit 55 performs a conversion of horizontal pixel number of the input image data DI, using the conversion ratio information RZ, and outputs the converted image data as output image data DO.

Figure 18A:
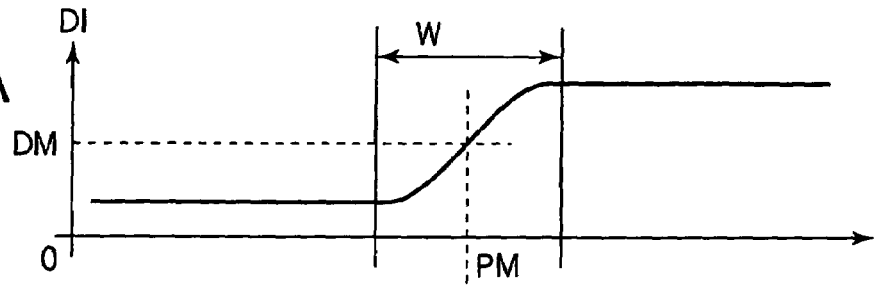
FIGS. 18A to 18E are diagrams for describing operation of an edge width detection circuit, an edge reference position detection circuit, a ratio control amount generation circuit, and a ratio generation circuit in the image processing apparatus of FIG. 17.
Figure 18B:
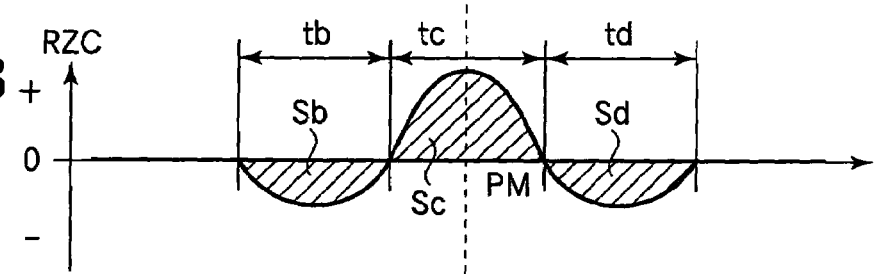
Figure 18C:
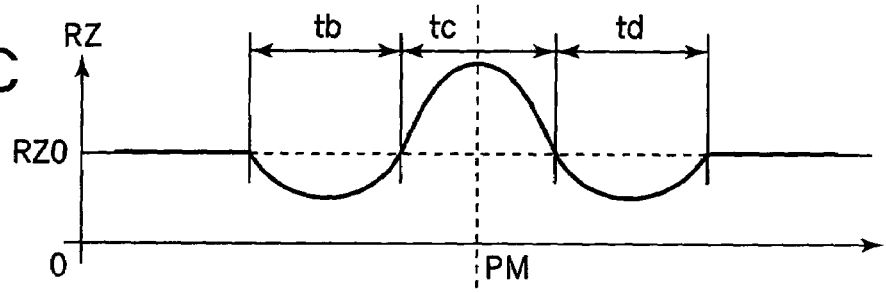

FIGS. 18A to 18E are diagrams for describing operation of the edge width detection circuit 51, the edge reference position detection circuit 52, the ratio control amount generation circuit 53, and the ratio generation circuit 54 in the image processing apparatus of the fourth embodiment. In FIGS. 18A to 18E, the horizontal axis indicates the horizontal position of the image. The vertical axis of FIG. 18A indicates a level of the input image data DI, the vertical axis of FIG. 18B indicates the ratio control amount RZC, the vertical axis of FIG. 18C indicates the conversion ratio information RZ, the vertical axis of FIG. 18D indicates the conversion ratio Z, and the vertical axis of FIG. 18E indicates a level of the output image data DO. The conversion ratio information RZ in FIG. 18C is a reciprocal of the conversion ratio Z in FIG. 18D (that is, RZ=1/Z). If the conversion ratio Z is 1.25, the conversion ratio information RZ is a reciprocal of Z, which is 0.8.

The edge width detection circuit 51 detects the duration (edge width) W of a section where the image level of the input image data DI varies (see FIG. 18A). The duration of a variation in the input image data DI is a period in which the level increases or decreases.

The edge reference position detection circuit 52 detects the edge reference position PM determined in accordance with the variations of the edge width W and the input image data DI. The level of the image data in the edge reference position PM is designated as DM (see FIG. 18A).

The ratio control amount generation circuit 53 generates the ratio control amount RZC, in accordance with the detected the edge width W and the edge reference position PM. The ratio control amount RZC is negative in the generation period leading segment tb, positive in the generation period central segment tc, negative in the generation period trailing segment td, and becomes zero in the other segments (see FIG. 18B).

The ratio generation circuit 54 superimposes the ratio control amount RZC on the reference conversion ratio information RZ0 given in advance, and generates the conversion ratio information RZ (see FIG. 18C).

Figure 18D:
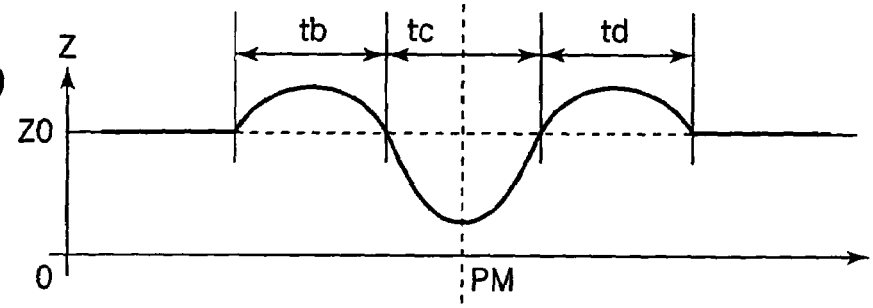

In FIG. 18D, Z0 is a predetermined reference conversion ratio and is a reciprocal of the reference conversion ratio information RZ0 (that is, Z0=1/RZ0).

Because RZ and Z are reciprocal, if the conversion ratio information RZ is smaller than the reference conversion ratio information RZ0 (RZ<RZ0: See FIG. 18C) as in the generation period leading segment tb or the generation period trailing segment td, the conversion ratio Z becomes greater than the reference conversion ratio Z0 (Z>Z0: See FIG. 18D). If the conversion ratio information RZ is greater than the reference conversion ratio information RZ0 (RZ>RZ0: See FIG. 18C), as in the generation period central segment tc, the conversion ratio Z becomes smaller than the reference conversion ratio Z0 (Z<Z0: See FIG. 18D). That is, the pixel number is converted at a conversion ratio higher than the reference conversion ratio Z0 in the generation period leading segment tb and the generation period trailing segment td, and at a conversion ratio lower than the reference conversion ratio Z0 in the generation period central segment tc (see FIG. 18D).

Figure 18E:
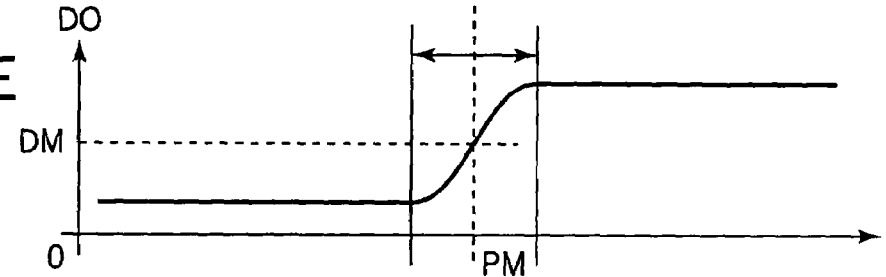

Because the conversion ratio Z in the generation period central segment tc is lower than the reference conversion ratio Z0, an edge width of the output image data can become smaller than the edge width W of the input image data (see FIG. 18E). The image data of an edge can be changed more steeply by using the conversion ratio information RZ generated by superimposing the ratio control amount RZC on the constant reference conversion ratio RZ0, so that image sharpness can be enhanced.

The ratio control amount RZC is generated from the detected edge width W so that the total sum of the ratio control amounts RZC in the generation period of ratio control amount (total period of tb, tc, and td) becomes zero. A signal of the ratio control amount RZC is generated so that Sb+Sd=Sc, where Sb, Sc, and Sd are the sizes of hatched portions in the segments tb, tc, and td respectively in FIG. 18B. Accordingly, the conversion ratio information RZ of the image fluctuates in some areas, but the average of the conversion ratio information RZ across the entire image matches the reference conversion ratio information RZ0. As described above, by setting the total sum of the ratio control amounts RZC to zero, the edge portions of individual lines of the image will be aligned.

As shown in FIGS. 18A and 18E, the values of the input image data and the output image data in the edge reference position PM do not change (remain to be DM). A method of generating such a ratio control amount that the values of the input image data and the output image data will not change in an edge reference position will be described.

Figure 19:
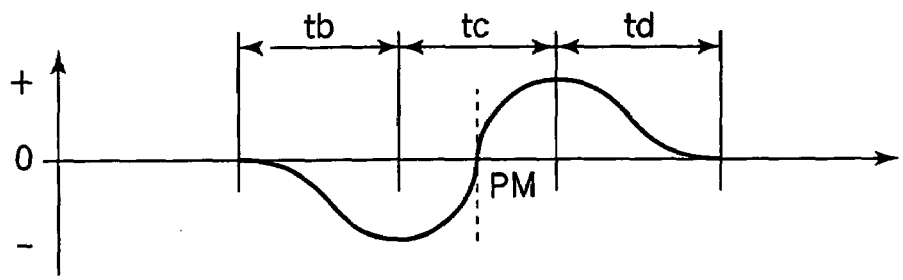
FIG. 19 is a diagram for describing a method of controlling a conversion ratio (a relationship between an edge reference position and an integral of a ratio control amount) in the fourth embodiment of the present invention.

FIG. 19 is a supplementary diagram for describing a relationship between the edge reference position PM and the ratio control amount RZC. In FIG. 19, the horizontal axis indicates the horizontal position of the image, and the vertical axis indicates the integral of the ratio control amount RZC shown in FIG. 18B. The integral of the ratio control amount RZC indicates how much the pixel data of the output image deviates from the input image in the horizontal direction. In other words, if the integral is zero, the pixel data of the input image and the pixel data of the output image are the same.

With reference to FIG. 19, how the integral of the ratio control amount, that is, a difference between the input image and the output image, varies with the horizontal position will next be described. In a segment preceding the generation period leading segment tb, there is no difference between the input image and the output image. In the generation period leading segment tb, the deviation of the output image towards the negative direction becomes greater. In the generation period central segment tc, the deviation of the output image towards the negative direction becomes smaller, reaches zero, and then the deviation of the output image towards the positive direction becomes greater. In the generation period trailing segment td, the deviation of the output image towards the positive direction becomes smaller and returns to zero again. In a segment subsequent to the generation period trailing segment td, there is no difference between the input image and the output image.

As described above, the integral of the ratio control amount becomes zero at a point in the generation period central segment tc. At that point, the level of the input image data matches the level of the output image data. That is, by generating the ratio control amount in such a manner that the point matches the edge reference position PM, the output image data matches the input image data in the edge reference position PM.

By adjusting the ratio control amount RZC in accordance with the edge reference position PM, sharpness of the edge portion can be enhanced, and the position of an edge portion will not be moved before or after the conversion of pixel number.

Figure 20:
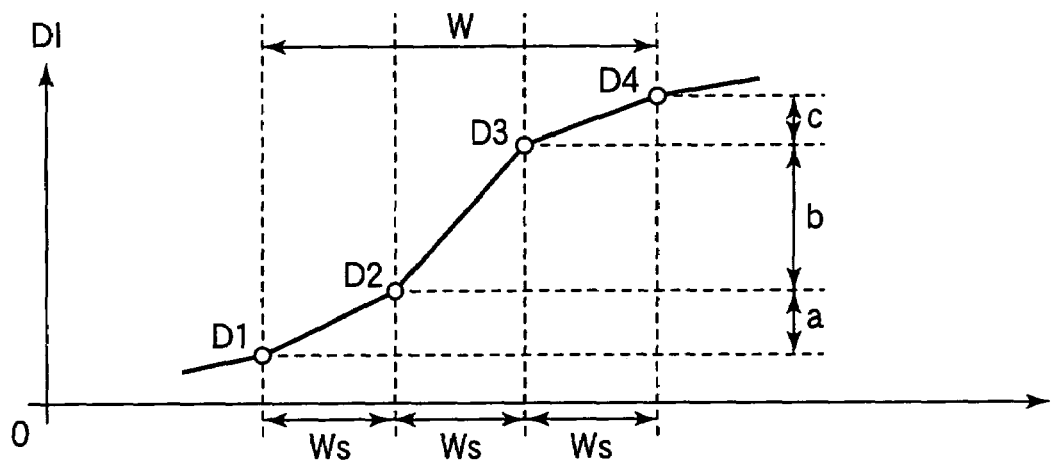
FIG. 20 is a diagram for describing operation of an edge width detection circuit in the fourth embodiment of the present invention.

The operation of the edge width detection circuit 51 will next be described. FIG. 20 is a diagram for describing operation of the edge width detection circuit 51 in the fourth embodiment, and shows a relationship between the image data (vertical axis) and the edge width (horizontal axis). In FIG. 20, D1, D2, D3, and D4 are image data sampled in a predetermined sampling cycle Ws. The amount of difference between D1 and D2 is designated as 'a', the amount of difference between D2 and D3 is designated as 'b', and the amount of difference between D3 and D4 is designated as 'c': a =D2−D1, b=D3−D2, and c=D4−D3. In FIG. 20, 'a' represents a change in data in a leading segment of the edge portion, 'b' represents a change in data in a central segment of the edge portion, and 'c' represents a change in data in a trailing segment of the edge portion. The sum of the durations of the leading segment of the edge portion, the central segment of the edge portion, and the trailing segment of the edge portion equals the edge width W.

The edge width detection circuit 51 detects a section as an edge portion if the image data monotonously increases or decreases in that section and the leading segment and the trailing segment of the section are more flat than the central segment. The edge portion is detected on conditions that 'a', 'b', and 'c' have the same sign or are zero and that both the absolute value of 'a' and the absolute value of 'c' are smaller than the absolute value of 'b'. These conditions are given below as the expressions (3a) and (3b).

$$(a\geq 0 \text{ and } b\geq 0 \text{ and } c\geq 0) \text{ or } (a\leq 0 \text{ and } b\leq 0 \text{ and } c\leq 0) \quad (3a)$$

$$|b|>|a| \text{ and } |b|>|c| \quad (3b)$$

If the expressions (3a) and (3b) are simultaneously satisfied, the section of D1 to D4 in FIG. 20 is regarded as an edge portion, and the width is output as the edge width W. The edge width W can be expressed as follows:

$$W=3\times Ws.$$

The description using FIG. 20 relates to a method of detecting an edge width from the image data extracted in a sampling cycle, but an edge width may be detected from the image data obtained in a different cycle.

Figure 21:
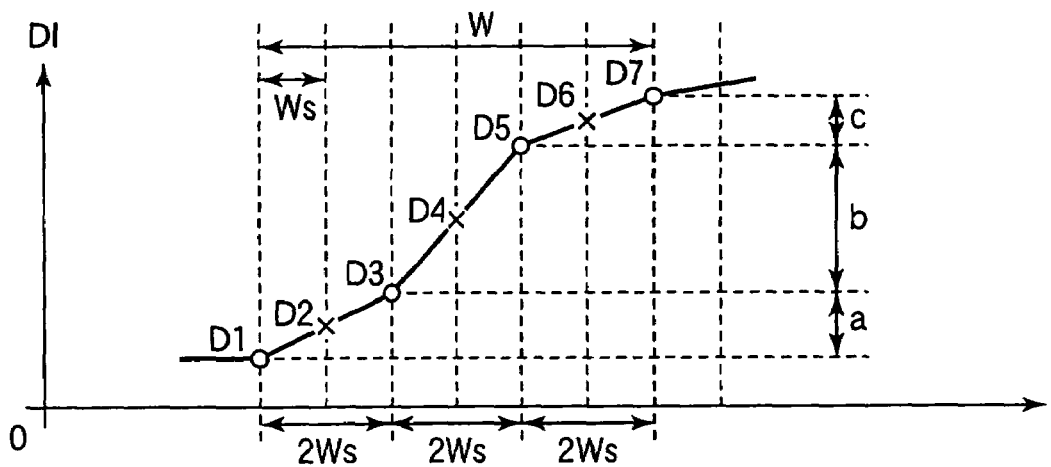
FIG. 21 is a diagram for describing operation of an edge width detection circuit in the fourth embodiment of the present invention.

FIG. 21 is a diagram showing that an edge width is detected from the image data detected in every two sampling cycles. In FIG. 21, D1 to D7 are image data sampled in a predetermined sampling cycle Ws. Among these, the image data D1, D3, D5, and D7 (represented by white circles in FIG. 21) extracted in every two sampling cycles may be used to detect an edge width. In FIG. 21, 'a', 'b', and 'c' are amounts of difference between adjacent image data obtained in every two sampling cycles: a=D3−D1, b=D5−D3, c=D7−D5. As has been described above, if 'a', 'b', and 'c' satisfy the expressions (3a) and (3b), the section of D1 to D7 is regarded as an edge portion, and the width is output as an edge width W. Because the edge width W=3×2×Ws, the edge width detected here is twice as great as that obtained from pixel data extracted in each sampling cycle. Therefore, the edge width of an image can be detected even if the band of the image data is lower than the sampling clock.

FIG. 22 is a diagram showing an example in which an edge width is detected from the image data extracted in every N sampling cycles (N is a positive integer). In FIG. 22, the pixel data represented by a white circle or a cross is image data sampled in a predetermined sampling cycle Ws. The pixel data represented by the white circles are image data extracted in every N sampling cycles, and these data may be used to detect an edge width. In FIG. 22, 'a', 'b', and 'c' represent amounts of difference between adjacent pixel data (white circles) in every N sampling cycles. If the expressions (3a) and (3b) are satisfied, the edge width W is output. In this case, because the edge width W=3×N×Ws, the edge portion detected here is N times wider than that detected from pixel data extracted in each sampling cycle.

A method of detecting an edge width from pixel data extracted at cycles of an integral multiple of the sampling cycle has been described above. However, pixel data re-sampled at cycles of a non-integral multiple of the sampling cycle may also be used.

FIGS. 23A and 23B are diagrams showing that image data re-sampled in every K sampling cycles are used. K is a positive real number. In FIG. 23A, D1 to D5 (represented by white circles) are image data sampled in a predetermined sampling cycle Ws. The image data D1 to D5 sampled in sampling cycle Ws are re-sampled in sampling cycle K×Ws, and re-sampled image data DR1, DR2, DR3, and DR4 are obtained as shown in FIG. 23B. For example, the image data DR2 can be obtained by interpolating the image data D2 and D3 at an appropriate ratio.

In FIG. 23B, 'a', 'b', and 'c' are amounts of differences between adjacent re-sampled image data: a=DR2−DR1, b=DR3−DR2, c=DR4−DR3. If 'a', 'b', and 'c' satisfy the expressions (3a) and (3b), the section of point DR1 to point DR4 is output as the edge width W. So, image data obtained from re-sampling may be used to detect an edge width. The edge width detected here is K times wider than that detected with pixel data extracted in each sampling cycle.

Figure 24:
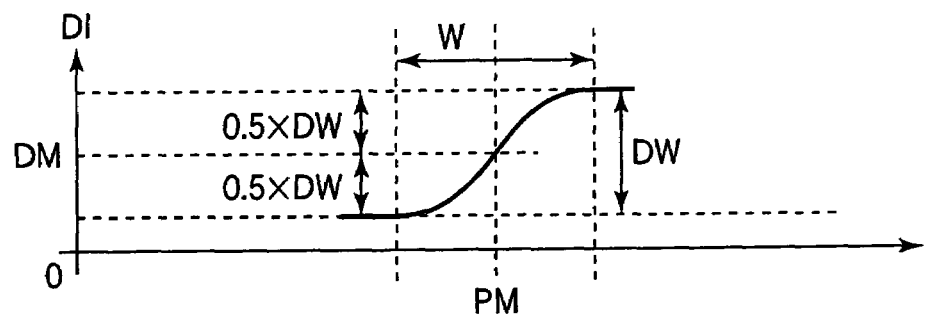
FIG. 24 is a diagram for describing operation of an edge reference position detection circuit in the fourth embodiment of the present invention.

Next, the operation of the edge reference position detection circuit 52 will be described. FIG. 24 is a diagram for describing operation of the edge reference position detection circuit 52, and shows a relationship of the edge reference position to the image data and the edge width. In FIG. 24, the horizontal axis indicates the horizontal position of the image, and the vertical axis indicates the level of the input image data DI. FIG. 24 also shows an edge portion of an image of which the edge width detected by the edge width detection circuit 51 is W, and the corresponding difference of the edge portion is DW. The edge reference position detection circuit 52 detects the horizontal position PM corresponding to the image level DM dividing the difference DW into two equal parts as a reference position PM.

Figure 25A:
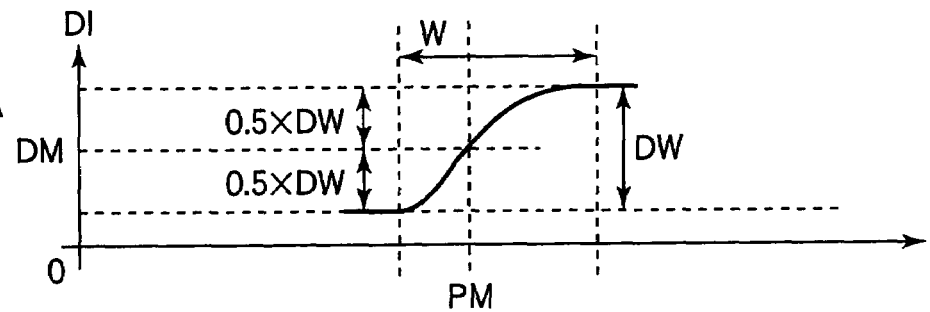
FIGS. 25A and 25B are diagrams for describing operation of an edge reference position detection circuit in the fourth embodiment of the present invention.
Figure 25B:
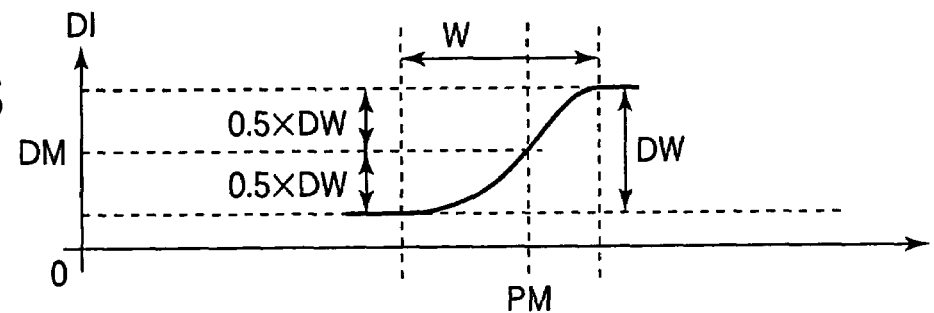

FIGS. 25A and 25B are diagrams showing the relationship between the shape of the edge portion and the edge reference position. FIG. 25A shows an edge portion having a shape approaching towards the leading end of the edge width W. In this case, the horizontal position PM corresponding to image level DM dividing the difference DW into two equal parts, that is, the edge reference position PM, is detected as a position closer to the leading end of the edge width W. FIG. 25B shows an edge portion having a shape approaching towards the trailing end of the edge width W. In this case, the edge reference position is detected as a position closer to the trailing end of the edge width W. With the operation of the edge reference position detection circuit 52, the edge reference position detection circuit 52 can detect an appropriate edge reference position, depending on the shape of the edge portion.

In the description above, the horizontal position corresponding to the image level dividing the difference of the edge portion at a ratio of 0.5:0.5 is detected as the edge reference position. However, the horizontal position may correspond to an image level dividing an difference of the edge portion at a ratio of α: (1−α), where $0 \leq \alpha < 1$. By adjusting α, the edge reference position can be adjusted appropriately in accordance with visibility and user preferences.

FIGS. 26A1 to 26E1 and FIGS. 26A2 to 26E2 are diagrams for describing a method of controlling conversion ratio information in the fourth embodiment. FIGS. 26A1 and 26A2 show the input image data DI, FIGS. 26B1 and 26B2 show a ratio control amount RZC, FIGS. 26C1 and 26C2 show conversion ratio information RZ, FIGS. 26D1 and 26D2 show a conversion ratio Z, and FIGS. 26E1 and 26E2 show output image data DO. The conversion ratio information RZ is a reciprocal of the conversion ratio Z (that is, RZ=1/Z). FIGS. 26A1 to 26E1 show an edge portion of the input image data DI with the edge width W, the edge reference position PM, and the difference D1 of the edge portion, and FIGS. 26A2 to 26E2 show an edge portion of the input image data DI with the edge width W, the edge reference position PM, and the difference D2 of the edge portion. The difference D1 in FIGS. 26A1 to 26E1 is greater than the difference D2 of the edge portion in FIGS. 26A2 to 26E2. The image data DM1 in the edge reference position PM in FIGS. 26A1 to 26E1 is greater than the image data DM2 in FIGS. 26A2 to 26E2 (see FIGS. 26A1 and 26A2).

In FIGS. 26A1 to 26E1 and FIGS. 26A2 to 26E2, differences of the edge portion are different, but the ratio control signal RZC is generated in accordance with the same edge width W in any cases. Accordingly, as shown in FIGS. 26B1 and 26B2, similar ratio control signals RZC are generated in spite of different differences of the edge portion. Although the difference of the edge portions are different, the conversion ratio information RZ and the conversion ratio Z can vary in a similar manner, and the edge width of the output image data DO can be reduced to a similar level (see FIGS. 26C1 to 26E1 and FIGS. 26C2 to 26E2).

Further, as has been described earlier, a ratio control signal is generated so that the input image data and the output image data do not change in an edge reference position (see FIGS. 26A1 and 26E1 and FIGS. 26A2 and 26E2). The ratio control amount is determined by the edge width W and the edge reference position PM and is independent of the difference of the edge portion.

If a ratio control amount is generated in accordance with the difference of the edge portion, that is, if a conversion ratio is adjusted so that an edge portion changes more steeply as the difference of the edge portion becomes greater, for example, it is difficult to sufficiently enhance sharpness of an edge portion with a small difference of the edge portion, because the ratio control amount is small. If the ratio control amount is increased to such a level that sharpness of an edge portion with a small difference of the edge portion can be enhanced sufficiently, the image would glare because of excessive sharpness in an edge portion with a great difference of the edge portion. In the fourth embodiment, because the conversion ratio is adjusted in accordance with the detected edge width, sharpness of the edge portion can be enhanced in proper quantities, irrespective of the size of the difference of the edge portion.

Fifth Embodiment

A fifth embodiment is a modification of the fourth embodiment. FIGS. 27A1 to 27E1 and FIGS. 27A2 to 27E2 are diagrams for describing a method of controlling a conversion ratio (a relationship between amplitude of a ratio control amount and steepness of a change in an edge portion of an output image) in the fifth embodiment of the present invention. FIGS. 27A1 and 27A2 show input image data DI, FIGS. 27B1 and 27B2 show a ratio control amount RZC, FIGS. 27C1 and 27C2 show conversion ratio information RZ, FIGS. 27D1 and 27D2 show a conversion ratio Z, and FIGS. 27E1 and 27E2 show output image data DO. RZ is a reciprocal of Z (that is, RZ=1/Z).

In FIGS. 27A1 to 27E1 and FIGS. 27A2 to 27E2, the common image data is input, and the edge width W is detected (see FIGS. 27A1 and 27A2). The ratio control amounts ZC are generated in accordance with the edge width W, and these ratio control amounts have different amplitudes. The amplitude (a difference between a maximum value and a minimum value) of the ratio control amount generated in FIGS. 27A1 to 27E1 is G1, and the amplitude of the ratio control amount generated in FIGS. 27A2 to 27E2 is G2. The amplitude G1 and the amplitude G2 of the ratio control amounts satisfy G1<G2 (see FIGS. 27B1 and 27B2). In each of the case of FIGS. 27A1 to 27E1 and the case of FIGS. 27A2 to 27E2, the conversion ratio information RZ is generated (see FIGS. 27C1 and 27C2) by superimposing the ratio control amount RZC on the reference conversion ratio RZ0 given in advance. In the meantime, the conversion ratio Z=1/RZ is as shown in FIGS. 27D1 and 27D2. The pixel number is converted at the conversion ratio RZ (see FIGS. 27E1 and 27E2).

As shown in FIGS. 27D1 and 27D2, the conversion of pixel number in the generation period leading segment tb and the generation period trailing segment td is performed at a greater conversion ratio in FIGS. 27A2 to 27E2 than in FIGS. 27A1 to 27E1. The conversion of pixel number in the generation period central segment tc is performed at a smaller conversion ratio in FIGS. 27A2 to 27E2 than in FIGS. 27A1 to 27E1. As a result, the edge width of the converted output image in FIGS. 27A2 to 27E2 becomes smaller than that in FIGS. 27A1 to 27E1. The edge portion of the converted output image in FIGS. 27A2 to 27E2 becomes more steep than that in FIGS. 27A1 to 27E1, and sharpness of the image is enhanced accordingly.

Steepness and sharpness of the edge portion of the output image can be freely adjusted by specifying arbitrary amplitude (a maximum value and a minimum value) of the ratio control amount (variable control) as described above. For example, the amplitude of the ratio control amount can be variably controlled by multiplying the ratio control amount by an arbitrary coefficient.

Sixth Embodiment

A sixth embodiment is a modification of the fourth embodiment. FIGS. 28A1 to 28E1 and FIGS. 28A2 to 28E2 are diagrams for describing a method of controlling a conversion ratio (in the case of changing amplitude of a ratio control amount in accordance with an edge width of an input image) in the sixth embodiment of the present invention. FIGS. 28A1 and 28A2 show input image data DI, FIGS. 28B1 and 28B2 show a ratio control amount RZC, FIGS. 28C1 and 28C2 show conversion ratio information RZ, FIGS. 28D1 and 28D2 show a conversion ratio Z, and FIGS. 28E1 and 28E2 show output image data DO. RZ is a reciprocal of Z (that is, RZ=1/Z).

FIGS. 28A1 to 28E1 show a case where the image data of the edge width W1 is input, and FIGS. 28A2 to 28E2 show a case where the image data of the edge width W2 is input. The edge width W1 and the edge width W2 satisfy W1<W2 (see FIGS. 28A1 and 28A2). A ratio control amount having the amplitude G1 is generated in the case of the edge width W1 in FIGS. 28A1 to 28E1, and a ratio control amount having the amplitude G2 is generated in the case of the edge width W2 in FIGS. 28A2 to 28E2 (see FIGS. 28B1 and 28B2). As has been described in the fifth embodiment, an edge portion is converted to more steep shape as the amplitude of the ratio control amount becomes greater.

If the amplitudes G1 and G2 of the ratio control amounts shown in FIGS. 28A1 to 28E1 and FIGS. 28A2 to 28E2 respectively are adjusted appropriately, the converted output image data shown in FIGS. 28A1 to 28E1 and FIGS. 28A2 to 28E2 can have the similar edge width. More specifically, if G1<G2, an adjustment should be made so that a ratio control amount with smaller amplitude G1 is generated in the case of smaller edge width W1 and a ratio control amount with greater amplitude G2 is generated in the case of greater edge width W2.

The amplitudes G1 and G2 of the ratio control amounts can also be adjusted so that the edge width of the output image in FIGS. 28A2 to 28E2 becomes greater than the edge width of the output image in FIGS. 28A1 to 28E1. An adjustment can also be made so that the edge width of the output image in FIGS. 28A1 to 28E1 becomes greater than that in FIGS. 28A2 to 28E2.

An edge portion having an arbitrary edge width in the input image can be converted to an edge portion having a desired edge width, by specifying arbitrary amplitude of ratio control amount for each detected edge width.

Seventh Embodiment

A seventh embodiment is a modification of the fourth embodiment. FIGS. 29A1 to 29E1 and FIGS. 29A2 to 29E2 are diagrams for describing a method of controlling a conversion ratio (a relationship between a period in which a ratio control amount is generated and steepness of an edge portion in an output image) in the seventh embodiment of the present invention. FIGS. 29A1 and 29A2 show input image data DI, FIGS. 29B1 and 29B2 show a ratio control amount RZC, FIGS. 29C1 and 29C2 show conversion ratio information RZ, FIGS. 29D1 and 29D2 show a conversion ratio Z, and FIGS. 29E1 and 29E2 show output image data DO. RZ is a reciprocal of Z, that is, RZ=1/Z.

The input image data in FIGS. 29A1 to 29E1 and FIGS. 29A2 to 29E2 have the same edge width W (see FIGS. 29A1 and 29A2). In FIGS. 29A1 to 29E1, the ratio control amount ZC is generated in a period ZCW1. A period ZCW1 shown in FIGS. 29A1 to 29E1, that is, a period in which a ratio control amount is generated, will be referred to as "a generation period of ratio control amount." On the other hand, in FIGS. 29A2 to 29E2, the generation period of ratio control amount is designated as ZCW2. Here, ZCW1<ZCW2 (see FIGS. 29B1 and 29B2).

A conversion ratio is generated respectively in FIGS. 29A1 to 29E1 and FIGS. 29A2 to 29E2 by superimposing the generated ratio control amount RZC on the reference conversion ratio information RZO given in advance (see FIGS. 29C1 and 29C2). At this time, the conversion ratio Z (=1/RZ) becomes as shown in FIG. 29D. The conversion of pixel number in the generation period leading segment tb and the generation period trailing segment td is performed at a conversion ratio greater than the reference conversion ratio Z0, and the conversion of pixel number in the generation period central segment tc is performed at a conversion ratio smaller than the reference conversion ratio Z0 (see FIGS. 29E1 and 29E2).

As can be understood from comparison between FIGS. 29A1 to 29E1 and FIGS. 29A2 to 29E2, the period of conversion at a conversion ratio smaller than the reference conversion ratio Z0 in the generation period central segment tc is longer the period in FIGS. 29A2 to 29E2. Accordingly, the converted output image in FIGS. 29A2 to 29E2 has a greater steepness of the edge portion than that in FIGS. 29A1 to 29E1, and an image can be obtained with enhanced sharpness accordingly. Steepness and sharpness of an edge portion of an output image can be adjusted freely by adjusting the generation period of ratio control amount arbitrarily (variable control) as described above.

Eighth Embodiment

An eighth embodiment is a modification of the fourth embodiment. FIGS. 30A1 to 30E1 and FIGS. 30A2 to 30E2 are diagrams for describing a method of controlling a conversion ratio (in the case of changing a generation period of ratio control amount in accordance with an edge width of an input image) in the eighth embodiment of the present invention. FIGS. 30A1 and 30A2 show input image data DI, FIGS. 30B1 and 30B2 show a ratio control amount RZC, FIGS. 30C1 and 30C2 show conversion ratio information RZ, FIGS. 30D1 and 30D2 show a conversion ratio Z, and FIGS. 30E1 and 30E2 show output image data DO. RZ is a reciprocal of Z, that is, RZ=1/Z.

FIGS. 30A1 to 30E1 show the input image of an edge portion with the edge width W1, and FIGS. 30A2 to 30E2 show the input image of an edge portion with the edge width W2. The edge widths W1 and W2 have a relationship expressed as W1<W2 (see FIGS. 30A1 and 30A2). A ratio control amount having the generation period ZCW1 is detected from the edge width W1 in FIGS. 30A1 to 30E1, and a ratio control amount having the generation period ZCW2 is detected from the edge width W2 in FIGS. 30A2 to 30E2 (see FIGS. 30B1 and 30B2)

As has been described in the seventh embodiment, steepness of the edge portion can be enhanced by conversion with a greater generation period of ratio control amount. If generation period of ratio control amount ZCW1 in FIGS. 30A1 to 30E1 and generation period of ratio control amount ZCW2 in FIGS. 30A2 to 30E2 are appropriately adjusted, for example, the converted output image data in FIGS. 30A1 to 30E1 and the converted output image data in FIGS. 30A2 to 30E2 can have the similar edge width. More specifically, if ZCW1<ZCW2, an adjustment should be made so that a ratio control amount having smaller generation period ZCW1 is generated in the case of smaller edge width W1 and a ratio control amount having greater generation period ZCW2 is generated in the case of greater edge width W2.

The edge width of the output image of FIGS. 30A2 to 30E2 can become greater than the edge width of the output image of FIGS. 30A1 to 30E1 if generation period of ratio control amount ZCW1 and generation period of ratio control amount ZCW2 are appropriately adjusted. Further, an adjustment can also be made so that the edge width of the output image of FIGS. 30A1 to 30E1 becomes greater than the edge width of the output image of FIGS. 30A2 to 30E2.

An edge portion having an arbitrary edge width in the input image can be freely converted to an edge portion having a desired edge width, by specifying an arbitrary generation period of ratio control amount for each detected edge width.

Ninth Embodiment

A ninth embodiment is a modification of the fourth embodiment. FIGS. 31A1 to 31E1 and FIGS. 31A2 to 31E2 are diagrams for describing a method of controlling a conversion ratio (in the case of changing both a generation period and amplitude of ratio control amount in accordance with an edge width of an input image) in the ninth embodiment of the present invention. FIGS. 31A1 and 31A2 show input image data DI, FIGS. 31B1 and 31B2 show a ratio control amount RZC, FIGS. 31C1 and 31C2 show conversion ratio information RZ, FIGS. 31D1 and 31D2 show a conversion ratio Z, and FIGS. 31E1 and 31E2 show output image data DO. RZ is a reciprocal of Z, that is, RZ=1/Z.

FIGS. 31A1 to 31E1 show a case where an image with an edge portion having the edge width W1 is input, and FIGS. 31A2 to 31E2 show a case where an image with an edge portion having the edge width W2 is input. The edge width W1 and the edge width W2 satisfy W1<W2 (see FIGS. 31A1 and 31A2) The ratio control amounts are generated so as to have different generation periods and different amplitudes (see FIGS. 31B1 and 31B2) in each of the cases of the edge width W1 in FIGS. 31A1 to 31E1 and the edge width W2 in FIGS. 31A2 to 31E2.

As has been described already in the fifth embodiment and the seventh embodiment, steepness of the edge portion increases by conversion with a ratio control amount having greater amplitude and a greater generation period of ratio control amount.

If the generation period ZCW1 of ratio control amount and the amplitude G1 of the ratio control amount in FIGS. 31A1 to 31E1 and the generation period ZCW2 of ratio control amount and the amplitude G2 of the ratio control amount in FIGS. 31A2 to 31E2 are adjusted appropriately, the converted output images of FIGS. 31A1 to 31E1 and FIGS. 31A2 to 31E2 can have the same edge width. More specifically, if G1<G2 and ZCW1<ZCW2, an adjustment should be made so that a ratio control amount having smaller generation period ZCW1 and smaller amplitude G1 is generated in the case of smaller edge width W1, and a ratio control amount having greater generation period ZCW2 and greater amplitude G2 is generated in the case of greater edge width W.

If the amplitudes G1 and G2 and the generation periods ZCW1 and ZCW2 are appropriately adjusted, the edge width of the output image in FIGS. 31A2 to 31E2 can become greater than the edge width of the output image in FIGS. 31A1 to 31E1. An adjustment can also be made to make the edge width of the output image in FIGS. 31A1 to 31E1 greater than that in FIGS. 31A2 to 31E2.

As described above, an edge portion having an arbitrary edge width in an input image can be converted to an edge portion having a desired edge width, by specifying arbitrary amplitude and an arbitrary generation period of ratio control amount for each detected edge width.

Tenth Embodiment

A tenth embodiment is a modification of the fourth embodiment. FIGS. 32A1 to 32E1, FIGS. 32A2 to 32E2, and FIGS. 32A3 to 32E3 are diagrams for describing a method of controlling a conversion ratio (a relationship between a predetermined reference conversion ratio and number of ratio-control-amount data items) in the tenth embodiment of the present invention. FIGS. 32A1 to 32A3 show input image data DI, FIGS. 32B1 to 32B3 show a ratio control amount RZC, FIGS. 32C1 to 32C3 show conversion ratio information RZ, FIGS. 32D1 to 32D3 show a conversion ratio Z, and FIGS. 32E1 to 32E3 show output image data DO.

FIGS. 32A1 to 32E1 show a case where the input image and the output image have the same pixel number (the reference conversion ratio Z0=1). FIGS. 32A2 to 32E2 show a case where an image is converted for scaling up (reference conversion ratio Z0>1). FIGS. 32A3 to 32E3 show a case where an image is converted for scaling down (reference conversion ratio Z0<1).

Further, black circles in FIGS. 32A1 to 32A3 represent pixel data in the input image, and white circles in FIGS. 32D1 to 32D3 represent pixel data of the output image. White circles in FIGS. 32B1 to 32B3 represent data of the ratio control amount RZC corresponding to the pixel data of the output image. Furthermore, white circles in FIGS. 32C1 to 32C3 represent data of the conversion ratio information RZ corresponding to the output image data. Moreover, white circles in FIGS. 32D1 to 32D3 represent data of the conversion ratio Z corresponding to the pixel data of the output image.

In FIGS. 32A1 to 32E1, since the reference conversion ratio Z0 is 1, the input image and the output image have the same pixel number (that is, the same pixel density) the black circles and intervals of white circles are the same. In FIGS. 32A2 to 32E2, because the conversion for scaling-up is performed (the reference conversion ratio Z0>1), the converted output image has a higher pixel density than the input image. The white circles appear at shorter intervals than the black circles. In FIGS. 32A3 to 32E3, because the conversion for scaling-down is performed (the reference conversion ratio Z0<1), the converted output image has a lower pixel density than the input image. The white circles appear at longer intervals than the white circles.

In FIGS. 32A1 to 32E1, FIGS. 32A2 to 32E2, and FIGS. 32A3 to 32E3, the common image data is input, and the edge width W and the edge reference position PM are detected separately (see FIGS. 32A1 to 32A3). The ratio control amount RZC having the generation period ZCW is separately generated in accordance with the edge width W and the edge reference position PM (see FIGS. 32B1 to 32B3). As has been already described, if the same generation period of ratio control amount ZCW is used in FIGS. 32A1 to 32E1, FIGS. 32A2 to 32E2, and FIGS. 32A3 to 32E3, the output image can have the same steepness of the edge portion. However, because pixel densities are different in FIGS. 32A1 to 32E1, FIGS. 32A2 to 32E2, and FIGS. 32A3 to 32E3, numbers of ratio-control-amount data items in the generation period of ratio control amount ZCW are different in FIGS. 32A1 to 32E1, FIGS. 32A2 to 32E2, and FIGS. 32A3 to 32E3. In the subsequent description, number of ratio-control-amount data items generated in the generation period of ratio control amount ZCW is referred to as "a ratio control amount data number."

FIGS. 32A2 to 32E2 show the case of conversion for scaling-up, and the pixel density is higher than the pixel density in FIGS. 32A1 to 32E1. Ratio control amount data number ZCN2 in the generation period of ratio control amount ZCW in FIGS. 32A2 to 32E2 is greater than ratio control amount data number ZCN1 in the generation period of ratio control amount ZCW in FIGS. 32A1 to 32E1, that is, ZCN1<ZCN2. FIGS. 32A3 to 32E3 show the case of conversion for scaling-down, and the pixel density is lower than the pixel density in FIGS. 25A1 to 25E1. The ratio control amount data number ZCN3 in the generation period of ratio control amount ZCW in FIGS. 32A3 to 32E3 is smaller than ratio control data count ZCN1 in the generation period of ratio control amount ZCW in FIGS. 32A1 to 32E1, that is, ZCN3<ZCN1.

The same level of steepness of the edge portion can be maintained in the output image even if the conversion ratio of the entire image is changed by changing the number of ratio-control-amount data items in accordance with the conversion ratio of the entire image (reference conversion ratio Z0). In other words, an output image can be obtained with desired sharpness by generating a ratio control amount in accordance with the detected edge width and the detected edge reference position and changing the number of ratio-control-amount data items in accordance with the conversion ratio of the entire image, even if the conversion ratio of the entire image is changed.

Eleventh Embodiment

Figure 33:
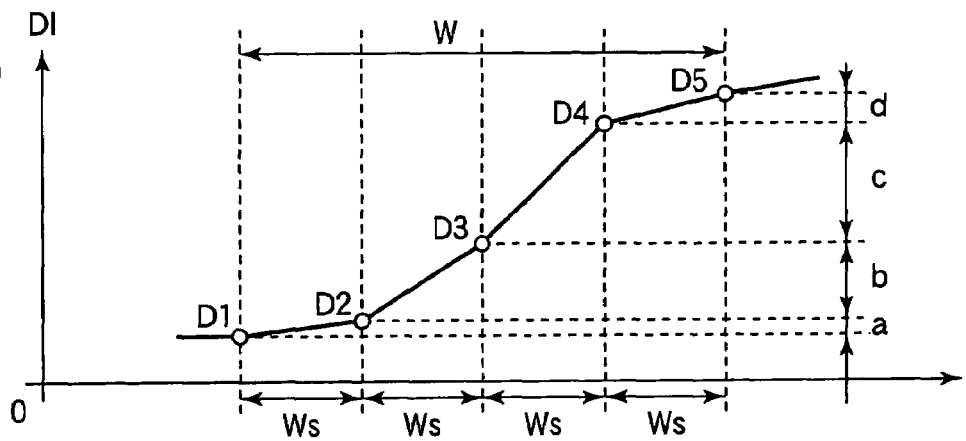
FIG. 33 is a diagram for describing operation of an edge width detection circuit in an eleventh embodiment of the present invention.

An eleventh embodiment is a modification of the first embodiment or the fourth embodiment. FIG. 33 are diagrams for describing operation of an edge width detection circuit 51 in the eleventh embodiment of the present invention, and shows the relationship between image data DI and the edge width W. In FIG. 33, D1, D2, D3, D4, and D5 are image data sampled in a predetermined sampling cycle Ws. In FIG. 33, 'a', 'b', 'c', and 'd' are differences between adjacent image data: a=D2−D1, b=D3−D2, c=D4−D3, and d=D5−D4. In other words, in FIG. 33, 'a' is a change in image data in the leading segment of the edge portion, 'b' and 'c' are changes in the image data in the central segment of the edge portion, and 'd' is a change in the image data in the trailing segment of the edge portion.

The edge width detection circuit 51 of the eleventh embodiment detects a section in which image data monotonously increase or decreases and in which the leading segment and the trailing segment are more flat than the central segment, as an edge portion. The edge portion is detected on conditions that 'a', 'b', 'c', and 'd' have the same sign or are zero and both |b| and |c| are greater than both |a| and |d|. These conditions are given below as the expressions (4a) and (4b):

$$(a \geq 0 \text{ and } b \geq 0 \text{ and } c \geq 0 \text{ and } d \geq 0) \text{ or } (a \leq 0 \text{ and } b \leq 0 \text{ and } c \leq 0 \text{ and } d \leq 0) \quad (4a)$$

$$|b|>|a| \text{ and } |b|>|d| \text{ and } |c|>|a| \text{ and } |c|>|d| \quad (4b)$$

If the expressions (4a) and (4b) are satisfied at the same time, the section from D1 to D5 in FIG. 33 is regarded as an edge portion, and the width of D1 to D5 is output as the edge width W. The edge width W is expressed as W=4×Ws. The edge width detection circuit 51 can detect an edge width in that way.

Figure 34:
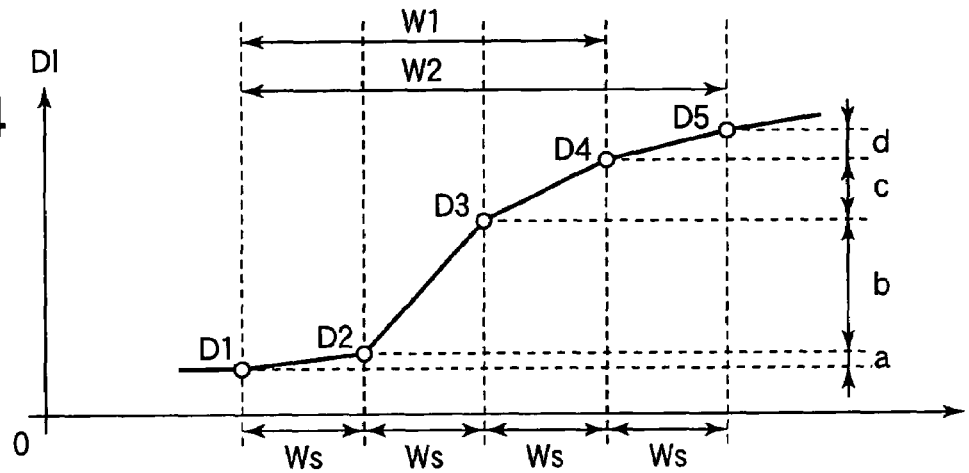
FIG. 34 is a diagram for describing operation of an edge width detection circuit in the eleventh embodiment of the present invention.

FIG. 34 is a diagram for describing operation of the edge width detection circuit 51 in the eleventh embodiment, and shows a relationship between image data DI and the edge width W. With reference to FIG. 34, the operation when two different edge widths are detected from a single edge portion will be described.

In FIG. 34, D1 to D5 are image data sampled in a sampling cycle Ws. In FIG. 34, 'a', 'b', 'c', and 'd' are differences between adjacent pixels: a =D2−D1, b=D3−D2, c=D4−D3, d=D5−D4.

As shown in FIG. 34, 'a', 'b', and 'c' may satisfy the expressions (3a) and (3b) while 'a', 'b', 'c', and 'd' satisfy the expressions (4a) and (4b). In this case, the section of D1 to D4 is detected as the edge width W1=3 ×Ws, and the section of D1 to D5 is detected as the edge width W2=4×Ws. When two different edge widths such as W1<W2 are simultaneously detected, the edge width detection circuit 51 assigns priority to and outputs greater edge width as W.

If two or more different edge widths are simultaneously detected, an edge portion having a smaller edge width is a part of an edge portion having a greater edge width. If the smaller edge width is detected, a part of the greater edge portion would be converted with greater steepness. Therefore, an unnecessary false edge portion would be generated, and a coarse image would be obtained.

In contrast, the edge width detection circuit 51 in the eleventh embodiment detects a greater edge width if two different edge widths are simultaneously found, so that image degradation as described above can be avoided.

Twelfth Embodiment

Figure 35:
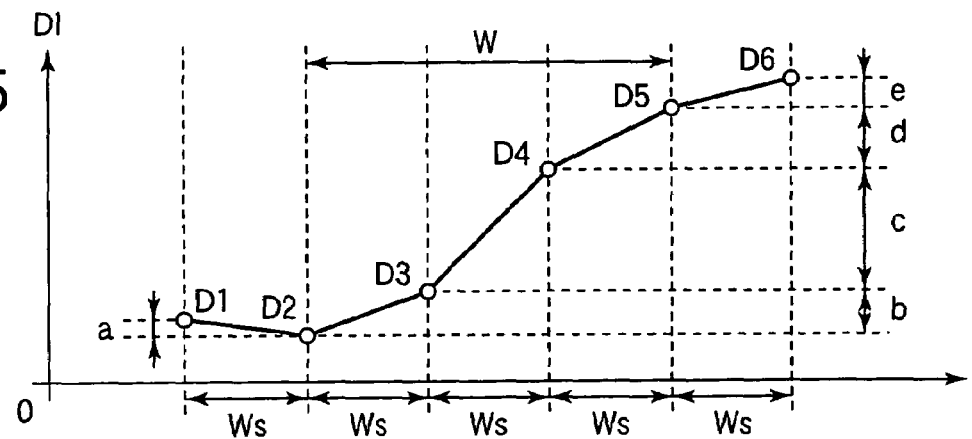
FIG. 35 is a diagram for describing operation of an edge width detection circuit in a twelfth embodiment of the present invention.

A twelfth embodiment is a modification of the first embodiment or the fourth embodiment. FIG. 35 is a diagram for describing operation of the edge width detection circuit 51 in the twelfth embodiment of the present invention, and shows a relationship between image data DI and the edge width W. In FIG. 35, D1, D2, D3, D4, D5, and D6 are image data sampled in a predetermined sampling cycle Ws. In FIG. 35, 'a', 'b', 'c', 'd', and 'e' are differences between adjacent pixels: a=D2−D1, b=D3−D2, c=D4−D3, d=D5−D4, and e=D6−D5. Further, in FIG. 35, 'b' represents a change in image data in the leading segment of the edge portion, 'c' represents a change in image data in the central segment of the edge portion, and 'd' represents a change in image data in the trailing segment of the edge portion. 'a' represents a change in image data in a segment preceding the edge portion, and 'e' represents a change in image data in a segment following the edge portion.

An edge portion (D2 to D5) detected by the edge width detection circuit 51 of the twelfth embodiment is such a part that the image data monotonously increases or decreases, the leading segment (D2 to D3) and the trailing segment (D4 to D5) are more flat than the central segment (D3 to D4), and the segments (D2 to D5) are preceded by a pre-edge flat segment (D1 to D2) and followed by a post-edge flat segment (D3 to D4).

Because the image data monotonously increase or decreases, it is detected that 'b', 'c', and 'd' have the same sign or are zero, as shown in the expression (5a). Further, because the leading segment and the trailing segment are more flat than the central segment, it is detected that |c| is greater than both |b| and |d|, as shown in the expression (5b). Moreover, because an edge portion is preceded by the pre-edge flat segment and followed by the post-edge flat segment, it is detected that a change |a| in a segment preceding the edge portion is smaller than a change |b| in the leading segment of the edge portion and a change |e| in a segment following the edge portion is smaller than a change |d| in the trailing segment of the edge portion, as shown in the expression (5c).

$$(b \geq 0 \text{ and } c \geq 0 \text{ and } d \geq 0) \text{ or } (b \leq 0 \text{ and } c \leq 0 \text{ and } d \leq 0) \quad (5a)$$

$$|c|>|b| \text{ and } |c|>|d| \quad (5b)$$

$$|a|<|b| \text{ and } |e|<|d| \quad (5c)$$

If the expressions (5a), (5b), and (5c) are all satisfied, the section of D2 to D5 in FIG. 35 is regarded as an edge portion, and the width is output as edge width W. The edge width W is expressed as W=3×Ws. Because the edge width detection circuit 51 operates as described above, the edge width of an edge portion preceded and followed by flat segments can be detected.

A condition of being a pre-edge flat segment and a post-edge flat segment is given by the expression (5c) above. A condition given by the expression (6) below may be used instead of the expression (5c):

$$|a|<0.5 \times |b| \text{ and } |e|<0.5|d| \quad (6)$$

In this case, it is detected that a change |a| in a segment preceding the edge portion is smaller than ½ of a change |b| in the leading segment of the edge portion, and a change |e| in a segment following the edge portion is smaller than ½ of a change |d| in the trailing segment of the edge portion. That is, if |a| and |e| are ½ of the expression (5c), the edge width is detected. Accordingly, the edge width of an edge portion preceded and followed by a flat segment can be detected.

The coefficients of |b| and |d| are 0.5 in the expression (6), but real number K may be used as in the expression (7) below (0<K<1).

$$|a|<K \times |b| \text{ and } |e|<K \times |d| \quad (7)$$

As coefficient K is brought closer to 0, smaller changes |a| and |e| in the segments preceding and following the edge portion can be detected, that is, more flat segments preceding and following the edge portion can be detected. The flatness of the segments preceding and following the edge portion to be detected can be changed by adjusting the coefficient K appropriately.

Thirteenth Embodiment

Figure 36:
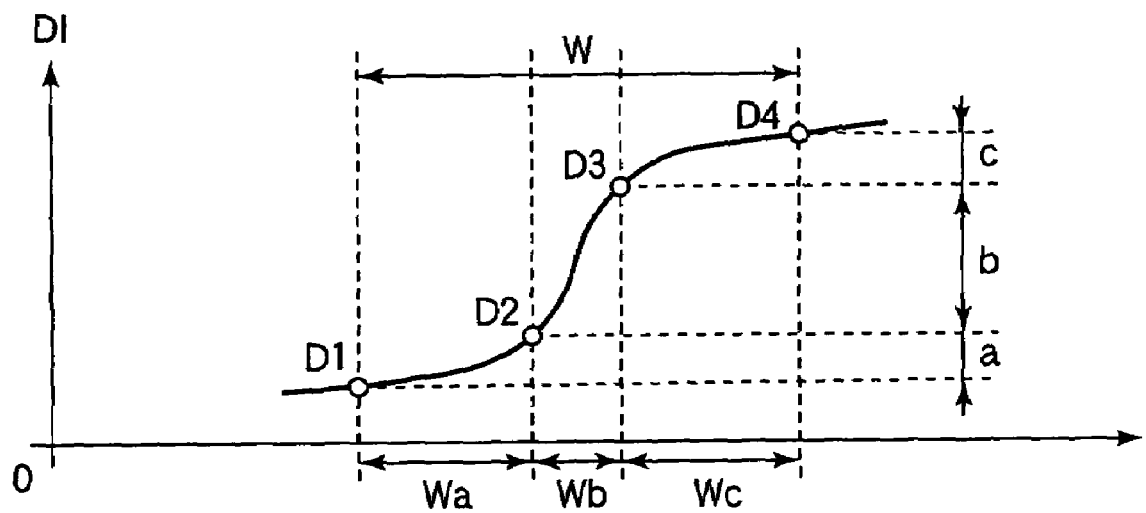
FIG. 36 is a diagram for describing operation of an edge width detection circuit in a thirteenth embodiment of the present invention.

A thirteenth embodiment is a modification of the first embodiment or the fourth embodiment. FIG. 36 is a diagram for describing operation of the edge width detection circuit 51 in the thirteenth embodiment of the present invention, and for describing a relationship between the image data and the edge width. In the description using FIG. 20, an edge width is detected in accordance with the pixel data sampled in a predetermined sampling cycle. In contrast to this, in FIG. 36, an example in which an edge width is detected in accordance with the image data sampled in an uneven sampling cycle will be described.

In FIG. 36, D1, D2, D3, and D4 are image data sampled in different sampling cycles Wa, Wb, and Wc, where Wa>Wb and Wc>Wb. In FIG. 36, 'a', 'b', and 'c' are differences between adjacent pixel data: a=D2−D1, b=D3−D2, and c=D4−D3. 'a' is a change in image data in the leading segment of the edge portion, 'b' is a change in image data in the central segment of the edge portion, and 'c' is a change in image data in the trailing segment of the edge portion.

A part in which image data monotonously increase or decreases and the leading segment and the trailing segment are more flat than the central segment is detected as an edge portion. The conditions for detecting the edge portion are the expressions (3a) and (3b), which are described with reference to FIG. 20. If the expressions (3a) and (3b) are satisfied, the duration from D1 to D4 in FIG. 36 is regarded as an edge portion, and the duration is output as the edge width W.

Because the width Wb of the central segment of the edge portion is smaller than the width Wa and the width Wc, even if the expressions (3a) and (3b) are satisfied, the edge width of such an edge portion which changes more steeply in the central segment of the edge portion than in the leading segment of the edge portion or the trailing segment of the edge portion can be detected. In other words, the edge width of such an edge portion that changes more gently in the leading segment of the edge portion and the trailing segment of the edge portion than in the central segment of the edge portion can be detected.

Figure 37:
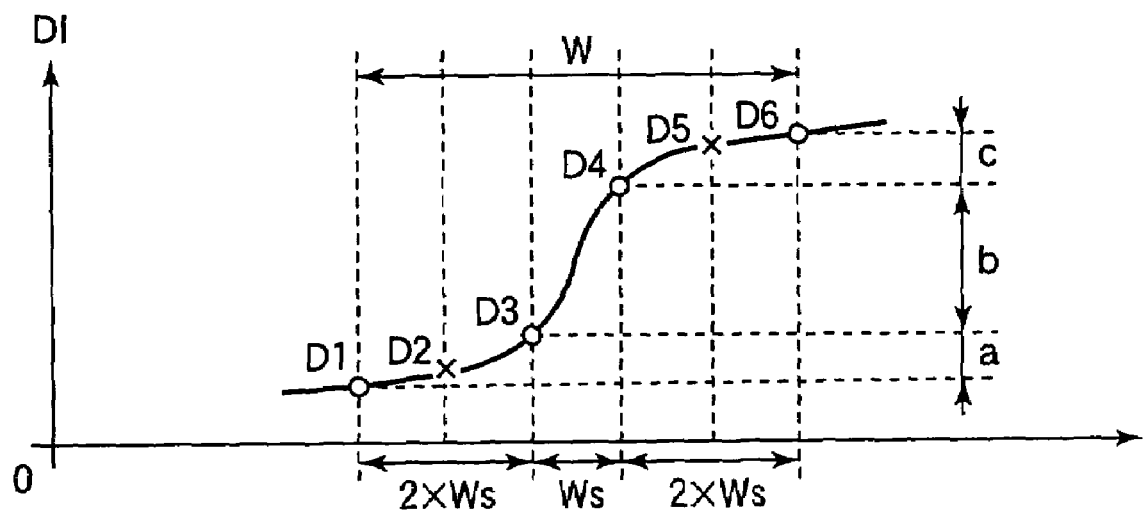
FIG. 37 is a diagram for describing operation of an edge width detection circuit in the thirteenth embodiment of the present invention.

FIG. 37 is a diagram for describing another operation of the edge width detection circuit 51 in the thirteenth embodiment of the present invention, and shows a method of sampling image data in an uneven sampling cycle. In FIG. 37, D1 to D6 represented by a white circle or a cross are image data sampled in a predetermined sampling cycle Ws. The image data D2 and D5 represented by a cross are eliminated, and image data D1, D3, D4, and D6 represented by white circles are used to detect edge width W. The spacing between D2 and D3 equals sampling cycle Ws while the spacing between D1 and D2 and the spacing between D3 and D4 are twice as wide as sampling cycle Ws (2×Ws).

In FIG. 37, 'a', 'b', and 'c' are differences between adjacent pixels in image data represented by white circles: a=D3−D1, b=D4−D3, and c=D6−D4. If 'a', 'b', and 'c' satisfy the expressions (3a) and (3b), the duration of the section from D1 to D6 is detected as the edge width W. The expressions (3a) and (3b) have already been described.

In this way, image data sampled at uneven intervals can be obtained by eliminating a part of image data sampled in a predetermined sampling cycle. An edge width may be detected from the image data obtained in that way.

FIGS. 38A and 38B are diagrams for describing operation of the edge width detection circuit 51 in the thirteenth embodiment of the present invention, and show another method of sampling image data in an uneven sampling cycle. In FIG. 38A, D1 to D4 (represented by white circles) are image data sampled in a predetermined sampling cycle Ws. FIG. 38B shows re-sampled image data DR1, DR2, DR3, and DR4, obtained through re-sampling in uneven sampling cycles Wa, Wb, and Wc of image data D1 to D4 sampled in a sampling cycle Ws, where Wb<Wa and Wb<Wc. For example, re-sampled image data DR2 can be obtained by interpolating image data D2 and image data D3 at an appropriate ratio.

In FIG. 38B, 'a', 'b', and 'c' are differences in re-sampled image data between adjacent pixels: a=DR2−DR1, b=DR3−DR2, and c=DR4−DR3. If 'a', 'b', and 'c' satisfy the expressions (3a) and (3b), the duration of the section from DR1 to DR4 is detected as the edge width W. The expressions (3a) and (3b) have already been described.

In this way, image data sampled in an uneven cycle can be obtained through re-sampling in an uneven sampling cycle of the image data sampled in a predetermined sampling cycle. An edge width may be detected from the image data obtained in this way.

Fourteenth Embodiment

Figure 39A:
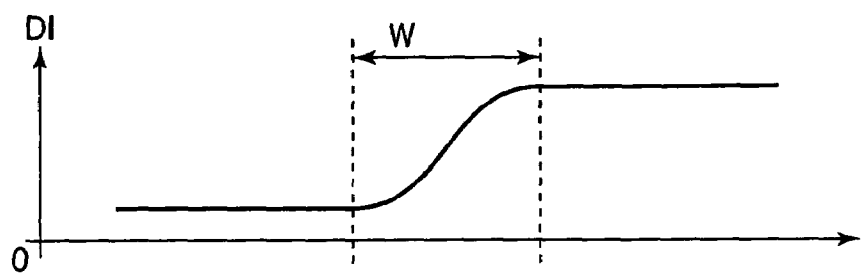
FIGS. 39A to 39C are diagrams for describing operation of an edge reference position detection circuit in a fourteenth embodiment of the present invention.
Figure 39B:
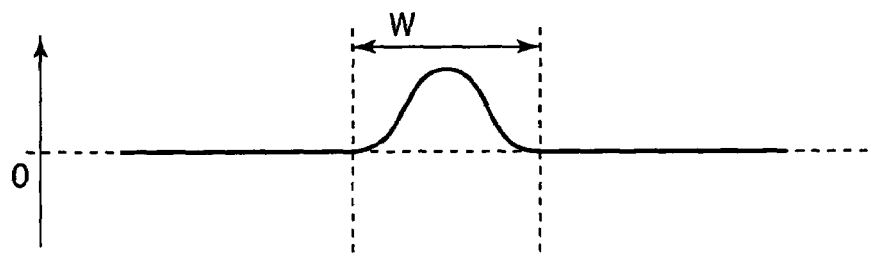
Figure 39C:
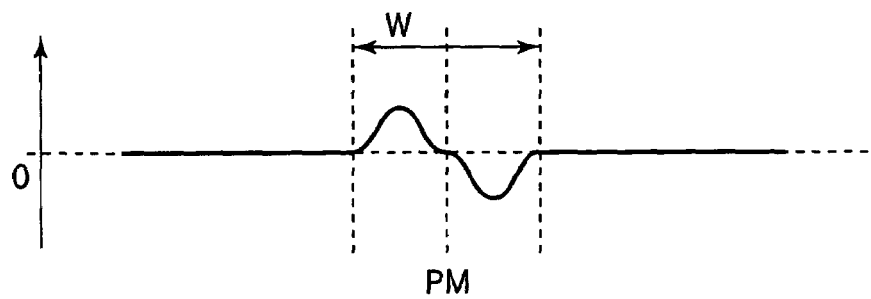

A fourteenth embodiment is a modification of the fourth embodiment. FIGS. 39A to 39C are diagrams for describing operation of the edge reference position detection circuit 52 in the fourteenth embodiment of the present invention, and show a relationship between the edge reference position and image data. FIGS. 39A to 39C show the edge portions which the edge width detection circuit 51 detects from an image as an edge portion having the edge width W. In FIGS. 39A to 39C, the horizontal axis indicates the horizontal position of the image. The vertical axis of FIG. 39A indicates the level (brightness) of input image data DI, the vertical axis of FIG. 39B indicates the first derivative of input image data DI, and the vertical axis of FIG. 39C indicates the second derivative of input image data DI.

The edge reference position detection circuit 52 detects a position where the second derivative is zero and the sign of the second derivative switches (referred to as "a zero-crossing point of the second derivative"), as the edge reference position PM, as shown in FIG. 39C.

FIGS. 40A1 to 40C1 and FIGS. 40A2 to 40C2 are diagrams for describing operation of the edge reference position detection circuit 52 in the fourteenth embodiment of the present invention. In FIGS. 40A1 to 40C1 and FIGS. 40A2 to 40C2, the horizontal axis indicates the horizontal position of the image. The vertical axis of FIGS. 40A1 and 40A2 indicates the level (brightness) of input image data, the vertical axis of FIGS. 40B1 and 40B2 indicates the first derivative of the input image data, the vertical axis of FIGS. 40C1 and 40C2 indicates the second derivative of the input image data.

FIGS. 40A1 to 40C1 show a shape of the edge portion having a steep rise in input image data closer to the leading end of the range indicated as the edge width W. The second derivative changes as shown in FIG. 40C1, so that the zero-crossing point of the second derivative becomes closer to the leading end of the edge width. That is, the edge reference position PM is detected as a position closer to the leading end of the range indicated as the edge width W. On the other hand, FIGS. 40A2 to 40C2 show a shape of the edge portion having a steep rise in input image data closer to the trailing end of the range indicated as the edge width W. In this case, the edge reference position PM is detected as a position closer to the trailing end of the range indicated as the edge width W, as shown in FIG. 40C2.

The edge reference position detection circuit 52 operates as described above, so that a correct edge reference position can be detected, depending on the shape of the edge portion.

Fifteenth Embodiment

A fifteenth embodiment is a modification of the fourth embodiment. In the fourth embodiment described with reference to FIG. 20, if the conditions given as the expressions (3a) and (3b) (a relationship among 'a', 'b' and 'c') are satisfied, the duration from D1 to D4 is regarded as an edge portion, and the duration is output as the edge width W. In the fifteenth embodiment, a method of variably controlling a ratio control amount, depending on the flatness detected before and after the edge portion will be described.

Figure 41:
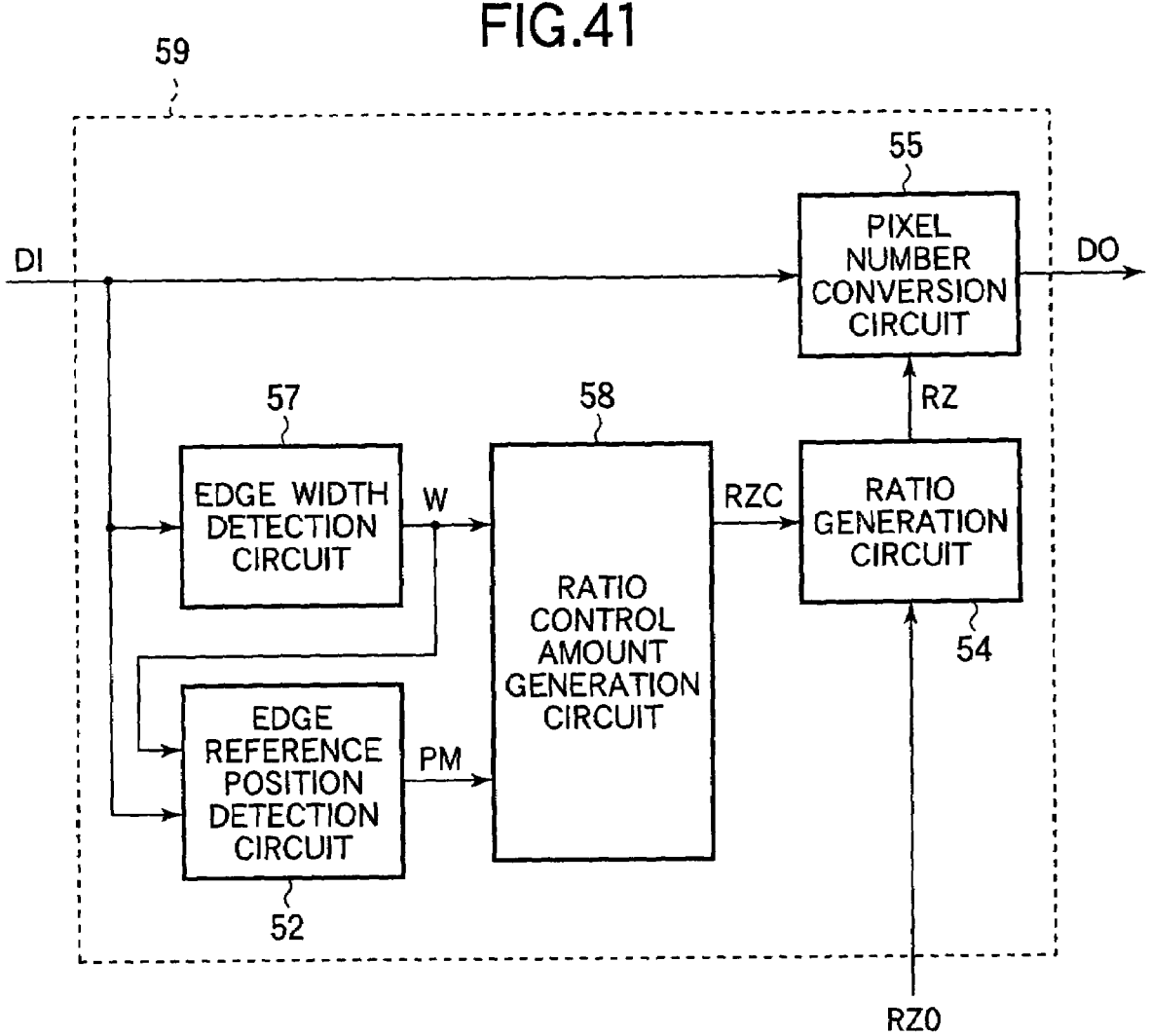
FIG. 41 is a block diagram showing a configuration of an image processing apparatus (a configuration for performing a conversion of pixel number in a vertical direction or in a horizontal direction) in a fifteenth embodiment of the present invention.

FIG. 41 is a block diagram showing a configuration of an image processing apparatus in the fifteenth embodiment of the present invention, and more specifically, a configuration for performing a conversion of pixel number in the horizontal direction. As shown in FIG. 41, an image processing apparatus 59 includes an edge width detection circuit 57, an edge reference position detection circuit 52, a ratio control amount generation circuit 58, a ratio generation circuit 54, and a pixel number conversion circuit 55.

Input image data DI is input to the edge width detection circuit 57, the edge reference position detection circuit 52, and the pixel number conversion circuit 55. The edge width detection circuit 57 detects the duration of a section in which the image level of input image data DI changes in the horizontal direction, as the edge width W, and outputs this width, and also detects flatness in the sections preceding and following the edge portion and outputs the flatness as flatness L of the edge external portion. The edge width W output from the edge width detection circuit 57 is input to the edge reference position detection circuit 52 and the ratio control amount generation circuit 53. Flatness L of the edge external portion is input to the ratio control amount generation circuit 53.

The edge reference position detection circuit 52 detects the edge reference position PM, in accordance with image data DI and the edge width W, and outputs the edge reference position PM. The edge reference position PM output from the edge reference position detection circuit 52 is input to the ratio control amount generation circuit 58.

The ratio control amount generation circuit 58 generates a ratio control amount RZC for controlling a conversion ratio, in accordance with the edge width W, flatness L of the edge external portion, and the edge reference position PM, and outputs the ratio control amount RZC. The ratio control amount RZC output from the ratio control amount generation circuit 58 is input to the ratio generation circuit 54.

The ratio generation circuit 54 generates conversion ratio information RZ in accordance with the ratio control amount RZC and the reference conversion ratio information RZ0 given in advance, and outputs the conversion ratio information RZ. The conversion ratio information RZ output from the ratio generation circuit 54 is input to the pixel number conversion circuit 55.

The pixel number conversion circuit 55 performs a conversion of pixel number of input image data DI in the horizontal direction, using conversion ratio information RZ, and outputs converted image data as output image data DO.

The edge reference position detection circuit 52, the ratio generation circuit 54, and the pixel number conversion circuit 55 have been described earlier. The edge width detection circuit 57 and the ratio control amount generation circuit 58 will be described in further detail.

Figure 42:
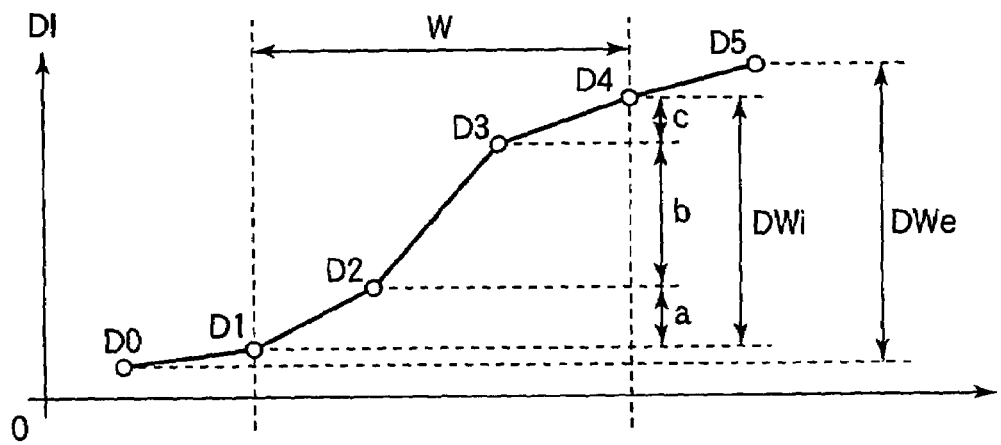
FIG. 42 is a diagram for describing operation of the edge width detection circuit of FIG. 41.

The operation of the edge width detection circuit 57 will be described first. FIG. 42 is a diagram for describing operation of the edge width detection circuit 57 of the fifteenth embodiment 15, and shows a relationship between image data and the edge width. In FIG. 42, D0 to D5 are image data sampled in a predetermined sampling cycle. In FIG. 42, 'a', 'b', and 'c' are differences in image data between adjacent pixels: a=D2−D1, b=D3−D2, and c=D4−D3. In other words, 'a' indicates a change in image data in the leading segment of the edge portion, 'b' indicates a change in image data in the central segment of the edge portion, and 'c' indicates a change in image data in the trailing segment of the edge portion. Further, in FIG. 42, DWi is a difference in data in the edge portion W14, and DWe is a difference in data in a range including the sections preceding and following the edge portion: DWi=D4−D1, DWe=D5−D0. Hereafter, DWe will be referred to as "a difference of an edge external portion", and DWi will be referred to as "a difference of an edge internal portion."

Like the edge width detection circuit 51 described in the fourth embodiment, the edge width detection circuit 57 outputs the edge width W if the expressions (3a) and (3b) are satisfied.

The edge width detection circuit 57 calculates flatness L of the edge external portion from difference of an edge external portion DWe and difference of an edge internal portion DWi (L=(DWe−DWi)/DWi) and outputs the result.

Figure 43:
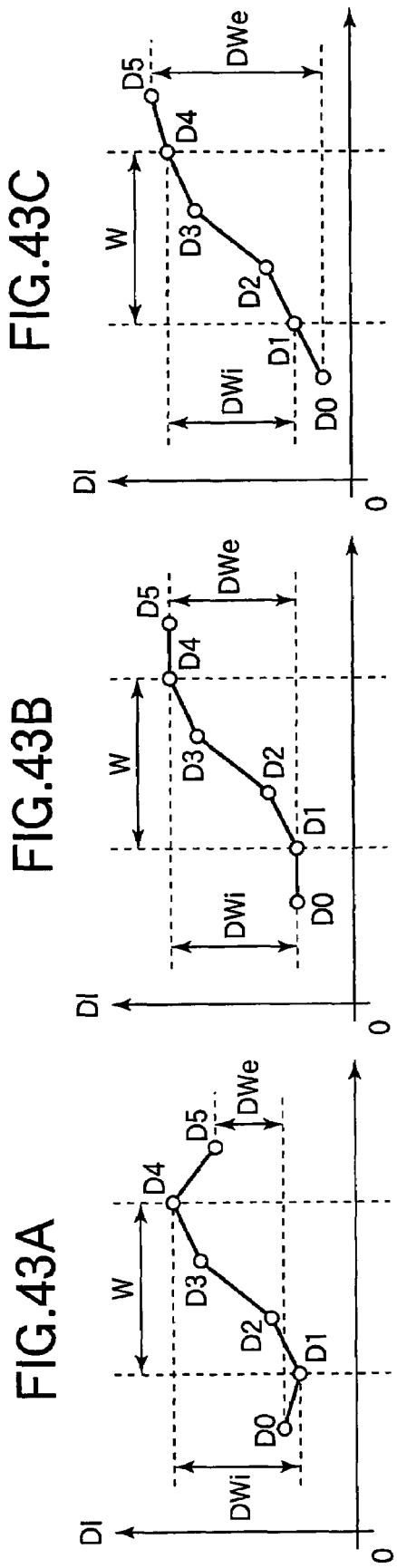
FIGS. 43A to 43C are diagrams for describing operation of an edge width detection circuit (a relationship between flatness of an edge external portion and the image data) in the fifteenth embodiment of the present invention.

FIGS. 43A to 43C are diagrams showing a relationship between flatness of the edge external portion and image data. FIG. 43A shows the case where |DWi|>|Dwe|, that is, L<0. FIG. 43B shows the case where |DWi|=|DWe|, that is, L=0. FIG. 43C shows the case where |DWi|<|DWe|, that is, L>0.

In FIG. 43A, that is, when L<0, the trend of a change in image data from D0 to D1 in the section preceding the edge portion and from D4 to D5 in the section following the edge portion is an opposite of the trend of a change from D1 to D4 of the edge portion, and the range of D0 to D5 is such an image area of high-frequency components that image data varies in a short cycle. In FIG. 43B, that is, when L=0, the image area is flat and the image data does not change in a section D0 to D1 preceding the edge portion and a section D4 to D5 following the edge portion. In FIG. 43C, that is, when L>0, the trend of a change in image data from D0 to D1 in the section preceding the edge portion and from D4 to D5 in the section following the edge portion matches the trend of a change from D1 to D4 of the edge portion, and the section of D0 to D5 is such an image area of low-frequency components that image data varies slightly.

As flatness L of the edge external portion approaches zero, a section outside the edge becomes flat. As flatness L becomes far from zero, a section outside the edge portion becomes uneven. The edge width detection circuit 57 outputs the edge width W and flatness L of the edge external portion.

Figure 44:
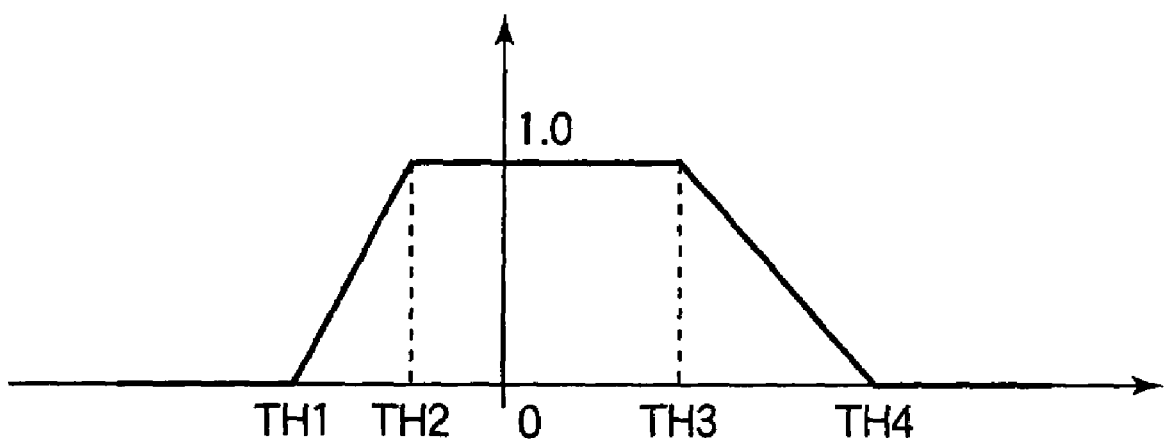
FIG. 44 is a diagram for describing a method of controlling the conversion ratio (a relationship between flatness of an edge external portion and a control coefficient) in the fifteenth embodiment of the present invention.

The operation of the ratio control amount generation circuit 58 will next be described. FIG. 44 is a diagram for describing a method of controlling a ratio control amount. In FIG. 44, the horizontal axis indicates flatness L of the edge external portion, and the vertical axis indicates a control coefficient KL to be multiplied by the ratio control amount. TH1, TH2, TH3, and TH4 are threshold levels.

As shown in FIG. 44, the control coefficient KL is 0 in the ranges of L<TH1 and TH4<L. In the range of TH1≦L<TH2, KL increases proportionately with L. In the range of TH2≦L<TH3, KL is 1. In the range of TH3≦L<TH4, KL decreases proportionately with L. In the range of TH4<L, KL is 0. That is, KL increases as L approaches zero, and KL decreases as L becomes far from zero. The control coefficient KL is generated in accordance with flatness L of the edge external portion and thresholds TH1 to TH4.

Figure 45A:
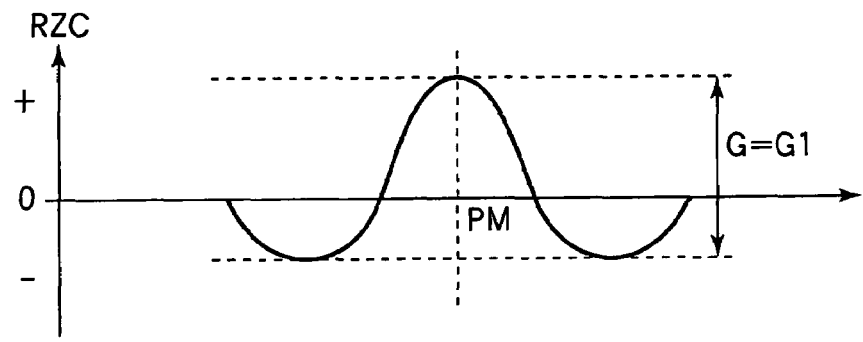
FIGS. 45A to 45D are diagrams for describing a method of controlling a conversion ratio (a relationship between a control coefficient and a ratio control amount) in the fifteenth embodiment of the present invention.
Figure 45B:
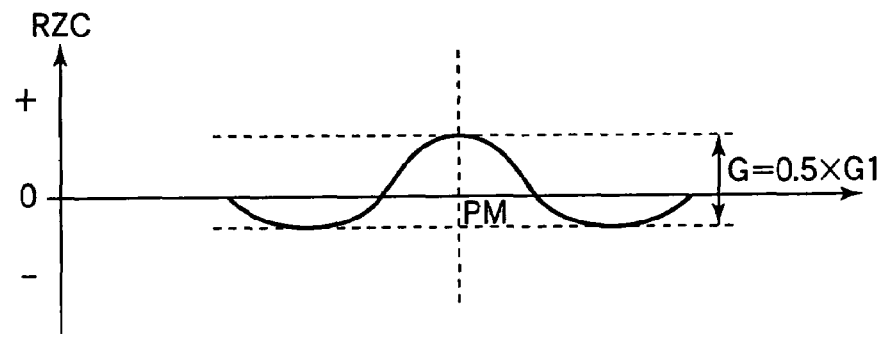
Figure 45C:
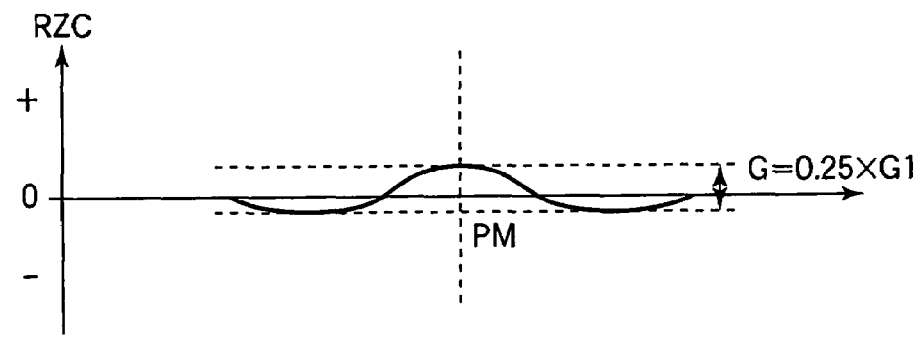
Figure 45D:
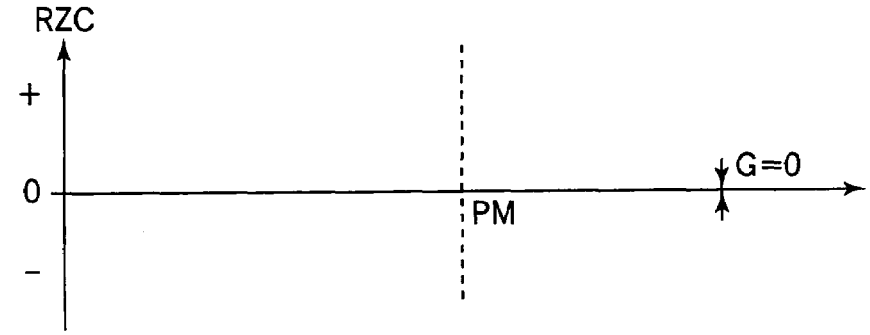

FIGS. 45A to 45D are diagrams for describing a method of controlling the conversion ratio (a relationship between a control coefficient KL and a ratio control amount) in the fifteenth embodiment of the present invention. In FIGS. 45A to 45D, the horizontal axis indicates the horizontal position of the image, and the vertical axis indicates the ratio control amount. FIGS. 45A to 45D show how the ratio control amount RZC varies with the control coefficient KL. FIG. 45A shows the case where KL=1. FIG. 45B show the case where KL=0.5. FIG. 45C shows the case where KL=0.25. FIG. 45D shows the case where KL=0. In FIGS. 45A to 45D, the amplitude (a difference between the maximum and minimum value) of the ratio control amount is designated as G. If G=G1 when KL=1 in FIG. 45A, G=0.5×G1 when KL=0.5 in FIG. 45B, G=0.25×G1 when KL=0.25 in FIG. 45C, and G=0 when KL=0 in FIG. 45D. As KL decreases, the amplitude of the ratio control amount decreases. As has been described in the sixth embodiment, smaller amplitude of ratio control amount produces a smaller effect of the enhancement of sharpness of the edge portion.

As has been described earlier, the control coefficient KL takes a greater value as the section outside the edge portion becomes more flat. As the section outside the edge portion becomes more uneven, the control coefficient KL takes a smaller value. Therefore, as flatness L of the edge external portion approaches zero, the amplitude of ratio control amount increases, and as flatness L of the edge external portion becomes far from zero, the amplitude of ratio control amount decreases. If the section outside the edge portion is flat, a change improves sharpness of the edge portion. If the section outside the edge portion is not flat, fluctuations in conversion ratio in a limited area will be prevented.

If a small area including an edge portion contains high-frequency components, fluctuations of the conversion ratio in a limited area would degrade the high-frequency components. Further, if a small area including an edge portion contains low-frequency components, fluctuations of the conversion ratio in a limited area would produce an unnecessary false edge portion. However, the image processing apparatus of the fifteenth embodiment will not allow fluctuations of the conversion ratio in a limited area if the section outside the edge portion is not flat, so that image degradation as described above can be prevented.

Sixteenth Embodiment

In the fourth to fifteenth embodiments, the conversion of horizontal pixel number has been described. The conversion of vertical pixel number can be performed in a similar manner and can produce a similar effect. If the conversion of vertical pixel number and the conversion of horizontal pixel number are executed successively or simultaneously, the same effect can be produced both in the vertical direction and in the horizontal direction.

Figure 46:
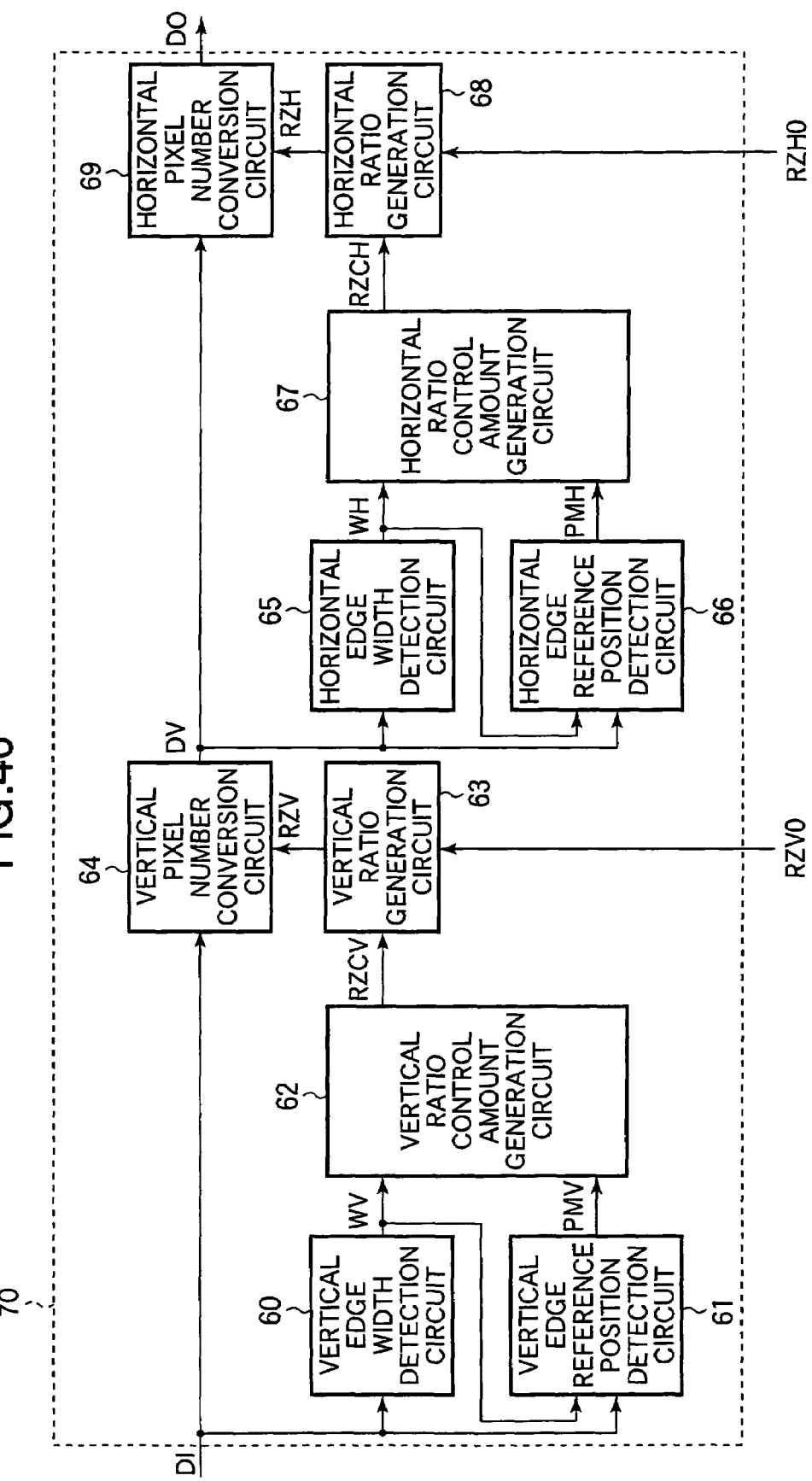
FIG. 46 is a block diagram showing a configuration of an image processing apparatus (a configuration for performing a conversion of pixel numbers both in a vertical direction and in a horizontal direction) in a sixteenth embodiment of the present invention.

FIG. 46 is a block diagram showing a configuration of an image processing apparatus (a configuration for performing a conversion of pixel number both in the vertical direction and in the horizontal direction) of a sixteenth embodiment of the present invention. As shown in FIG. 46, an image processing apparatus 70 includes a vertical edge width detection circuit 60, a vertical edge reference position detection circuit 61, a vertical ratio control amount generation circuit 62, a vertical ratio generation circuit 63, a vertical pixel number conversion circuit 64, a horizontal edge width detection circuit 65, a horizontal edge width detection circuit 66, a horizontal ratio control amount generation circuit 67, a horizontal ratio generation circuit 68, and a horizontal pixel number conversion circuit 69.

In FIG. 46, the vertical edge width detection circuit 60, the vertical edge reference position detection circuit 61, the vertical ratio control amount generation circuit 62, the vertical ratio generation circuit 63, and the vertical pixel number conversion circuit 64 form an image processing block for performing the conversion of vertical pixel number. The horizontal edge width detection circuit 65, the horizontal edge reference position detection circuit 66, the horizontal ratio control amount generation circuit 67, the horizontal ratio generation circuit 68, and the horizontal pixel number conversion circuit 69 form an image processing block for performing the conversion of horizontal pixel number. The vertical edge width detection circuit 60 and the horizontal edge width detection circuit 65 correspond to the edge width detection circuit 51 shown in FIG. 17. The vertical edge reference position detection circuit 61 and the horizontal edge reference position detection circuit 66 correspond to the edge reference position detection circuit 52 shown in FIG. 17. The vertical ratio control amount generation circuit 62 and the horizontal ratio control amount generation circuit 67 correspond to the ratio control amount generation circuit 53 shown in FIG. 17. The vertical ratio generation circuit 63 and the horizontal ratio generation circuit 68 correspond to the ratio generation circuit 54 shown in FIG. 17. The vertical pixel number conversion circuit 64 and the horizontal pixel number conversion circuit 69 correspond to the pixel number conversion circuit 55 shown in FIG. 17.

Input image data DI is input to the vertical edge width detection circuit 60, the vertical edge reference position detection circuit 61, and the vertical pixel number conversion circuit 64. The vertical edge width detection circuit 60 detects the duration of a section in which the image level of input image data DI varies in the vertical direction and outputs the duration as the vertical edge width WV. The vertical edge width WV output from the vertical edge width detection circuit 60 is input to the vertical edge reference position detection circuit 61 and the vertical ratio control amount generation circuit 62.

The vertical edge reference position detection circuit 61 detects the vertical reference position PMV of an edge portion, in accordance with image data DI and the vertical edge width WV, and outputs the vertical edge reference position PMV. The vertical edge reference position PMV output from the vertical edge reference position detection circuit 61 is input to the vertical ratio control amount generation circuit 62.

The vertical ratio control amount generation circuit 62 generates the vertical ratio control amount RZCV for controlling the vertical conversion ratio, in accordance with the vertical edge width WV and the vertical edge reference position PMV, and outputs the vertical ratio control amount RZCV. The vertical ratio control amount RZCV output from the vertical ratio control amount generation circuit 62 is input to the vertical ratio generation circuit 63.

The vertical ratio generation circuit 63 generates conversion ratio information RZV in the vertical direction (vertical conversion ratio information), in accordance with the vertical ratio control amount RZCV and the vertical reference conversion ratio information RZV0 given in advance, and outputs the vertical conversion ratio information RZV. The vertical conversion ratio information RZV output from the vertical ratio generation circuit 63 is input to the vertical pixel number conversion circuit 64.

The vertical pixel number conversion circuit 64 performs a conversion of pixel number of input image data DI in the vertical direction, in accordance with the vertical conversion ratio information RZV, and outputs the converted image data DV. The image data DV output from the vertical pixel number conversion circuit 64 is input to the horizontal edge width detection circuit 65, the horizontal edge reference position detection circuit 66, and the horizontal pixel number conversion circuit 69.

The horizontal edge width detection circuit 65 detects the duration of a section where the image level of input image data DV changes in the horizontal direction, as the horizontal edge width WH, and outputs the horizontal edge width WH. The horizontal edge width WH output from the horizontal edge width detection circuit 65 is input to the horizontal edge reference position detection circuit 66 and the horizontal ratio control amount generation circuit 67.

The horizontal edge reference position detection circuit 66 detects the horizontal reference position PMH of an edge portion, in accordance with the image data DV and the horizontal edge width WH, and outputs the horizontal edge reference position PMH. The horizontal edge reference position PMH output from the horizontal edge reference position detection circuit 66 is input to the horizontal ratio control amount generation circuit 67.

The horizontal ratio control amount generation circuit 67 generates the horizontal ratio control amount RZCH for controlling the horizontal conversion ratio, in accordance with the horizontal edge width WH and the horizontal edge reference position PMH, and outputs the horizontal ratio control amount RZCH. The horizontal ratio control amount RZCH output from the horizontal ratio control amount generation circuit 67 is input to the horizontal ratio generation circuit 68.

The horizontal ratio generation circuit 68 generates conversion ratio information RZH in the horizontal direction (horizontal conversion ratio information), in accordance with the horizontal ratio control amount RZCH and the horizontal reference conversion ratio information RZH0 given in advance, and outputs the horizontal conversion ratio information RZH. The horizontal conversion ratio information RZH output from the horizontal ratio generation circuit 68 is input to the horizontal pixel number conversion circuit 69.

The horizontal pixel number conversion circuit 69 performs a conversion of pixel number of the image data DV in the horizontal direction, in accordance with the horizontal conversion ratio information RZH, and outputs the converted image data as the output image data DO.

Individual circuits in the image processing apparatus 70 operate in the same way as has been described earlier in detail. The vertical pixel number conversion circuit 64 and the horizontal pixel number conversion circuit 69 are implemented generally by providing a circuit for storing image data temporarily, like a memory. If the horizontal reference conversion ratio information RZH0=1 and the vertical reference conversion ratio information RZV0=1, the entire image is neither converted for scaling up nor converted for scaling down, and just sharpness of the edge portion is adjusted.

By specifying the horizontal reference conversion ratio information RZH0, the vertical reference conversion ratio information RZV0, the horizontal ratio control amount RZCH, and the vertical ratio control amount RZCV arbitrarily and independently of one another, the horizontal conversion ratio and the horizontal sharpness of the edge portion can be controlled independently of each other, and the vertical conversion ratio and the vertical sharpness of the edge portion can be controlled independently of each other. Accordingly, a horizontal edge width of input image can be adjusted to provide desired sharpness in the horizontal direction, and a vertical edge width can be adjusted to provide desired sharpness in the vertical direction.

If the vertical reference conversion ratio information RZV0 is ½ (double conversion ratio) and if the horizontal reference conversion ratio information RZH0 is 1 (single conversion ratio), an interlaced image can be converted to a non-interlaced image (scan conversion), and the horizontal edge portion and the vertical edge portion can be controlled to provide desired sharpness independently of each other.

In the operation of the image processing apparatus 70 described above, the conversion of vertical pixel number and the conversion of horizontal pixel number are performed successively. Conversion of pixel number can produce the same effect either when the pixel number in the vertical direction is converted after the pixel number in the horizontal direction is converted or when the conversion of vertical pixel number and the conversion of horizontal pixel number are simultaneously performed.

In the sixteenth embodiment, as has been described earlier, an edge width and an edge reference position are detected from input image data, a ratio control amount is generated from the edge width and the edge reference position, conversion ratio information is generated in accordance with the ratio control amount, and conversion of pixel number is performed by executing an interpolation operation of pixels in input image data in accordance with the conversion ratio information, so that an edge portion having a predetermined width (duration) can be converted to an edge portion having a desired width (duration). Accordingly, sharpness of the output image can be enhanced, and an edge portion having desired sharpness can be obtained at a predetermined reference conversion ratio. Because the ratio control amount is independent of the amplitude of the edge portion, sharpness can be appropriately improved across the entire image.

Seventeenth Embodiment

Figure 47:
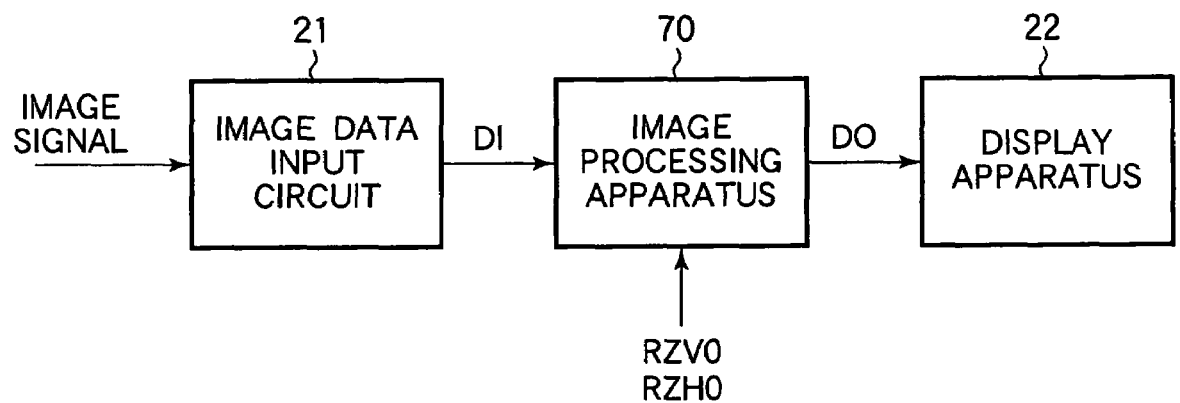
FIG. 47 is a block diagram showing a configuration of an image display apparatus in a seventeenth embodiment of the present invention.

FIG. 47 is a block diagram showing a configuration of an image display apparatus in a seventeenth embodiment of the present invention. The image display apparatus of the seventeenth embodiment includes the image processing apparatus 70 of the sixteenth embodiment (see FIG. 46 for the configuration) in a stage subsequent to the image data input circuit 21 and also includes a display apparatus 22 in a further subsequent stage.

An image signal is input to the image data input circuit 21. The image signal includes both an image data signal and a synchronization signal. The image data input circuit 21 outputs image data DI in the format of the image signal.

If the image signal is an analog signal, the image data input circuit 21 includes an A/D converter, and outputs image data sampled at cycles determined by the synchronization signal. If the image signal is an encoded digital signal, the image data input circuit 21 includes a decoder, and outputs decoded image data.

The image data DI output from the image data input circuit 21 is input to the image processing apparatus 70. As has been described in detail in the sixteenth embodiment, the image processing apparatus 70 performs a conversion of pixel number in the vertical direction and the horizontal direction while controlling the conversion ratio in accordance with the edge width and the edge reference position of an edge portion of the image, and outputs the converted image data DO.

The image data DO obtained after conversion of pixel number by the image processing apparatus 70 is input to the display apparatus 22, and an image based on image data DO is displayed by the display apparatus 22.

In the seventeenth embodiment, as has been described above, the image display apparatus includes the image processing apparatus of the sixteenth embodiment, so that an edge portion having a predetermined width (duration) can be converted to an edge portion having a desired width (duration). Accordingly, an image can be displayed with desired sharpness, and an image can be displayed with sharpness of the edge portion maintained at a predetermined reference conversion ratio. Because a difference of an edge portion is irrelevant, an image can be displayed with sharpness enhanced appropriately across the entire image.

Eighteenth Embodiment

Although the pixel number is converted by hardware in the fourth embodiment to the seventeenth embodiment, the pixel number can also be converted by software. In an eighteenth embodiment, an example in which the pixel number is converted by software will be described.

Figure 48:
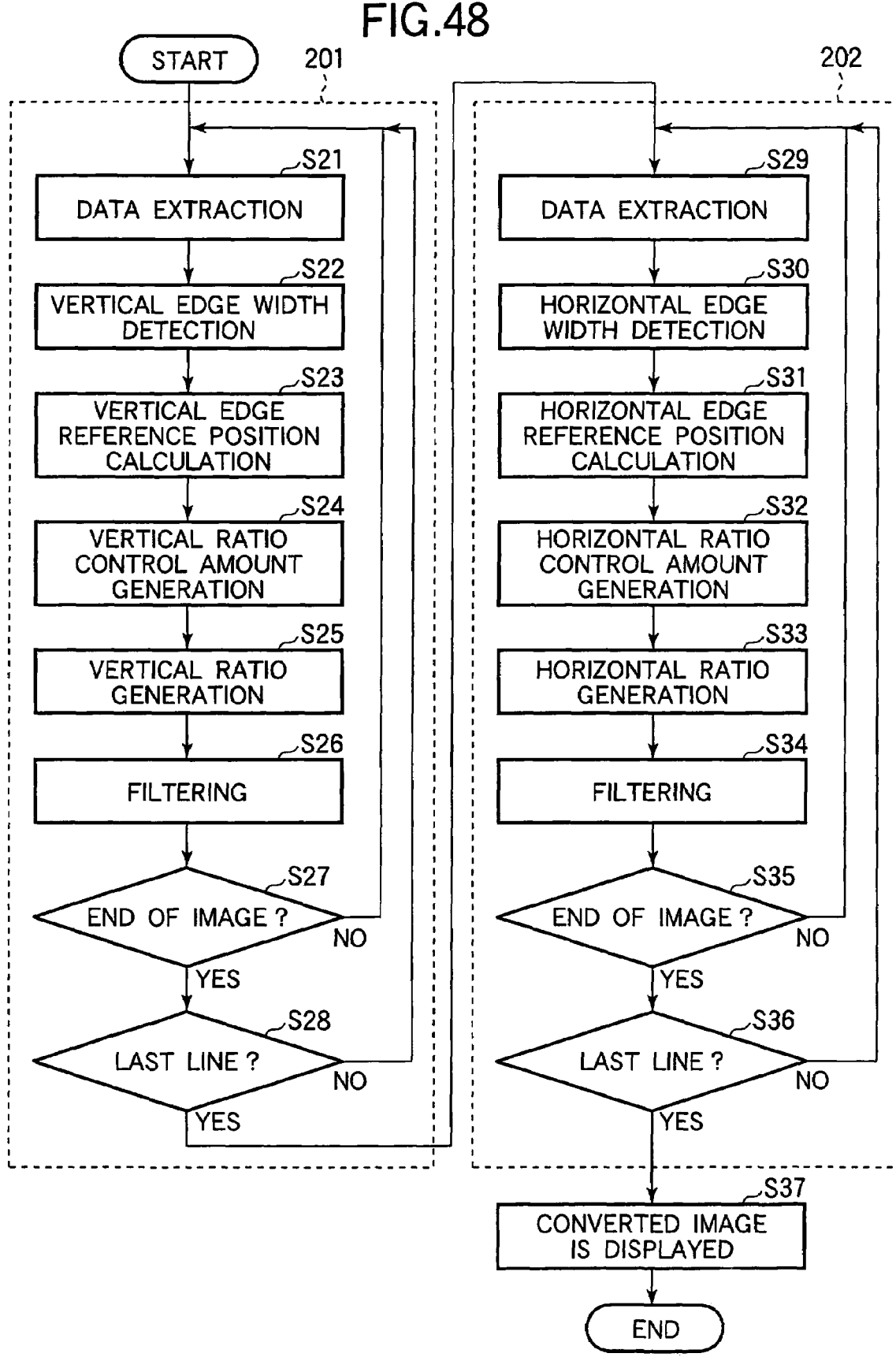
FIG. 48 is a flow chart showing an image display method in an eighteenth embodiment of the present invention.

FIG. 48 is a flow chart illustrating the image display operation of the eighteenth embodiment of the present invention, and is a diagram for describing operation for performing a conversion of pixel number (an image processing method and an image display method) by software processing (including a case of mixed software and hardware processing). In FIG. 48, processing 201 is a sequence for generating data in the vertical direction (pixel number conversion sequence), and processing 202 is a sequence for generating data in the horizontal direction (pixel number conversion sequence).

In FIG. 48, conversion of pixel number is performed both in the vertical direction and in the horizontal direction. Conversion of pixel number may be performed in the horizontal direction and the vertical direction independently of each other. Moreover, conversion of pixel number may be performed in either direction alone.

First, the processing 201 to generate data in the vertical direction is performed as shown in FIG. 48. In the step S21, the vertical edge width corresponding to a target pixel is detected from the image data of which pixel number is to be converted (equivalent to DI in FIG. 46) and the data of a plurality of pixels required for a filtering operation are extracted. In the step S22, a vertical edge width (equivalent to WV in FIG. 46) is detected from the plurality of pixel data items extracted in the step S21. In the step S23, a vertical edge reference position (equivalent to PMV in FIG. 46) is detected from the plurality of pixel data items extracted in the step S21 and the vertical edge width detected in the step S22. In the step S24, a ratio control amount in the vertical direction (equivalent to RZCV in FIG. 46) is generated from the vertical edge width detected in the step S22 and the vertical edge reference position detected in the step S23. In the step S25, the vertical conversion ratio information (equivalent to RZV in FIG. 46) is generated by superimposing the vertical ratio control amount generated in the step S24 on the vertical reference conversion ratio information (equivalent to RZV0 in FIG. 46) given in advance. In the step S26, a filtering operation is performed in the vertical direction, in accordance with the vertical conversion ratio information generated in the step S25 and the plurality of pixel data items extracted in the step S21, and the result of the operation is stored. The sequence of the steps S21 to S26 is repeated until the target pixel reaches an end of the image (the step S27) If the operation starts from the left end of the image, for example, the "end of the image" is the right end of the image.

After the target pixel reaches the end of the image in the step S27 above, the steps S21 to S27 are repeated for the target pixels of the next line, and these are repeated up to the last line (the step S28). The conversion of vertical pixel number is completed when the steps described above are executed for all the pixels.

After data generation in the vertical direction is completed, the operation of processing 202 for generating data in the horizontal direction starts as shown in FIG. 48. In the step S29, the horizontal edge width corresponding to the target pixel is detected from the image obtained by the conversion of vertical pixel number (equivalent to DV in FIG. 46), and the data of a plurality of pixels required for a filtering operation in the horizontal direction are extracted. In the step S30, a horizontal edge width (equivalent to WH in FIG. 46) is detected from the plurality of pixel data items extracted in the step S29. In the step S31, a horizontal edge reference position (equivalent to PMH in FIG. 46) is detected from the plurality of pixel data items extracted in the step S30 and the horizontal edge width detected in the step S32. In the step S32, a ratio control amount in the horizontal direction (equivalent to RZCH in FIG. 46) is generated, in accordance with the horizontal edge width detected in the step S30 and the horizontal edge reference position detected in the step S31. In the step S33, the horizontal conversion ratio information (equivalent to RZH in FIG. 46) is generated by superimposing the ratio control amount generated in the step S32 on the horizontal reference conversion ratio information (equivalent to RZH0 in FIG. 46) given in advance. In the step S34, a filtering operation in the horizontal direction is performed in accordance with the conversion ratio generated in the step S33 and the plurality of pixel data items extracted in the step S29, and the result of the operation is stored. The steps S29 to S34 are repeated until the target pixel reaches an end of the image (the step S15).

After the target pixel reaches an end of the image in the step S35, the steps S29 to S35 are repeated for the target pixels in the next line, and these are repeated up to the last line (the step S36). The conversion of horizontal pixel number is completed when the steps described above are executed for all the pixels.

After data generation in the vertical direction and data generation in the horizontal direction are completed, an image obtained by conversion of pixel number is finally displayed in the step S37.

The processing of each step in FIG. 48 has already been described in detail in the fourth to seventeenth embodiments.

In FIG. 48, the conversion of vertical pixel number is followed by the conversion of horizontal pixel number. However, the horizontal pixel conversion may be followed by the conversion of vertical pixel number. That is, the processing 202 of FIG. 48 may be followed by the processing 201 of FIG. 48. Either the processing 201 of FIG. 48 or the processing 202 of FIG. 48 alone may be executed.

In the conversion of vertical pixel number and the conversion of horizontal pixel number shown in FIG. 48, the operation of the target pixel are performed from the left to the right and from the top to the bottom of the image. This sequence may be different. The operation will produce the same result irrespective of the sequence of the operation.

In the steps S25 and S33 of FIG. 48, the average conversion ratio information of each line (equivalent to RZV and RZH of FIG. 46) must match the conversion ratio of the entire image (equivalent to RZV0 and RZH0 of FIG. 46), as has been described with reference to FIG. 18 in the fourth embodiment. That is, the total sum of the ratio control amounts (equivalent to RZCV and RZCH of FIG. 46) of a single line becomes zero in the steps S24 and S32 of FIG. 48.

In the eighteenth embodiment, as has been described above, the image processing method and the image display method of the fourth to seventeenth embodiments are performed by software, and an edge portion having a predetermined width (duration) can be converted to an edge portion having a desired width (duration). Accordingly, an image can be displayed with desired sharpness, and an image can be displayed with sharpness of the edge portion maintained at a predetermined reference conversion ratio. Because a difference of an edge portion is irrelevant, the image can be displayed with sharpness appropriately enhanced across the entire image. Moreover, because the data level of the edge reference position is not changed, a conversion of pixel number of an edge portion will not move the position of the edge portion.

The invention claimed is:

1. An image processing method implemented by one or more processors, comprising:
   detecting using said one or more processors an edge width of an edge portion of input image data;
   determining using said one or more processors a localized conversion ratio based on the edge width and a ratio control amount, wherein the localized conversion ratio is localized to each one of at least three segments of said edge width, wherein said at least three segments include a leading edge segment, a control edge segment and a trailing edge segment, in which the ratio control amount is positive in the leading edge segment, positive in the trailing edge segment and negative in the control edge segment of the edge portion such that the total sum of the leading edge segment, control edge segment and trailing edge segment is zero, the localized conversion ratio being generated by the expression: $z=z_o \times (1+z_c)$ where z is the localized conversion ratio, $z_o$ is a reference conversion amount determined in advance and $z_c$ is the ratio control amount; and
   generating an output image by applying the localized conversion ratio to the input image data to convert a number of pixels in the segment of the edge portion.

2. The image processing method according to claim 1, said determining step determining a different localized conversion ratio for at least one segment of an edge portion of an image than for another segment of the edge portion.

3. The image processing method according to claim 1, said determining step determining a localized conversion ratio that is higher for leading and trailing edge segments than for a non-edge segment.

4. The image processing method according to claim 1, said determining step determining a localized conversion ratio that is lower for a central edge segment than for a non-edge segment.

5. The image processing method according to claim 1, wherein a total sum of localized conversion ratios for leading, central and trailing edge segments is zero.

6. The image processing method according to claim 1, said determining step variably controlling the localized conversion ratio depending upon a control pattern determined on the basis of the edge portion.

7. The image processing method according to claim 1, said determining and applying steps determining and applying the localized conversion ratio in a horizontal direction, vertical direction or both horizontal and vertical directions.

8. The image processing method according to claim 7, wherein the localized conversion ratio for the horizontal direction is different than the localized conversion ratio for the vertical direction.

9. The image processing method according to claim 1, further comprising:
specifying an amplitude of the localized conversion ratio to adjust the edge width of the edge portion to a desired edge width.

10. The image processing method according to claim 1, further comprising:
detecting an edge reference position of the edge portion; said determining step determining the localized conversion ratio based on the edge width and edge reference position.

11. The image processing method according to claim 1, further comprising:
variably controlling a generation period of the localized conversion ratio.

12. The image processing method according to claim 1, further comprising:
variably controlling a maximum and/or minimum value of the localized conversion ratio.

13. The image processing method according to claim 1, further comprising:
variably controlling a maximum value, minimum value, and/or generation period of the localized conversion ratio based on the edge width.

14. The image processing method according to claim 1, further comprising:
displaying the output image on a display device.

* * * * *